(12) United States Patent
Patel

(10) Patent No.: US 11,966,898 B2
(45) Date of Patent: *Apr. 23, 2024

(54) SYSTEMS AND METHODS FOR DETERMINING ELECTRIC PULSES TO PROVIDE TO AN UNATTENDED MACHINE BASED ON REMOTELY-CONFIGURED OPTIONS

(71) Applicant: PAYRANGE INC., Portland, OR (US)

(72) Inventor: Paresh K. Patel, Portland, OR (US)

(73) Assignee: PayRange Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,311

(22) Filed: Nov. 8, 2022

(65) Prior Publication Data

US 2023/0297987 A1    Sep. 21, 2023

Related U.S. Application Data

(63) Continuation of application No. 17/529,111, filed on Nov. 17, 2021, now Pat. No. 11,494,751, which is a
(Continued)

(51) Int. Cl.
*G06Q 30/00* (2023.01)
*G06Q 20/20* (2012.01)
(Continued)

(52) U.S. Cl.
CPC ......... *G06Q 20/201* (2013.01); *G06Q 20/327* (2013.01); *G06Q 30/0269* (2013.01);
(Continued)

(58) Field of Classification Search
CPC .................................................. G06Q 20/201
(Continued)

(56) References Cited

U.S. PATENT DOCUMENTS 4,374,557 A    2/1983    Sugimoto et al.
5,479,602 A    12/1995   Baecker et al.
(Continued)

FOREIGN PATENT DOCUMENTS

CN    1561508 A      1/2005
CN    204375056 U    6/2015
(Continued)

OTHER PUBLICATIONS

ProQuestDialogNPL STIC Search History.*
(Continued)

*Primary Examiner* — John H. Holly
(74) *Attorney, Agent, or Firm* — Morgan, Lewis & Bockius LLP

(57) ABSTRACT

A system receives, from a server, information about a first set of remotely-configured options for an unattended machine. In response to receiving the information about the first set of remotely-configured options, the system displays user interface objects that allow for selection of respective options in the first set of remotely-configured options. After detecting a selection of a first user interface object, the system receives, from the server, specifications regarding electric pulses to be provided to the unattended machine by a pulse-providing device. After sending an authorization grant and the specifications to the pulse-providing device, the system receives an indication that the electric pulses were provided to the unattended machine according to the specifications.

30 Claims, 48 Drawing Sheets

Related U.S. Application Data continuation of application No. 15/435,228, filed on Feb. 16, 2017, now Pat. No. 11,205,163, which is a continuation-in-part of application No. 14/458,192, filed on Aug. 12, 2014, now Pat. No. 9,875,473, which is a continuation-in-part of application No. 14/456,683, filed on Aug. 11, 2014, now Pat. No. 9,256,873, which is a continuation of application No. 14/335,762, filed on Jul. 18, 2014, now Pat. No. 9,547,859, which is a continuation of application No. 14/214,644, filed on Mar. 14, 2014, now Pat. No. 8,856,045, which is a continuation-in-part of application No. 29/477,025, filed on Dec. 18, 2013, now Pat. No. Des. 755,183.

(60) Provisional application No. 62/296,543, filed on Feb. 17, 2016, provisional application No. 61/917,936, filed on Dec. 18, 2013.

(51) Int. Cl.
    *G06Q 20/32*     (2012.01)
    *G06Q 30/0251*   (2023.01)
    *G07F 9/02*      (2006.01)
    *H04L 41/0813*   (2022.01)
    *H04W 4/02*      (2018.01)

(52) U.S. Cl.
    CPC .......... *G07F 9/023* (2013.01); *H04L 41/0813* (2013.01); *H04W 4/023* (2013.01)

(58) Field of Classification Search
    USPC ......... 705/20, 44, 1.1, 39, 13, 43, 71, 26.35; 235/385, 381, 375; 709/203
    See application file for complete search history.

(56) References Cited

U.S. PATENT DOCUMENTS

| | | | |
|---|---|---|---|
| 5,844,808 A | 12/1998 | Konsmo et al. |
| 5,854,994 A | 12/1998 | Canada et al. |
| 5,880,733 A | 3/1999 | Horvitz et al. |
| 5,892,900 A | 4/1999 | Ginter et al. |
| 5,955,718 A | 9/1999 | Levasseur |
| 6,056,194 A | 5/2000 | Kolls |
| 6,390,269 B1 | 5/2002 | Billington |
| 6,462,644 B1 | 10/2002 | Howell |
| 6,505,095 B1 | 1/2003 | Kolls |
| 6,584,309 B1 | 6/2003 | Whigham |
| 6,594,759 B1 | 7/2003 | Wang |
| 6,743,095 B2 | 6/2004 | Cole et al. |
| 6,793,134 B2 | 9/2004 | Clark |
| 6,810,234 B1 | 10/2004 | Rasanen |
| 6,840,860 B1 | 1/2005 | Okuniewicz |
| 7,085,556 B2 | 8/2006 | Offer |
| 7,110,954 B2 | 9/2006 | Yung et al. |
| 7,127,236 B2 | 10/2006 | Khan |
| 7,131,575 B1 | 11/2006 | Kolls |
| 7,455,223 B1 | 11/2008 | Wilson |
| 7,458,510 B1 | 12/2008 | Zhou |
| 7,464,867 B1 | 12/2008 | Kolls |
| 7,493,288 B2 | 2/2009 | Biship et al. |
| 7,513,419 B1 | 4/2009 | Crews et al. |
| 7,672,680 B1 | 3/2010 | Lee et al. |
| 7,690,495 B1 | 4/2010 | Kolls |
| 7,721,958 B2 | 5/2010 | Belfer et al. |
| 7,848,980 B2 | 12/2010 | Carlson |
| 7,962,369 B2 | 6/2011 | Rosenberg |
| 7,965,693 B2 | 6/2011 | Jiang et al. |
| 7,983,670 B1 | 7/2011 | Elliott |
| 8,020,763 B1 | 9/2011 | Kowalchyk |
| 8,059,101 B2 | 11/2011 | Westerman |
| 8,157,167 B2 | 4/2012 | Cost et al. |
| 8,201,736 B2 | 6/2012 | Majer |
| 8,255,323 B1 | 8/2012 | Casey et al. |
| D669,899 S | 10/2012 | Cheng et al. |
| 8,346,670 B2 | 1/2013 | Hasson et al. |
| 8,356,754 B2 | 1/2013 | Johnson et al. |
| 8,376,227 B2 | 2/2013 | Hammad et al. |
| 8,396,589 B2 | 3/2013 | Katzenstein Garibaldi |
| 8,412,626 B2 | 4/2013 | Hirson et al. |
| 8,438,066 B1 | 5/2013 | Yuen |
| 8,479,190 B2 | 7/2013 | Sueyoshi et al. |
| 8,489,140 B2 | 7/2013 | Weiner et al. |
| 8,514,775 B2 | 8/2013 | Frecassetti et al. |
| 8,517,766 B2 | 8/2013 | Golko et al. |
| 8,548,426 B2 | 10/2013 | Smith |
| 8,577,734 B2 | 11/2013 | Treyz |
| 8,583,496 B2 | 11/2013 | You et al. |
| 8,596,528 B2 | 12/2013 | Fernandes et al. |
| 8,596,529 B1 | 12/2013 | Kolls |
| 8,600,899 B1 | 12/2013 | Davis |
| 8,606,702 B2 | 12/2013 | Ruckart |
| 8,615,445 B2 | 12/2013 | Dorsey et al. |
| 8,645,971 B2 | 2/2014 | Carlson et al. |
| 8,700,530 B2 | 4/2014 | Smith |
| 8,707,276 B2 | 4/2014 | Hill et al. |
| 8,712,893 B1 | 4/2014 | Brandmaier |
| 8,761,809 B2 | 6/2014 | Faith et al. |
| 8,769,643 B1 | 7/2014 | Ben Ayed |
| 8,788,341 B1 | 7/2014 | Patel |
| 8,794,734 B2 | 8/2014 | Drummond |
| 8,810,430 B2 | 8/2014 | Proud |
| 8,819,659 B2 | 8/2014 | Ramer et al. |
| 8,831,677 B2 | 9/2014 | Villa-Real |
| 8,838,481 B2 | 9/2014 | Moshfeghi |
| 8,850,421 B2 | 9/2014 | Proud |
| 8,856,045 B1 | 10/2014 | Patel et al. |
| 8,881,975 B1 | 11/2014 | Matthews |
| 8,898,620 B2 | 11/2014 | Eizenman et al. |
| 8,903,737 B2 | 12/2014 | Cameron et al. |
| 8,958,846 B2 | 2/2015 | Freeny, Jr. |
| 9,001,047 B2 | 4/2015 | Forstall |
| 9,037,492 B2 | 5/2015 | White |
| 9,092,768 B2 | 7/2015 | Breitenbach et al. |
| 9,098,961 B1 | 8/2015 | Block et al. |
| 9,210,247 B2 | 12/2015 | Vance et al. |
| 9,262,771 B1 | 2/2016 | Patel |
| 9,272,713 B1 | 3/2016 | Dvoskin et al. |
| 9,395,888 B2 | 7/2016 | Schiplacoff et al. |
| 9,424,603 B2 | 8/2016 | Hammad |
| 9,483,763 B2 | 11/2016 | Van Os |
| 9,547,859 B2 | 1/2017 | Patel |
| 9,875,473 B2 | 1/2018 | Patel |
| 9,898,884 B1 | 2/2018 | Arora et al. |
| 10,121,318 B2 | 11/2018 | LeMay et al. |
| 10,163,292 B1 | 12/2018 | Romero |
| 10,210,501 B2 | 2/2019 | Low et al. |
| 10,217,151 B1 | 2/2019 | Greiner et al. |
| 10,304,057 B1 | 5/2019 | Powell |
| 10,380,573 B2 | 8/2019 | Lin et al. |
| 10,410,194 B1 | 9/2019 | Grassadonia |
| 10,423,949 B2 | 9/2019 | Lyons et al. |
| 10,824,828 B2 | 11/2020 | Ostri |
| 10,977,642 B2 | 4/2021 | Khan |
| 11,010,759 B1 | 5/2021 | Maeng |
| 11,042,852 B1 | 6/2021 | Wadhwa |
| 11,074,577 B1 | 7/2021 | Soccorsy et al. |
| 11,182,794 B1 | 11/2021 | Aument |
| 11,227,275 B2 | 1/2022 | Van Heerden et al. |
| 11,308,462 B2 | 4/2022 | Berman et al. |
| 11,373,147 B1 | 6/2022 | Moore |
| 11,564,266 B1 | 1/2023 | Kahn |
| 2002/0016740 A1 | 2/2002 | Ogasawara |
| 2002/0152123 A1 | 10/2002 | Giordano et al. |
| 2002/0164953 A1 | 11/2002 | Curtis |
| 2003/0009385 A1 | 1/2003 | Tucciarone |
| 2003/0089767 A1 | 5/2003 | Kiyomatsu |
| 2003/0101096 A1 | 5/2003 | Suzuki et al. |
| 2003/0110097 A1 | 6/2003 | Lei |
| 2003/0130902 A1 | 7/2003 | Athwal |
| 2003/0158891 A1* | 8/2003 | Lei ..................... G06Q 20/327 709/203 |

(56) References Cited

U.S. PATENT DOCUMENTS

| | | |
|---|---|---|
| 2003/0191811 A1 | 10/2003 | Hashem |
| 2003/0206542 A1 | 11/2003 | Holder |
| 2003/0236872 A1 | 12/2003 | Atkinson |
| 2004/0029569 A1 | 2/2004 | Khan et al. |
| 2004/0049454 A1 | 3/2004 | Kanno et al. |
| 2004/0117262 A1 | 6/2004 | Berger et al. |
| 2004/0122685 A1 | 6/2004 | Bunce et al. |
| 2004/0133653 A1 | 7/2004 | Defosse |
| 2005/0021459 A1 | 1/2005 | Bell |
| 2005/0043011 A1 | 2/2005 | Murray |
| 2005/0080510 A1 | 4/2005 | Bates |
| 2005/0101295 A1 | 5/2005 | Rupp |
| 2005/0177798 A1 | 8/2005 | Thomson et al. |
| 2005/0181804 A1 | 8/2005 | Misikangas et al. |
| 2005/0232421 A1 | 10/2005 | Simons et al. |
| 2005/0234776 A1 | 10/2005 | Jacoves |
| 2006/0043175 A1 | 3/2006 | Fu et al. |
| 2006/0052157 A1 | 3/2006 | Walker et al. |
| 2006/0123335 A1 | 6/2006 | Sanchez et al. |
| 2007/0050083 A1 | 3/2007 | Signorelli et al. |
| 2007/0083287 A1 | 4/2007 | Defosse et al. |
| 2007/0095901 A1 | 5/2007 | Illingworth |
| 2007/0119680 A1 | 5/2007 | Saltsov et al. |
| 2007/0159994 A1 | 7/2007 | Brown et al. |
| 2007/0186105 A1 | 8/2007 | Bailey |
| 2007/0187491 A1 | 8/2007 | Godwin et al. |
| 2007/0227856 A1 | 10/2007 | Gopel |
| 2007/0255653 A1 | 11/2007 | Tumminaro |
| 2008/0010190 A1 | 1/2008 | Rackley III et al. |
| 2008/0010193 A1 | 1/2008 | Rackley, III et al. |
| 2008/0033880 A1 | 2/2008 | Fiebiger et al. |
| 2008/0040265 A1 | 2/2008 | Rackley, III et al. |
| 2008/0126213 A1 | 5/2008 | Robertson et al. |
| 2008/0141033 A1 | 6/2008 | Ginter et al. |
| 2008/0154727 A1 | 6/2008 | Carlson |
| 2008/0154735 A1 | 6/2008 | Carlson |
| 2008/0163257 A1 | 7/2008 | Carlson et al. |
| 2008/0167017 A1 | 7/2008 | Wentker et al. |
| 2008/0167991 A1 | 7/2008 | Carlson et al. |
| 2008/0183480 A1 | 7/2008 | Carlson et al. |
| 2008/0201226 A1 | 8/2008 | Carlson et al. |
| 2008/0208762 A1 | 8/2008 | Arthur et al. |
| 2008/0249658 A1 | 10/2008 | Walker |
| 2008/0254853 A1 | 10/2008 | Wright et al. |
| 2008/0255947 A1 | 10/2008 | Friedman |
| 2008/0319913 A1 | 12/2008 | Wiechers |
| 2009/0037284 A1 | 2/2009 | Lewis et al. |
| 2009/0076896 A1 | 3/2009 | Dewitt |
| 2009/0099961 A1 | 4/2009 | Ogilvy |
| 2009/0106160 A1 | 4/2009 | Skowronek |
| 2009/0119190 A1 | 5/2009 | Realini |
| 2009/0171682 A1 | 7/2009 | Dixon et al. |
| 2009/0287349 A1 | 11/2009 | Mardiks |
| 2009/0288173 A1 | 11/2009 | Mardiks |
| 2009/0303982 A1 | 12/2009 | Blachman et al. |
| 2009/0306818 A1 | 12/2009 | Slagley et al. |
| 2009/0306819 A1 | 12/2009 | Insolia |
| 2009/0313125 A1 | 12/2009 | Roh et al. |
| 2009/0313132 A1 | 12/2009 | Kenna et al. |
| 2009/0327089 A1 | 12/2009 | Kanno et al. |
| 2010/0061294 A1 | 3/2010 | Proctor, Jr. |
| 2010/0082485 A1 | 4/2010 | Lin et al. |
| 2010/0094456 A1 | 4/2010 | Simpkins et al. |
| 2010/0105454 A1 | 4/2010 | Weber et al. |
| 2010/0198400 A1 | 8/2010 | Pascal |
| 2010/0227671 A1 | 9/2010 | Laaroussi et al. |
| 2010/0276484 A1 | 11/2010 | Banerjee |
| 2010/0280956 A1 | 11/2010 | Chutorash |
| 2010/0312692 A1* | 12/2010 | Teicher .............. G06Q 20/3278 455/414.1 |
| 2010/0320266 A1 | 12/2010 | White |
| 2010/0329285 A1 | 12/2010 | Stanton |
| 2011/0029405 A1 | 2/2011 | Cronin |
| 2011/0040686 A1 | 2/2011 | Carlson |
| 2011/0125561 A1 | 5/2011 | Marcus |
| 2011/0153436 A1 | 6/2011 | Krampe |
| 2011/0153442 A1 | 6/2011 | Krampe |
| 2011/0153495 A1 | 6/2011 | Dixon et al. |
| 2011/0172848 A1 | 7/2011 | Breitenbach et al. |
| 2011/0178883 A1 | 7/2011 | Granbery |
| 2011/0225067 A1 | 9/2011 | Dunwoody |
| 2011/0238476 A1 | 9/2011 | Carr |
| 2011/0244799 A1 | 10/2011 | Roberts et al. |
| 2011/0251892 A1 | 10/2011 | Laracey |
| 2011/0251910 A1 | 10/2011 | Dimmick |
| 2011/0276636 A1 | 11/2011 | Cheng et al. |
| 2011/0289023 A1 | 11/2011 | Forster et al. |
| 2012/0011024 A1 | 1/2012 | Dorsey et al. |
| 2012/0016731 A1 | 1/2012 | Smith et al. |
| 2012/0029691 A1 | 2/2012 | Mockus et al. |
| 2012/0030047 A1 | 2/2012 | Fuentes |
| 2012/0036045 A1 | 2/2012 | Lowe et al. |
| 2012/0066096 A1 | 3/2012 | Penide |
| 2012/0078735 A1 | 3/2012 | Bauer et al. |
| 2012/0108173 A1 | 5/2012 | Hahm et al. |
| 2012/0136478 A1 | 5/2012 | Anand |
| 2012/0150742 A1 | 6/2012 | Poon et al. |
| 2012/0158172 A1 | 6/2012 | Wencslao |
| 2012/0158528 A1 | 6/2012 | Hsu et al. |
| 2012/0160912 A1 | 6/2012 | Laracey |
| 2012/0197740 A1 | 8/2012 | Grigg et al. |
| 2012/0203666 A1 | 8/2012 | Torossian et al. |
| 2012/0231844 A1 | 9/2012 | Coppinger |
| 2012/0246074 A1 | 9/2012 | Annamalai et al. |
| 2012/0253852 A1 | 10/2012 | Pourfallah |
| 2012/0254631 A1 | 10/2012 | Skillman et al. |
| 2012/0255653 A1 | 10/2012 | Chin |
| 2012/0258773 A1 | 10/2012 | Alvarez Rivera |
| 2012/0276845 A1 | 11/2012 | Wikander |
| 2012/0290472 A1 | 11/2012 | Mullen et al. |
| 2012/0296826 A1 | 11/2012 | Bergdale et al. |
| 2012/0303528 A1 | 11/2012 | Weiner et al. |
| 2012/0316963 A1 | 12/2012 | Moshfeghi |
| 2012/0330764 A1 | 12/2012 | Nahidipour |
| 2012/0330844 A1 | 12/2012 | Kaufman |
| 2013/0030931 A1 | 1/2013 | Moshfeghi |
| 2013/0054016 A1 | 2/2013 | Canter et al. |
| 2013/0054336 A1 | 2/2013 | Graylin |
| 2013/0054395 A1 | 2/2013 | Cyr et al. |
| 2013/0067365 A1 | 3/2013 | Shrufi et al. |
| 2013/0085835 A1 | 4/2013 | Horowitz |
| 2013/0087050 A1 | 4/2013 | Studor et al. |
| 2013/0100886 A1 | 4/2013 | Cherian |
| 2013/0110296 A1 | 5/2013 | Khoo |
| 2013/0117490 A1 | 5/2013 | Harriman |
| 2013/0117738 A1 | 5/2013 | Livingston et al. |
| 2013/0124289 A1 | 5/2013 | Fisher |
| 2013/0126607 A1 | 5/2013 | Behjat |
| 2013/0143498 A1 | 6/2013 | Niemi |
| 2013/0166448 A1 | 6/2013 | Narayanan |
| 2013/0185150 A1 | 7/2013 | Crum |
| 2013/0191789 A1 | 7/2013 | Calman |
| 2013/0217333 A1 | 8/2013 | Sprigg et al. |
| 2013/0246171 A1 | 9/2013 | Carapelli |
| 2013/0246364 A1 | 9/2013 | Bhavith |
| 2013/0267121 A1 | 10/2013 | Hsu |
| 2013/0267176 A1 | 10/2013 | Hertel et al. |
| 2013/0275303 A1 | 10/2013 | Fiore |
| 2013/0275305 A1 | 10/2013 | Duplan |
| 2013/0278622 A1 | 10/2013 | Sun et al. |
| 2013/0282590 A1 | 10/2013 | Rajarethnam et al. |
| 2013/0297422 A1 | 11/2013 | Hunter et al. |
| 2013/0311379 A1 | 11/2013 | Smith |
| 2013/0311382 A1 | 11/2013 | Fosmark et al. |
| 2013/0331985 A1 | 12/2013 | Felique |
| 2013/0332293 A1 | 12/2013 | Ran |
| 2013/0346305 A1 | 12/2013 | Mendes |
| 2014/0006451 A1 | 1/2014 | Mullis et al. |
| 2014/0012414 A1 | 1/2014 | Pérez et al. |
| 2014/0019367 A1 | 1/2014 | Khan et al. |
| 2014/0025958 A1 | 1/2014 | Calman |
| 2014/0032410 A1 | 1/2014 | Georgiev et al. |
| 2014/0032413 A1 | 1/2014 | Low |
| 2014/0040028 A1 | 2/2014 | King et al. |

(56) References Cited

U.S. PATENT DOCUMENTS

| | | |
|---|---|---|
| 2014/0040117 A1 | 2/2014 | Jain |
| 2014/0052524 A1 | 2/2014 | Andersen |
| 2014/0052607 A1 | 2/2014 | Park |
| 2014/0064116 A1 | 3/2014 | Linde et al. |
| 2014/0067542 A1 | 3/2014 | Everingham |
| 2014/0074714 A1 | 3/2014 | Melone et al. |
| 2014/0074723 A1 | 3/2014 | Kamat |
| 2014/0085046 A1 | 3/2014 | Shin et al. |
| 2014/0085109 A1 | 3/2014 | Stefik |
| 2014/0089016 A1 | 3/2014 | Smullin |
| 2014/0100977 A1 | 4/2014 | Davis |
| 2014/0122298 A1 | 5/2014 | Oyer |
| 2014/0136301 A1 | 5/2014 | Valdes |
| 2014/0136411 A1 | 5/2014 | Cho |
| 2014/0143055 A1 | 5/2014 | Johnson |
| 2014/0143074 A1 | 5/2014 | Kolls |
| 2014/0143137 A1 | 5/2014 | Carlson |
| 2014/0172179 A1 | 6/2014 | Baudin |
| 2014/0180852 A1 | 6/2014 | Kamat |
| 2014/0108108 A1 | 7/2014 | Artman |
| 2014/0188708 A1 | 7/2014 | Govindarajan et al. |
| 2014/0201066 A1 | 7/2014 | Roux et al. |
| 2014/0249995 A1 | 9/2014 | Ogilvy |
| 2014/0278989 A1 | 9/2014 | Calman |
| 2014/0279008 A1 | 9/2014 | Calman |
| 2014/0279101 A1 | 9/2014 | Duplan et al. |
| 2014/0279426 A1 | 9/2014 | Holman et al. |
| 2014/0279537 A1 | 9/2014 | Cicoretti |
| 2014/0279556 A1 | 9/2014 | Priebatsch |
| 2014/0289047 A1 | 9/2014 | Yee |
| 2014/0317611 A1 | 10/2014 | Wojcik et al. |
| 2014/0324627 A1 | 10/2014 | Haver |
| 2014/0337235 A1 | 11/2014 | Van Heerden et al. |
| 2014/0351099 A1 | 11/2014 | Zhu |
| 2014/0361872 A1 | 12/2014 | Garcia et al. |
| 2014/0378057 A1 | 12/2014 | Ramon et al. |
| 2015/0006421 A1 | 1/2015 | Pearson |
| 2015/0051977 A1 | 2/2015 | Lyman |
| 2015/0073980 A1 | 3/2015 | Griffin et al. |
| 2015/0081462 A1 | 3/2015 | Ozvat et al. |
| 2015/0088698 A1 | 3/2015 | Ackerman |
| 2015/0100152 A1 | 4/2015 | Trevino et al. |
| 2015/0105901 A1 | 4/2015 | Joshi et al. |
| 2015/0120546 A1 | 4/2015 | Fernandes |
| 2015/0120555 A1 | 4/2015 | Jung |
| 2015/0149992 A1 | 5/2015 | Wade et al. |
| 2015/0154579 A1 | 6/2015 | Teicher |
| 2015/0169312 A1 | 6/2015 | Patel |
| 2015/0170131 A1 | 6/2015 | Patel |
| 2015/0170132 A1 | 6/2015 | Patel |
| 2015/0170136 A1 | 6/2015 | Patel |
| 2015/0178702 A1 | 6/2015 | Patel |
| 2015/0220381 A1 | 8/2015 | Horagan et al. |
| 2015/0235202 A1 | 8/2015 | Zabala |
| 2015/0278811 A1 | 10/2015 | Lalchandani |
| 2015/0287085 A1 | 10/2015 | Windmueller |
| 2015/0302377 A1 | 10/2015 | Sweitzer |
| 2015/0302411 A1 | 10/2015 | Bondesen et al. |
| 2015/0317720 A1 | 11/2015 | Ramaratnam |
| 2015/0332029 A1 | 11/2015 | Coxe |
| 2015/0346994 A1 | 12/2015 | Chanyontpatanakul |
| 2015/0373537 A1 | 12/2015 | Toksvig |
| 2015/0379491 A1 | 12/2015 | Ma et al. |
| 2016/0012465 A1 | 1/2016 | Sharp |
| 2016/0019604 A1 | 1/2016 | Kobayashi |
| 2016/0063476 A1 | 3/2016 | Baldie |
| 2016/0086145 A1 | 3/2016 | Tsutsui |
| 2016/0092859 A1 | 3/2016 | Klingen |
| 2016/0098690 A1 | 4/2016 | Silvia et al. |
| 2016/0132870 A1 | 5/2016 | Xu et al. |
| 2016/0196220 A1 | 7/2016 | Perez et al. |
| 2016/0232515 A1 | 8/2016 | Jhas |
| 2016/0292469 A1 | 10/2016 | Ianni |
| 2016/0335620 A1 | 11/2016 | Lyons et al. |
| 2016/0350744 A1 | 12/2016 | Tang et al. |
| 2017/0006656 A1 | 1/2017 | Nacer et al. |
| 2017/0193508 A1 | 1/2017 | Patel et al. |
| 2017/0193478 A1 | 7/2017 | Dhurka |
| 2017/0193479 A1 | 7/2017 | Kamat |
| 2017/0330164 A1 | 11/2017 | Suelberg et al. |
| 2018/0005220 A1 | 1/2018 | Laracey |
| 2018/0165908 A1 | 6/2018 | Patel et al. |
| 2018/0197167 A1 | 7/2018 | Ganesan et al. |
| 2018/0240096 A1 | 8/2018 | Patel |
| 2018/0276674 A1 | 9/2018 | Ramatchandirane et al. |
| 2018/0315271 A1 | 11/2018 | Gharabegian et al. |
| 2018/0374076 A1 | 12/2018 | Wheeler et al. |
| 2019/0236586 A1 | 8/2019 | Mei et al. |
| 2019/0244205 A1 | 8/2019 | Fieglein |
| 2019/0244465 A1 | 8/2019 | Saunders et al. |
| 2020/0387881 A1 | 12/2020 | Smith et al. |
| 2021/0012318 A1 | 1/2021 | Ducoulombier |
| 2021/0056552 A1 | 2/2021 | Murray |
| 2021/0158309 A1 | 5/2021 | Mcginlay et al. |
| 2021/0357932 A1 | 11/2021 | Patel |
| 2021/0375094 A1 | 12/2021 | Thomas et al. |
| 2022/0405733 A1 | 12/2022 | Yao et al. |
| 2023/0222506 A1 | 7/2023 | Patel et al. |
| 2023/0274274 A1 | 8/2023 | Patel |
| 2023/0289811 A1 | 9/2023 | Patel et al. |

FOREIGN PATENT DOCUMENTS

| | | |
|---|---|---|
| CN | 105139196 A | 12/2015 |
| CN | 106803175 A | 6/2017 |
| CN | 107480975 A | 12/2017 |
| CN | 207663510 U | 7/2018 |
| CN | 109389755 A | 2/2019 |
| CN | 108367497 B | 6/2021 |
| CN | 108352094 A | 9/2021 |
| EP | 1571607 A2 | 9/2005 |
| EP | 2061001 A1 | 5/2009 |
| EP | 3901880 A1 | 10/2021 |
| JP | H1125320 A | 1/1999 |
| JP | 2002-183812 A | 6/2002 |
| JP | 2003-242401 A | 8/2003 |
| JP | 2003-323662 A | 11/2003 |
| JP | 2004-252640 A | 9/2004 |
| JP | 2004310740 A | 11/2004 |
| JP | 2005-526325 T | 9/2005 |
| JP | 2009-25922 A | 11/2009 |
| JP | 2010528716 A | 8/2010 |
| JP | 4586607 B2 | 11/2010 |
| JP | 2012-504273 T | 2/2012 |
| KR | 20130138637 A | 12/2013 |
| WO | WO2003/098561 A1 | 11/2003 |
| WO | WO2006/020692 A2 | 2/2006 |
| WO | WO2007/015610 A1 | 2/2007 |
| WO | WO2008/083022 A1 | 7/2008 |
| WO | WO2008/083025 A2 | 7/2008 |
| WO | WO2008/083078 A2 | 7/2008 |
| WO | WO2008/083089 A1 | 7/2008 |
| WO | WO2008/083105 A2 | 7/2008 |
| WO | WO2008/083115 A1 | 7/2008 |
| WO | WO2008/083119 A1 | 7/2008 |
| WO | WO2009/070430 A2 | 6/2009 |
| WO | WO2013/132995 A1 | 9/2013 |
| WO | WO2013/177416 A2 | 11/2013 |
| WO | WO2014/093857 A1 | 6/2014 |
| WO | WO2016/123545 A1 | 8/2016 |
| WO | WO2016158748 A1 | 10/2016 |
| WO | WO2017/010936 A1 | 1/2017 |
| WO | WO2017010936 A1 | 1/2017 |
| WO | WO2017/143079 A1 | 8/2017 |

OTHER PUBLICATIONS

@RobocopyEs, posted Oct. 11, 2014, retrieved Feb. 13, 2018, <URL:https://twitter.com/robocopyes> 2 pgs.

Adams, How can stationary kiosks thrive in a mobile world?, Amerian Banker, 2012.

Balan et al., mFerio: the design and evaluation of a peer-to-peer mobile payment system, Jun. 2009, 14 pgs.

(56) References Cited

OTHER PUBLICATIONS

Balfe et al., e-EMV: emulating EMV for internet payments with trusted computing Technologies, Oct. 2008, 12 pgs.
Bing, Bing Images Search: "dongle", http://www.bing.com/images/search?q=dongle&FORM+HDRSC2, Dec. 5, 2013, 8 pgs.
Carlson, Specification, U.S. Appl. No. 60/871,898, filed Dec. 26, 2006, 169 pgs.
Frolick, Assessing M-Commerce Opportunities, Auerbach Publications Inc., Information Systems Management, Spring 2004.
Google, Chromecast, htttp://www.google.com/intl/devices/chromecast/, Dec. 12, 2013, 4 pgs.
How to Pay the New Way, youtube, Apr. 5, 2018, 4 pgs.
How will Apple's new mobile wallet Passbook impact other mobile wallets?, posted Jun. 13, 2012, retrieved Feb. 13, 2018 from <URL:https://www.quora.com/How-will-Apples-new-mobile-wallet-Passbook-impact-other-mobile-wallets>, 5 pgs.
Kadambi et al., Near-Field Communication-based Secure Mobile Payment Service, Aug. 2009, 10 pgs.
Madlmayr et al., Near Field Communication Based Mobile Payment System, Austrian Research Funding Agency, Project 811408, Mar. 6, 2008, 13 pgs.
Novotny, Applying RFID technology in the retail industru-benefits and concerns from the consumer's perspective, Institute of Economic Science, Eszterhazy Karoly College, Eger, Hungary, Retail Technologies for the 21 Century, innovation and competitiveness in the retail industry, 2015.
Nurel, Recent Developments in Wireless Network Systems, Izmir Institute of Technology, Sep. 2001, 280 pgs.
Patel, Office Action, U.S. Appl. No. 14/320,534, Mar. 2, 2018, 26 pgs.
Patel, Final Office Action, U.S. Appl. No. 14/320,534, Apr. 16, 2015, 21 pgs.
Patel, Final Office Action, U.S. Appl. No. 14/320,534, Nov. 30, 2016, 24 pgs.
Patel, Final Office Action, U.S. Appl. No. 14/321,717, Jun. 18, 2015, 22 pgs.
Patel, Final Office Action, U.S. Appl. No. 14/321,724, Oct. 8, 2015, 19 pgs.
Patel, Final Office Action, U.S. Appl. No. 14/321,724, Dec. 13, 2017, 22 pgs.
Patel, Final Office Action, U.S. Appl. No. 14/321,733, Nov. 14, 2014, 11 pgs.
Patel, Final Office Action, U.S. Appl. No. 14/335,762, Jun. 9, 2016, 15 pgs.
Patel, Final Office Action, U.S. Appl. No. 14/456,683, Jun. 8, 2015, 14 pgs.
Patel, Final Office Action, U.S. Appl. No. 14/458,192, Sep. 16, 2015, 26 pgs.
Patel, Final Office Action, U.S. Appl. No. 14/458,199, Jun. 24, 2015, 8 pgs.
Patel, Final Office Action, U.S. Appl. No. 14/641,236, Mar. 11, 2016, 16 pgs.
Patel, Final Office Action, U.S. Appl. No. 14/968,703, Feb. 12, 2019, 22 pgs.
Patel, Final Office Action, U.S. Appl. No. 15/435,228, Oct. 2, 2020, 24 pgs.
Patel, Final Office Action, U.S. Appl. No. 15/893,514, Jul. 22, 2021, 12 pgs.
Patel, Final Office Action, U.S. Appl. No. 15/956,741, Oct. 2, 2020, 12 pgs.
Patel, Notice of Allowance, U.S. Appl. No. 14/214,644, Jun. 10, 2014, 9 pgs.
Patel, Notice of Allowance, U.S. Appl. No. 14/321,733, Jun. 22, 2015, 8 pgs.
Patel, Notice of Allowance, U.S. Appl. No. 14/321,733, Feb. 27, 2015, 9 pgs.
Patel, Notice of Allowance, U.S. Appl. No. 14/335,762, Oct. 3, 2016, 7 pgs.
Patel, Notice of Allowance, U.S. Appl. No. 14/335,762, Mar. 30, 2015, 9 pgs.
Patel, Notice of Allowance, U.S. Appl. No. 14/456,683, Oct. 8, 2015, 15 pgs.
Patel, Notice of Allowance, U.S. Appl. No. 14/458,192, Oct. 12, 2017, 8 pgs.
Patel, Notice of Allowance, U.S. Appl. No. 14/458,199, Jan. 20, 2017, 9 pgs.
Patel, Notice of Allowance, U.S. Appl. No. 14/611,065, Mar. 26, 2018, 18 pgs.
Patel, Notice of Allowance, U.S. Appl. No. 14/614,336, Dec. 11, 2015, 8 pgs.
Patel, Notice of Allowance, U.S. Appl. No. 14/614,336, Nov. 25, 2015, 13 pgs.
Patel, Notice of Allowance, U.S. Appl. No. 14/968,703, Jun. 27, 2019, 10 pgs.
Patel, Notice of Allowance, U.S. Appl. No. 15/406,492, Mar. 11, 2020, 9 pgs.
Patel, Notice of Allowance, U.S. Appl. No. 15/435,228, Aug. 12, 2021, 9 pgs.
Patel, Notice of Allowance, U.S. Appl. No. 15/603,400, Dec. 18, 2019, 8 pgs.
Patel, Notice of Allowance, U.S. Appl. No. 15/603,400, Jun. 18, 2020, 5 pgs.
Patel, Notice of Allowance, U.S. Appl. No. 15/878,352, Oct. 23, 2020, 8 pgs.
Patel, Notice of Allowance, U.S. Appl. No. 16/029,483, Dec. 23, 2020, 21 pgs.
Patel, Notice of Allowance, U.S. Appl. No. 16/748,727, May 9, 2022, 16 pgs.
Patel, Notice of Allowance, U.S. Appl. No. 16/748,727, Jan. 20, 2022, 15 pgs.
Patel, Notice of Allowance, U.S. Appl. No. 16/750,477, Jan. 26, 2022, 14 pgs.
Patel, Notice of Allowance, U.S. Appl. No. 16/934,933, Mar. 31, 2021, 8 pgs.
Patel, Office Action, U.S. Appl. No. 14/320,534, Apr. 8, 2016, 21 pgs.
Patel, Office Action, U.S. Appl. No. 14/320,534, Oct. 29, 2014, 18 pgs.
Patel, Office Action, U.S. Appl. No. 14/321,717, Dec. 19, 2014, 16 pgs.
Patel, Office Action, U.S. Appl. No. 14/321,724, Mar. 13, 2017, 21 pgs.
Patel, Office Action, U.S. Appl. No. 14/321,724, May 15, 2015, 19 pgs.
Patel, Office Action, U.S. Appl. No. 14/321,733, Aug. 21, 2014, 9 pgs.
Patel, Office Action, U.S. Appl. No. 14/335,762, Dec. 10, 2014, 7 pgs.
Patel, Office Action, U.S. Appl. No. 14/335,762, Sep. 18, 2015, 13 pgs.
Patel, Office Action, U.S. Appl. No. 14/456,683, Jan. 2, 2015, 10 pgs.
Patel, Office Action, U.S. Appl. No. 14/458,192, Mar. 23, 2017, 26 pgs.
Patel, Office Action, U.S. Appl. No. 14/458,192, Jan. 30, 2015, 24 pgs.
Patel, Office Action, U.S. Appl. No. 14/458,199, Jan. 5, 2015, 7 pgs.
Patel, Office Action, U.S. Appl. No. 14/458,199, Mar. 28, 2016, 8 pgs.
Patel, Office Action, U.S. Appl. No. 14/611,065, Oct. 3, 2016, 19 pgs.
Patel, Office Action, U.S. Appl. No. 14/611,065, Jun. 13, 2017, 17 pgs.
Patel, Office Action, U.S. Appl. No. 14/614,336, May 27, 2015, 17 pgs.
Patel, Office Action, U.S. Appl. No. 14/641,236, Feb. 7, 2018, 19 pgs.
Patel, Office Action, U.S. Appl. No. 14/641,236, May 29, 2015, 10 pgs.
Patel, Office Action, U.S. Appl. No. 14/968,703, dated Aug. 7, 2018, 31 pgs.
Patel, Office Action, U.S. Appl. No. 15/406,492, Jul. 25, 2019, 16 pgs.

(56) References Cited

OTHER PUBLICATIONS

Patel, Office Action, U.S. Appl. No. 15/435,228, Mar. 26, 2020, 21 pgs.
Patel, Office Action, U.S. Appl. No. 15/603,400, Jun. 12, 2019, 10 pgs.
Patel, Office Action, U.S. Appl. No. 15/878,352, Jan. 24, 2020, 12 pgs.
Patel, Office Action, U.S. Appl. No. 15/893,514, Oct. 29, 2020, 17 pgs.
Patel, Office Action, U.S. Appl. No. 15/956,741, Apr. 22, 2020, 10 pgs.
Patel, Office Action, U.S. Appl. No. 15/956,741, Dec. 27, 2021, 10 pgs.
Patel, Office Action, U.S. Appl. No. 16/029,483, Apr. 27, 2020, 28 pgs.
Patel, Office Action, U.S. Appl. No. 16/681,673, Dec. 24, 2021, 20 pgs.
Patel, Office Action, U.S. Appl. No. 16/934,933, Oct. 28, 2020, 9 pgs.
Patel, Office Action, U.S. Appl. No. 17/216,399, Apr. 8, 2022, 14 pgs.
When the Future Feels Worse Than the Past: A Temporal Inconsistency in Moral Judgment, 15 pgs. (Year: 2010) https://citeseerx.ist.psu.edu/yiewdoc/ download?doi=10.1.1.675.3584&rep=rep1&type=pdf.
PayRange Inc., Communication Pursuant to Article 94(3), EP 14828617.2, Dec. 19, 2017, 6 pgs.
PayRange Inc., Communication Pursuant to Article 94(3), EP 16706931.9, Jun. 29, 2018, 8 pgs.
PayRange Inc., Communication Pursuant to Rules 161(1) and 162, EP 14828617.2, Sep. 21, 2016, 2 pgs.
PayRange Inc., Communication Pursuant to Rules 161(1) and 162, EP 16706931.9, Sep. 21, 2017, 2 pgs.
PayRange Inc., Communication under Rule 71(3) EPC, EP 14828617.2, Nov. 19, 2020, 7 pgs.
PayRange Inc., Communication under Rule 71(3) EPC, EP 17708929.9, Jun. 12, 2020, 7 pgs.
PayRange Inc., European Search Report, EP 20203134.0, Feb. 9, 2021, 7 pgs.
PayRange Inc., European Search Report, EP 21165692.1, Sep. 14, 2021, 10 pgs.
PayRange Inc., IPRP, PCT/US2014/071284, Jun. 21, 2016, 6 pgs.
PayRange Inc., IPRP, PCT/US2016/015763, Aug. 1, 2017, 7 pgs.
PayRange Inc., IPRP, PCT/US2017/015676, Jul. 31, 2018, 9 pgs.
PayRange Inc., IPRP, PCT/US2017/018194, Aug. 21, 2018, 17 pgs.
PayRange Inc., IPRP, PCT/US2019/060777, May 11, 2021, 7 pgs.
PayRange Inc., ISR/WO, PCT/US2014/071284, Mar. 25, 2015, 9 pgs.
PayRange Inc., ISR/WO, PCT/US2016/015763, Apr. 8, 2016, 9 pgs.
PayRange Inc., ISR/WO, PCT/US2017/015676, Apr. 18, 2017, 11 pgs.
PayRange Inc., ISR/WO, PCT/US2017/018194, Apr. 12, 2017, 10 pgs.
PayRange Inc., ISR/WO, PCT/US2019/060777, Feb. 6, 2020, 11 pgs.
PayRange Inc., ISR/WO, PCT/US2021/042632, Nov. 17, 2021, 11 pgs.
PayRange Inc., Notice of Reasons for Rejection, JP 2017-527886, Aug. 29, 2019, 10 pgs.
PayRange Inc., Notice of Reasons for Rejection, JP 2018-543707, Sep. 4, 2020, 4 pgs.
PayRange Inc., Notice of Reasons for Rejection, JP 2020-101558, Oct. 7, 2021, 2 pgs.
PayRange Inc., Summons to Attend Oral Proceedings, EP 14828617.2, Apr. 2, 2020, 12 pgs.
PayRange New Product Launch, posted at youtube.com Jun. 27, 2015, © 2016 YouTube, LLC, [online], [site visited Mar. 2, 2016]. Available from Internet, <URL: https://www.youtube.com/watch?v=NTvvV03XFeg., 1 pg.
Smart Vending Machine Demo at TechCrunch Disrupt 2013, posted at youtube.com Dec. 3, 2013, © 2016 YouTube, LLC, [online], [site visited Mar. 2, 2016]. Available from internet, URL: https://www.youtube.com/watch?v=XEz1H-gxLj8>.
Square Mobile Credit Card Processing for iPhone, iPod, iPad, posted at youtube.com, posting date Apr. 30, 2011, © 2016 YouTube, LLC, [online], [site visited Mar. 2, 2016]. Available from internet, <URL: https://www.youtube.com/watch?v=v6sKb3CFSKw>.
Raja, A Stochastic Game Theoretic Model for Expanding ATM Services. Https://ieeexplore.ieee.org/stamp/stamp.jsp?tp=&arnumber=7395687, 2015, 8 pgs.
Patel, Non-Final Office Action, U.S. Appl. No. 17/443,802, Dec. 23, 2022, 14 pgs.
Patel, Non-Final Office Action, U.S. Appl. No. 15/956,741, Feb. 27, 2023, 11 pgs.
Patel et al., U.S. Appl. No. 15/893,514, Notice of Allowance, Apr. 10, 2023, 13 pgs.
Heimerl et al., "Community sourcing: Engaging Local Crowds to Perform Expert Work Via Physical Kiosks", CHI '12: Proceedings of the SIGCHI Conference on Human Factors in Computing Systems, May 2012, pp. 1539-1548, 10 pgs. https://doi.org/10.1145/2207676.2208619.
Patel, Notice of Allowance, U.S. Appl. No. 17/443,802, Jun. 28, 2023, 8 pgs.
Patel et al., Notice of Allowance, U.S. Appl. No. 15/893,514, Jul. 12, 2023, 13 pgs.
Patel et al., Notice of Allowance, U.S. Appl. No. 17/973,506, Jul. 26, 2023, 13 pgs.
Katy Jacob, "Are mobile payments the smart cards of the aughts?", Scientific and Technical Information Center, Report Information from Dialog, Jul. 14, 2023—11:33, ProQuest, Publication Info: Chicago Fed Letter 240: 1-4. Federal Reserve Bank of Chicago. (Jul. 2007), 9 pgs.
Patel et al., Notice of Allowance, U.S. Appl. No. 17/963,170, Aug. 4, 2023, 16 pgs.
USA Technologies Announces Cashless Solution to Be Offered by Blackboard Inc., Scientific and Technical Information Center, Report Information from Dialog, Jul. 25, 2023, ProQuest, Publication Info: Business Wire Jul. 18, 2007: NA, 6 pgs.
Patel, Non-Final Office Action, U.S. Appl. No. 18/197,071, Aug. 16, 2023, 9 pgs.
Hossain et al., " Comprehensive Study of Bluetooth Signal Parameters for Localization", Department of Electrical & Computer EngineeringNational University of Singapore, 5 pgs. Email: {g0500774, weeseng}@nus.edu.sg,.
Hands-Free Profile 1.5, Doc. No. HFP1.5_SPEC, Nov. 25, 2005, 93 pgs.
DEX and MDB: A Primer For Vendors | Vending Market Watch, Feb. 7, 2008, 5 pgs. https://www.vendingmarketwatch.com/print/content/10272928.
MDB Protocol V4.2—Multi-Drop Bus—Internal Communication Protocol, MDB / ICP, Version 4.2, Feb. 2011, 313 pgs.
Gruber et al., "The Commodity Vending Machine", Forum Ware International 2005/02, 11 pgs.
Michael L. Kasavana, Innovative VDI Standards: Moving an Industry Forward, The Journal of International Management, vol. 4, No. 3, Dec. 2009, 10 pgs.
SDFL Administrative Order 2021-33, Apr. 6, 2021, 5 pgs.
The New York Times by David Poque, In Arrived of 2 iPhones, 3 Lessons, Sep. 17, 2013, 4 pgs. https://www./nytime.com/2013/09/18/technology/personaltech/In-Arrived-of-2-iPhones-3-Lessons.html.
Cnet, John Thompson, How to use S Beam on your Samsung Galaxy S3, Jun. 21, 2012, 5 pgs. https://www.cnet.com/how-to/how-to-use-s-beam-on-your-samsung-galaxy-s3/.
iPhone, User Guide For iOS 6.1 Software, 156 pgs.
Apple Reports Fourth Quarter Results, Oct. 28, 2013, 4 pgs.
Apple Announces iPhone 5s—The Most Forward—Thinking Smartphone in the World, Sep. 10, 2013, 5 pgs.
cNet, by Marguerite Reardon, Motion sensing comes to mobile phones, Jun. 11, 2007, 4 pgs.
Multi-Drop Bus—Internal Communication Protocol, MDB / ICP, Version 3, Mar. 26, 2003, 270 pgs.

(56) References Cited

OTHER PUBLICATIONS

Weidong Kou, Payment Technologies for E-Commerce, University of Hong Kong Pokfulam Road, Hong Kong, ACM Subject Classification (1998): H.4, K.4.4, J.1, 339 pgs.

Specification for RFID Air Interface, EPC™ Radio-Frequency Identity Protocols, Class-1 Generation-2 UHF RFID, Protocol for Communications at 860 MHz—960 MHz, Version 1.2.0, EPCglobal Inc., Oct. 23, 2008, 108 pgs.

Patel, Notice of Allowance, U.S. Appl. No. 17/443,802, Nov. 1, 2023, 8 pgs.

Patel et al., Notice of Allowance, U.S. Appl. No. 15/893,514, Nov. 8, 2023, 13 pgs.

Kevin Werbach et al., "Contracts Ex Machina", Articles, Faculty Scholarship, University of Michigan Law School, The University of Michigan Law School Scholarship Repository, (Year: 2017), 71 pgs. https://repository.law.umich.edu/cgi/viewcontent.cgi?article=2936&context=articles.

Patel, Non-Final Office Action, U.S. Appl. No. 17/968,672, Dec. 15, 2023, 14 pgs.

Patel, Non-Final Office Action, U.S. Appl. No. 17/973,505, Dec. 15, 2023, 14 pgs.

Patel, Notice of Allowance, U.S. Appl. No. 18/197,070, Dec. 20, 2023, 10 pgs.

"Mobile payment heads to the U.S.", Mobile Internet 6.10:1. Information Gatekeepers, Inc. (Oct. 2004), 2 pgs.

"During the period 2005 to 2009, the total number of wireless data connections used for retail applications in Europe can be expected to rise from less than 1 million to around 3 million", M2 PressWire, Feb. 28 (Year: 2006), 3 pgs.

Baier et al., "Principles of Model Checking", The MIT Press Cambridge, Massachusetts, London, England, 2008, 994 pgs.

Patel et al., Notice of Allowance, U.S. Appl. No. 17/973,506, Dev. 7, 2023, 11 pgs.

Bailey, Mobile-phone payment option gains ground, Dialog, STIC, Report Information from Dialog, Nov. 29, 2023, 6 pgs.

Patel, Non-Final Office Action, U.S. Appl. No. 17/973,507, Jan. 26, 2024, 9 pgs.

Patel, Notice of Allowance, U.S. Appl. No. 15/956,741, Jan. 18, 2024, 18 pgs.

IEEE Standard for Information technology - Telecommunication and information exchange between systems - Local and metropolitan area networks—Specific requirements, Part 15.4: Wireless Medium Access Control (MAC) and Physical Layer (PHY) Specifications for Low-Rate Wireless Personal Area Networks (LR-WPANs), IEEE, The Institute of Electrical and Electronics Engineers, Inc., 3 Park Avenue, New York, NY 10016-5997, USA, Oct. 1, 2003, 679 pgs.

Patel et al., Notice of Allowance, U.S. Appl. No. 17/963,170, Dec. 12, 2023, 11 pgs.

Slick self-service options: as staffing remains lean grocers are using advanced self-service checkouts and kiosks to augment customer service, Dialog, STIC, Report Information from Dialog, Nov. 30, 2023, 8 pgs.

Patel, Notice of Allowance, U.S. Appl. No. 18/197,071, Jan. 26, 2024, 10 pgs.

\* cited by examiner

| Tab | Favorite? | Alert | View to User |
|---|---|---|---|
| All | Yes | No | User can make Hands-free Credit with the connected vending machine |
| All | No | Yes | User needs to launch Mobile Device and then swipe to make transaction manually |
| Favorite | Yes | No | Hands-free transaction will be available to the user via vending machine |
| Favorite | No | No | User is not alerted for the vending machine which is not a favorite machine. Hands-free mode will not work, manual swipe for transaction required by user |
| Either All or Favorite | Yes | Yes | BUT Hands-free Credit is not available (disabled by module, expired AuthGrant, insufficient balance, or other issue), then user will get an alert so that user can swipe credit manually. |

Figure 3

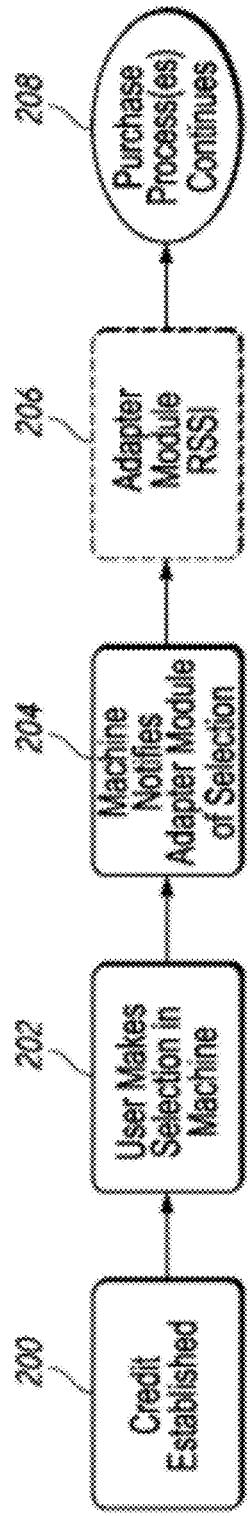

Figure 4

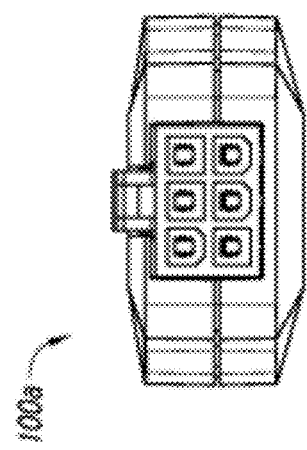
Figure 16
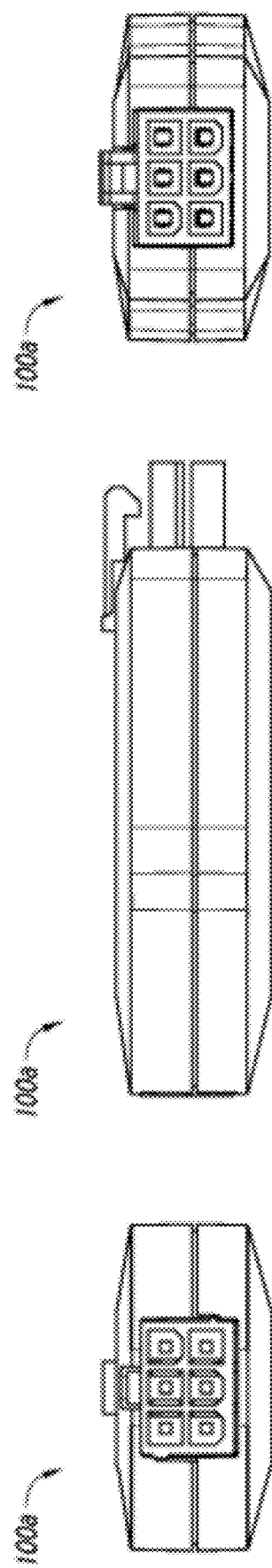
Figure 14
Figure 15
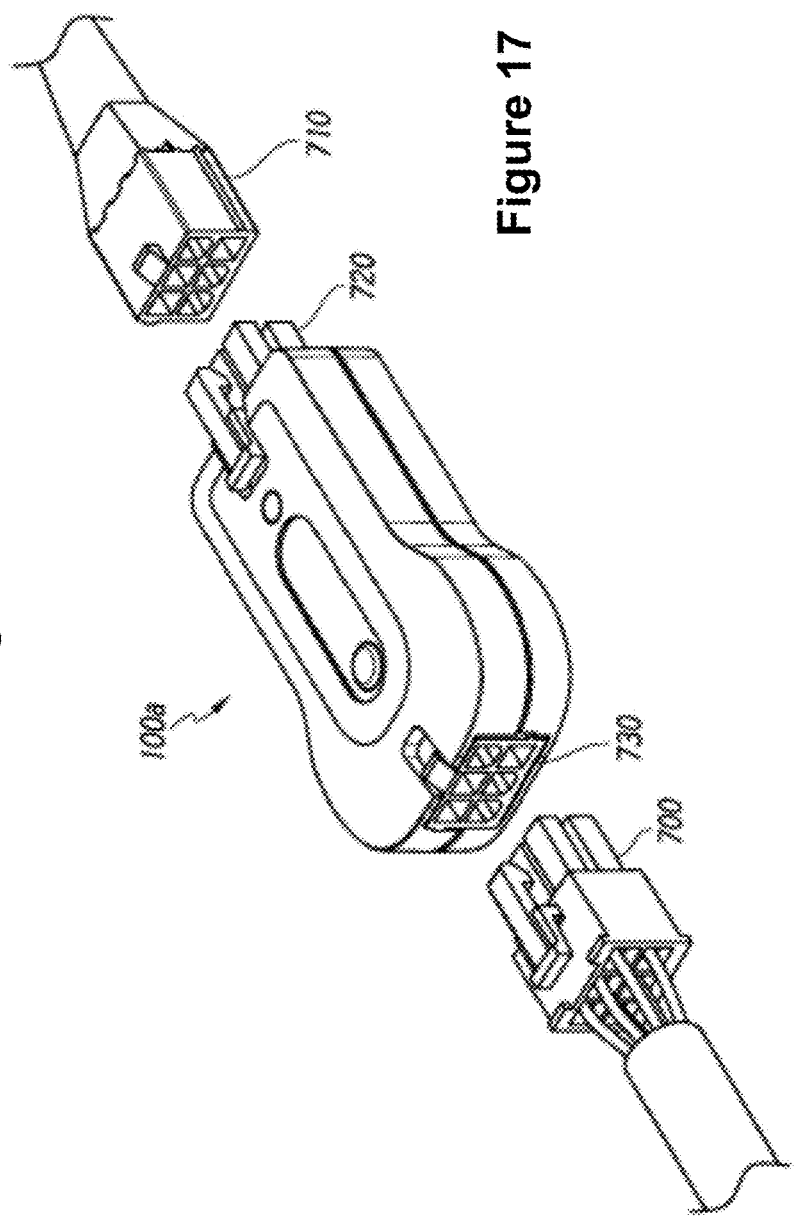
Figure 17

1400

```
At a mobile device with one or more processors, memory, one or more output      ~1402
devices, and two or more communication capabilities:

After sending a request to a payment module via a first communication
capability transaction to initiate a transaction with a payment accepting unit
associated with the payment module, obtain a notification from the payment
module via the first communication capability, wherein the notification
indicates an event at the payment accepting unit associated with the payment
module
```

The first communication capability corresponds to a short-range ~1404
    communication protocol In response to obtaining the notification, provide a representation of the ~1406
notification to a user of the mobile device via the one or more output devices of
the mobile device The one or more output devices of the mobile device include at least one ~1408
    of: a display, one or more speaker, one or more LEDs, and a vibration
    mechanism The representation of the notification is at least one of: ~1410
        A message displayed on the display of the mobile device;
        A banner notification displayed on a display of the mobile device;
        A vibration alert from the vibration mechanism of the mobile device;
        An aural alert from the one or more speakers of the mobile device; and
        A visual alert from the one or more LEDs of the mobile device

The notification indicates abortion of a transaction initiated by the user of the ~1412
mobile device

Figure 27A

SYSTEMS AND METHODS FOR DETERMINING ELECTRIC PULSES TO PROVIDE TO AN UNATTENDED MACHINE BASED ON REMOTELY-CONFIGURED OPTIONS

PRIORITY CLAIM AND RELATED APPLICATIONS

This application is a continuation of U.S. patent application Ser. No. 17/529,111, filed Nov. 17, 2021, which is a continuation of U.S. patent application Ser. No. 15/435,228, filed Feb. 16, 2017 and issued as U.S. Pat. No. 11,205,163 on Dec. 21, 2021, which claims priority to U.S. Provisional Application No. 62/296,543, filed Feb. 17, 2016. U.S. patent application Ser. No. 15/435,228 is also a continuation-in-part of U.S. patent application Ser. No. 14/458,192, filed Aug. 12, 2014 and issued as U.S. Pat. No. 9,875,473 on Jan. 23, 2018, which is a continuation-in-part of U.S. patent application Ser. No. 14/456,683, filed Aug. 11, 2014 and issued as U.S. Pat. No. 9,256,873 on Feb. 9, 2016, which is a continuation of U.S. patent application Ser. No. 14/335,762, filed Jul. 18, 2014 and issued as U.S. Pat. No. 9,547,859 on Jan. 17, 2017, which is a continuation of U.S. patent application Ser. No. 14/214,644, filed Mar. 14, 2014 and issued as U.S. Pat. No. 8,856,045 on Oct. 7, 2014, which claims priority to U.S. Provisional Patent Application No. 61/917,936, filed Dec. 18, 2013. U.S. patent application Ser. No. 14/214,644 is also a continuation-in-part of U.S. Design patent application No. 29/477,025, filed Dec. 18, 2013 and issued as U.S. Pat. No. D755,183 on May 3, 2016. Each of the aforementioned patent applications is hereby incorporated by reference in its entirety.

FIELD OF THE INVENTION

The present application relates to the field of providing electric pulses at unattended machines, and in particular, to determining electric pulses to provide to an unattended machine based on remotely-configured options.

BACKGROUND OF THE INVENTION

Electric pulse-based credit machines are one type of "payment accepting unit" or "unattended machine" (unattended machines or payment accepting units are also referred to herein generically as "machines"). An unattended machine is equipment that requires payment for the dispensing of products (e.g., items stocked by a vending machine) and/or services (e.g., video game plays).

A consumer using an electric pulse-based credit machine such as a video game, kiddie ride, or coin-op laundry is restricted to a predefined default amount per payment increment as established by the machine (i.e., a direct mapping of coins that are inserted to credits validated by the machine). For example, if one credit allowed the user to play one game, the user would need to send 3 credits (i.e., insert 3 coins into the machine) if they wished to play three games.

Because the pricing options are predefined and physically programmed into the machine, machine operators are unable to offer up-front discounts, time-based discounts, or other options that allow the machine operators to flexibly control available pricing options. In addition, users are unable to take advantage of promotions and have to keep inserting coins into the unattended machines according to existing options.

SUMMARY

Disclosed herein are systems and methods that address the above deficiencies. In particular, disclosed herein are systems and methods for determining electric pulses to provide to an unattended machine based on remotely configured options. For example, a machine operator is able to access a web-based interface in order to add or modify pricing options for a particular unattended machine. When a user later receives an authorization grant for the particular unattended machine, that user is able to take advantage of the new or modified pricing options. In this way, machine operators can establish pricing schedules and users can take advantage of unique promotions offered by the machine operators. Additionally, users need not constantly add individual coins in order to access services provided by an unattended machine, instead the users can simply and easily take advantage of the unique promotions via an application that is executing on their own mobile phone (thus avoiding inefficiencies, such as lost coins, jammed coins, broken coin-accepting interfaces, and other like difficulties often encountered at unattended machines).

In addition to vending machines, other unattended machines include: parking meters, toll booths, laundromat washers and dryers, a video gaming console (i.e., a coin-operated arcade game), a coin-operated pool table, a coin-operated dart machine, a coin-operation vacuum or air pump (such as those commonly found at gas stations), or other offline-payment operated machines that dispense goods (e.g., products stocked by a vending machine) and/or provide services (e.g., allow a user to use the services, such as playing a video game, using the washer or dryer, etc.)

(A1) In one aspect, a method of determining electric pulses to provide to an unattended machine based on remotely-configured options for the unattended machine is provided. The method is performed at an application executing on a mobile device. The method includes: detecting, based on a broadcast received from a pulse-providing device that is coupled with the unattended machine, presence of the unattended machine in proximity to the mobile device. After detecting the presence of the unattended machine, the method includes: receiving, from a server (in some instances, the server is not capable of communicating directly with the unattended machine, because the unattended machine does not have a network connection), information about a first set of remotely-configured options for interacting with the unattended machine. In response to receiving the information about the first set of remotely-configured options, the method includes: displaying, in the application, user interface objects that allow for selection of respective options in the first set of remotely-configured options. The method further includes: detecting a selection of a first user interface object that corresponds to a first option in the first set of remotely-configured options. After (or in response to) detecting the selection of the first user interface object, the method includes: receiving, from the server, information that includes an authorization grant for the first option at the unattended machine, the information including specifications regarding electric pulses to be provided to the unattended machine by the pulse-providing device in accordance with the first option. In accordance with a determination that a trigger condition has been satisfied, the method includes: sending the information that includes the authorization grant and the specifications to the pulse-providing device. After sending the authorization grant and the pulse information to the pulse-providing device, receiving an indication, from the pulse-providing device, that the electric pulses were provided to the unattended machine according to the specifications.

(A2) In accordance with some implementations of the method of A1, the remotely-configured options are pricing options.

(A3) In accordance with some implementations of the method of any one of A1-A2, the remotely-configured options are pricing options that are determined according to a predefined pricing schedule.

(A4) In accordance with some implementations of the method of A3, the predefined pricing schedule is determined based on a current time of day at the server.

(A5) In accordance with some implementations of the method of any one of A1-A4, the remotely-configured options are configured by an operator of the unattended machine without requiring any physical interactions with the unattended machine.

(A6) In accordance with some implementations of the method of any one of A1-A5, the method further includes: receiving an indication from the server that the remotely-configured options are no longer current; and in response to receiving the indication from the server, receiving an updated set of remotely-configured pricing options that is distinct from the first set of remotely-configured pricing options.

(A7) In some implementations, a mobile device is also provided. The mobile device includes one or more processors and memory storing one or more programs to be executed by the one or more processors, the one or more programs including instructions for performing the method of any one of A1-A6.

(A8) In some implementations, a non-transitory computer readable storage medium is also provided. The non-transitory computer readable storage medium stores one or more programs, the one or more programs including instructions, which, when executed by a mobile device with one or more processors, cause the mobile device to perform the method of any one of A1-A6.

(A9) In some implementations an additional method is provided. The additional method is for determining electric pulses to provide to an unattended machine based on remotely-configured options for the unattended machine, and the method is performed at a pulse-providing device that is coupled with the unattended machine. The method includes: receiving, from an application executing on a mobile device, an authorization grant that includes specifications regarding electric pulses to be provided to the unattended machine by the pulse-providing device in accordance with a pricing option selected by a user at the application executing on the mobile device, wherein the pricing option is specific to the unattended machine. In response to receiving the authorization grant, the method includes: determining whether the authorization grant is valid. In accordance with a determination that the authorization grant is valid, the method includes: providing electric pulses to the unattended machine according to the specifications. After providing the electric pulses to the unattended machine, the method includes: sending, to the application executing on the mobile device, an indication that the electric pulses were provided to the unattended machine according to the specifications.

(A10) In some implementations of the method of A9, the pricing option is not available to users that interact with the unattended machine via mechanical insertion of coins.

(A11) In some implementations, a pulse-providing device is provided. The pulse-providing device includes: one or more processors and memory storing one or more programs to be executed by the one or more processors, the one or more programs including instructions for performing the method of any one of A9-A10.

(A12) In some implementations, a non-transitory computer readable storage medium is provided. The non-transitory computer readable storage medium stores one or more programs, the one or more programs including instructions, which, when executed by a pulse-providing device with one or more processors, cause the pulse-providing device to perform the method of any one of A9-A10.

(A13) Some implementations also provide for a system for determining electric pulses to provide to an unattended machine based on remotely-configured options for the unattended machine. The system includes: a pulse-providing device that is coupled with the unattended machine, wherein the pulse-providing device is configured to: perform operations described in the method of any one of A9-A10; an application that is executing on a mobile device, wherein the application is configured to: perform operations described in the method of any one of A1-A6; and a server that is in communication with the application that is executing on the mobile device, wherein the server is configured to: perform operations including retrieving specifications for electric pulses that are associated with selected pricing options and sending those retrieve specifications to the mobile device.

In another aspect, a method of presenting representations of payment accepting unit events is performed at a device (e.g., the mobile device 150, FIGS. 5 and 21) with one or more processors, memory, one or more output devices, and two or more communication capabilities. After sending a request to a payment module (e.g., the adapter module 100, FIGS. 5 and 20), via a first communication capability (e.g., a short-range communication technology/protocol such as BLE), to initiate a transaction with a payment accepting unit (e.g., the payment accepting unit 120, FIGS. 5 and 19) (sometimes also herein called "machine 120") associated with the payment module, the method includes obtaining a notification from the payment module via the first communication capability, where the notification indicates an event at the payment accepting unit associated with the payment module. In response to obtaining the notification, the method includes providing a representation of the notification to a user of the mobile device via the one or more output devices of the mobile device (e.g., a message displayed on a display of the mobile device, a vibration produced by a vibration mechanism of the mobile device, an aural alert produced by a speaker of the mobile device, and/or the like).

In one more aspect, a method of retrofitting an offline-payment operated machine to accept electronic payments is performed at a payment module (e.g., the adapter module 100, FIGS. 5 and 20) with one or more processors, memory, a short-range communication capability (e.g., a short-range communication technology/protocol such as BLE), and a first interface module configured to couple the payment module with a control unit of an offline-payment operated machine (e.g., the payment accepting unit 120, FIGS. 5 and 19) (sometimes also herein called "machine 120"). The method includes receiving a transaction request via the short-range communication capability from a respective mobile device to perform a transaction with the offline-payment operated machine. The method includes validating the transaction request, where validation of the transaction request indicates that the respective mobile device is authorized to initiate payment for the transaction by a remote server (e.g., the server 130, FIGS. 5 and 22) via the long-range communication capability (e.g., the long-range communication technology/protocol such as GSM, CDMA, or Wi-Fi). In accordance with a determination that the transaction request is valid, the method includes causing the offline-payment operated machine to perform the requested transaction by issuing a signal to perform the transaction to the control unit of the offline-payment operated machine via the first interface module.

In a further aspect, a device (e.g., the machine 120, (FIGS. 5 and 19), the adapter module 100 (FIGS. 5 and 20), the mobile device 150 (FIGS. 5 and 21), the server 130 (FIGS. 5 and 22), or a combination thereof) includes one or more processors and memory storing one or more programs for execution by the one or more processors, the one or more programs include instructions for performing, or controlling performance of, the operations of any of the methods described herein. In some implementations, a non-transitory computer readable storage medium storing one or more programs, the one or more programs comprising instructions, which, when executed by a device (e.g., the machine 120, (FIGS. 5 and 19), the adapter module 100 (FIGS. 5 and 20), the mobile device 150 (FIGS. 5 and 21), the server 130 (FIGS. 5 and 22), or a combination thereof) with one or more processors, cause the computer system to perform, or control performance of, the operations of any of the methods described herein. In some implementations, a device (e.g., the machine 120, (FIGS. 5 and 19), the adapter module 100 (FIGS. 5 and 20), the mobile device 150 (FIGS. 5 and 21), the server 130 (FIGS. 5 and 22), or a combination thereof) includes means for performing, or controlling performance of, the operations of any of the methods described herein.

The subject matter described herein is particularly pointed out and distinctly claimed in the concluding portion of this specification. Objectives, features, combinations, and advantages described and implied herein will be more readily understood upon consideration of the following detailed description of the invention, taken in conjunction with the accompanying drawings.

BRIEF DESCRIPTION OF THE DRAWINGS

FIG. 3 is a table that illustrates the hands-free credit or alert user principle in accordance with some implementations.

FIG. 4 is a flow chart showing the logging received signal strength indicator (RSSI) information in accordance with some implementations.

FIG. 14 is a side view of the in-line dongle adapter module of FIG. 11 in accordance with some implementations.

FIG. 15 is a first end view of a connector receptacle of the in-line dongle adapter module of FIG. 11 in accordance with some implementations.

FIG. 16 is a second end view of a connector receptacle of the in-line dongle adapter module of FIG. 11 in accordance with some implementations.

FIG. 17 is a perspective view taken from the first end of the in-line dongle adapter module of FIG. 11, the connectors and cables between which the in-line dongle adapter module is inserted being shown in broken lines for illustrative purposes in accordance with some implementations.

FIGS. 27A-27B illustrate a flowchart diagram of a method of presenting representations of payment accepting unit events in accordance with some implementations.

Like reference numerals refer to corresponding parts throughout the several views of the drawings.

DETAILED DESCRIPTION OF THE INVENTION

Figure 2:
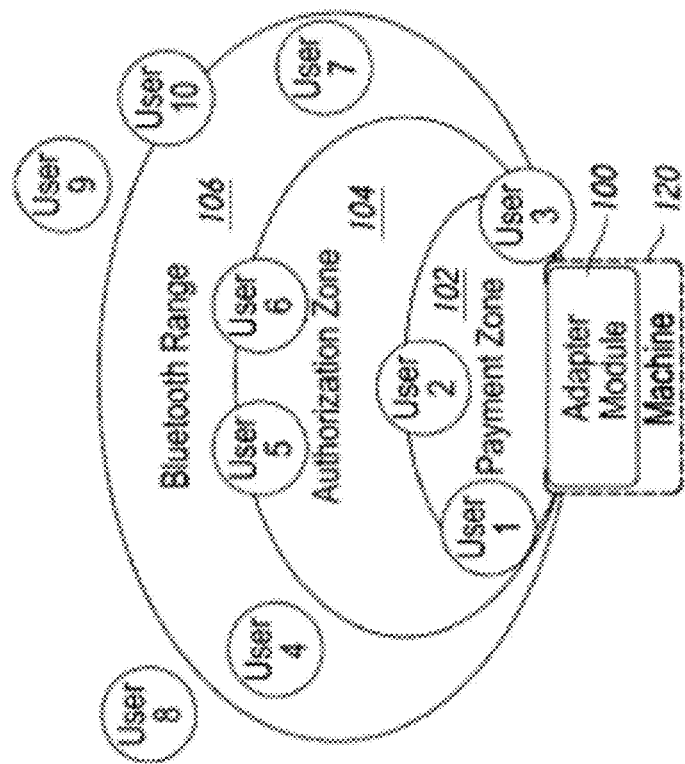
FIG. 2 is a schematic diagram that shows the three zones of FIG. 1 with multiple users therein in accordance with some implementations.

Disclosed herein is a payment processing system or, more specifically, a mobile-device-to-machine payment processing system for processing transactions over a non-persistent network connection. The mobile-device-to-machine payment processing system disclosed herein focuses on the unattended retail space (e.g., a payment accepting unit 120, sometimes also herein called a "machine 120"). More specifically, the mobile-device-to-machine payment processing system disclosed herein allows a user (having a mobile device 150 with a mobile application 140 thereon) to make a cashless purchase from a payment accepting unit 120 (having an adapter module 100 associated therewith).

The mobile-device-to-machine payment processing system described herein can be implemented with one or more of the following features: easy installation feature, a non-persistent network connection feature; a manual (swipe to pay) mode feature; a hands-free mode feature; and a multiple vending transactions (multi-vend) feature.

Easy Installation: Installation is very easy, requires no tools, requires no configuration, and takes as little as 30 seconds. This is accomplished by using an adapter module 100 (sometimes also herein called "payment module 100") such as an in-line dongle (a hardware device with software thereon) design for in-line insertion within a multi-drop bus (MDB) of a payment accepting unit 120 (e.g., a vending machine) (sometimes also herein called 'the machine 120"). Installation is as simple as "powering down" (turning off) the machine 120, identifying the "wire" that connects with a payment receiving mechanism (e.g., the coin mechanism), disconnecting the wire (so that there are two loose ends, such as a male connection end or adapter of an MDB and a female connection end or adapter of an MDB), plugging (inserting) the adapter module 100 in serial ("in-line") with the wire (e.g., connecting the MDB female adapter to a male adapter of the adapter module 100 and connecting the MDB male adapter to a female adapter of the adapter module 100), tucking the wire and the installed adapter module 100 back into position, and "powering up" (turning on) the machine 120. Most vending machines made since 1995 have this industry standard MDB technology that would allow this easy 30-second installation. On machines without MDB technology, the adapter module 100 can be configured or designed to work with other serial protocols or activate a switch. In essence the adapter module 100 simulates establishing payment on payment accepting unit 120 in much the same manner as other alternative forms of payment (e.g., cash).

Non-persistent Network Connection: Although payment accepting units (or "machines") that accept only cash (e.g., paper currency and coins) may not require a connection (persistent or non-persistent) to a network, traditional payment accepting units that accept cashless payments (e.g., credit cards, debit cards, and alternative mobile device payment methods using, for example, smart phones) require a persistent connection to a network (wired or wireless) to facilitate the cashless payments. In other words, without a persistent (ongoing or accessible on demand) network connection, traditional payment accepting units cannot accept cashless payments. Most traditional payment accepting units that accept cashless payments include the technology to accomplish this persistent network connection that allows them to connect to a remote server. If the network connection to a traditional machine is temporarily interrupted, cashless payments will be temporarily unavailable. If the machine is located in a location where no network connection is available, cashless payments is not possible. In addition to using a mobile device 150 as an intermediary between the payment accepting units 120 and the server 130, the mobile-device-to-machine payment processing system described herein minimizes (i.e., the manual mode) or eliminates (i.e., the hands-free mode) user interaction with the mobile device 150. Further, in some implementations, the mobile-device-to-machine payment processing system described herein facilitates the acceptance of cashless payments without requiring any network connection near the payment accepting unit 120. In some implementations, when the mobile-device-to-machine payment processing system described herein is located in a remote location where network connection is unavailable, the mobile-device-to-machine payment processing system, therefore, can still accept cashless payments.

Manual (Swipe-to-Pay) Mode: Using a "swipe-to-pay" feature (or just "swipe") refers to a user's action implemented on his/her mobile device 150 where he/she quickly brushes his/her finger (or other pre-determined interaction) on the mobile device's touch screen 152 (FIGS. 10A-10D) or other input devices associated with the mobile device 150. From the user's perspective, when the user is within range, a pre-installed mobile application 140 automatically connects to the payment accepting unit 120 (e.g., a vending machine). The mobile application 140 might display (on the touch screen 152) a prepaid balance that the user "swipes" to transfer payment to the payment accepting unit 120. The user could observe the transferred funds on the touch screen 152 of the mobile device 150 and/or on the display 122, 124 (FIG. 19) of the payment accepting unit 120. The transaction is completed just as if cash was inserted in the machine 120 with the user inputting his selection on the payment accepting unit 120 and the payment accepting unit 120 dispensing the product or service. After the selection is made, the change is returned to the mobile device 150 and this may be shown on the touch screen 152 of the mobile device 150.

Hands-Free Mode: A "hands-free pay" feature (or just "hands-free") would most likely be used with "favorite" payment accepting units 120 (e.g., a frequently used vending machine at a user's work or school). From the user's perspective, he/she would approach the favorite payment accepting unit 120 and notice that the display 122, 124 (FIG. 19) of the payment accepting unit 120 shows funds available, he/she would select the product or service using the payment accepting unit's input mechanisms (e.g., buttons 126 or a touch screen display 124 shown in FIG. 19), and he/she would retrieve dispensed services or products. It would be that simple. More specifically, when the user is within range, a pre-installed mobile application 140 automatically connects to the payment accepting unit 120 (e.g., a vending machine). The user may leave the mobile device 150 in a pocket, purse, briefcase, backpack, or other carrier. As the user approaches the payment accepting unit 120 and is in approximately "arm's-length" distance (e.g., 3 to 5 feet) of the payment accepting unit 120, the user could observe the transferred funds on the display 122, 124 (FIG. 19) of the payment accepting unit 120. The transaction is completed just as if cash was inserted into the payment accepting unit 120 with the user inputting his/her selection on the payment accepting unit 120 and the payment accepting unit 120 dispensing the product or service. After the selection is made, the change is returned to the mobile device 150. FIG. 3 details when the hands-free mode would be available.

Multiple Vending Transactions (Multi-Vend): Both the manual and hands-free modes could be used multiple times in sequence (implemented, for example, as a loop) so that a user may make multiple purchases. After making his/her first selection and receiving his product (or service), the user would observe that additional funds were available on the display 122, 124 (FIG. 19) on the payment accepting unit 120. He/she could make another selection (or multiple selections) and receive additional product(s) (or service(s)). More specifically, the display 122, 124 (FIG. 19) may reset as if the transaction is complete, but then, because the user is still standing in range, the mobile application 140 would send another credit to the payment accepting unit 120, allowing for a second purchase. When the user walks away, the system clears (e.g., returns unused funds to the application 140 on the mobile device 150).

The features described above, alone or in combination with other features described herein will revolutionize the hundred billion dollar automated retail industry. The hardware is very low cost and there are no reoccurring fees because no cellular connection is required on the machine 120. Using the mobile-device-to-machine payment processing system described herein, operators of machines 120 can increase frequency of visits by purchasers and items sold with each visit.

The mobile-device-to-machine payment processing system described herein may be implemented as an apparatus, system, and/or method for enabling payments to a machine 120 via a mobile device 150. The mobile-device-to-machine payment processing system may be better understood with reference to the drawings, but the shown mobile-device-to-machine payment processing system is not intended to be of a limiting nature.

Definitions

Before describing the mobile-device-to-machine payment processing system and the figures, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

Figure 1:
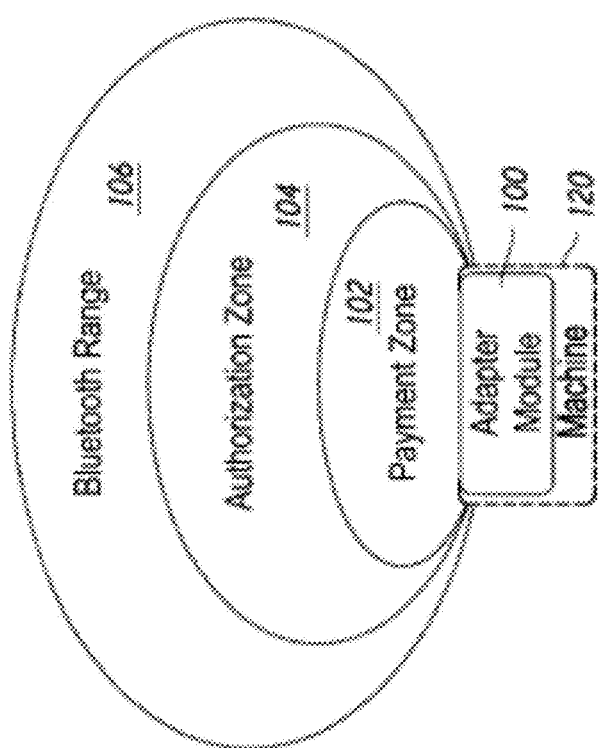
FIG. 1 is a schematic diagram that shows three zones: a "communication zone" (e.g., Bluetooth range), an "authorization zone," and a "payment zone" in accordance with some implementations.
Figure 20:
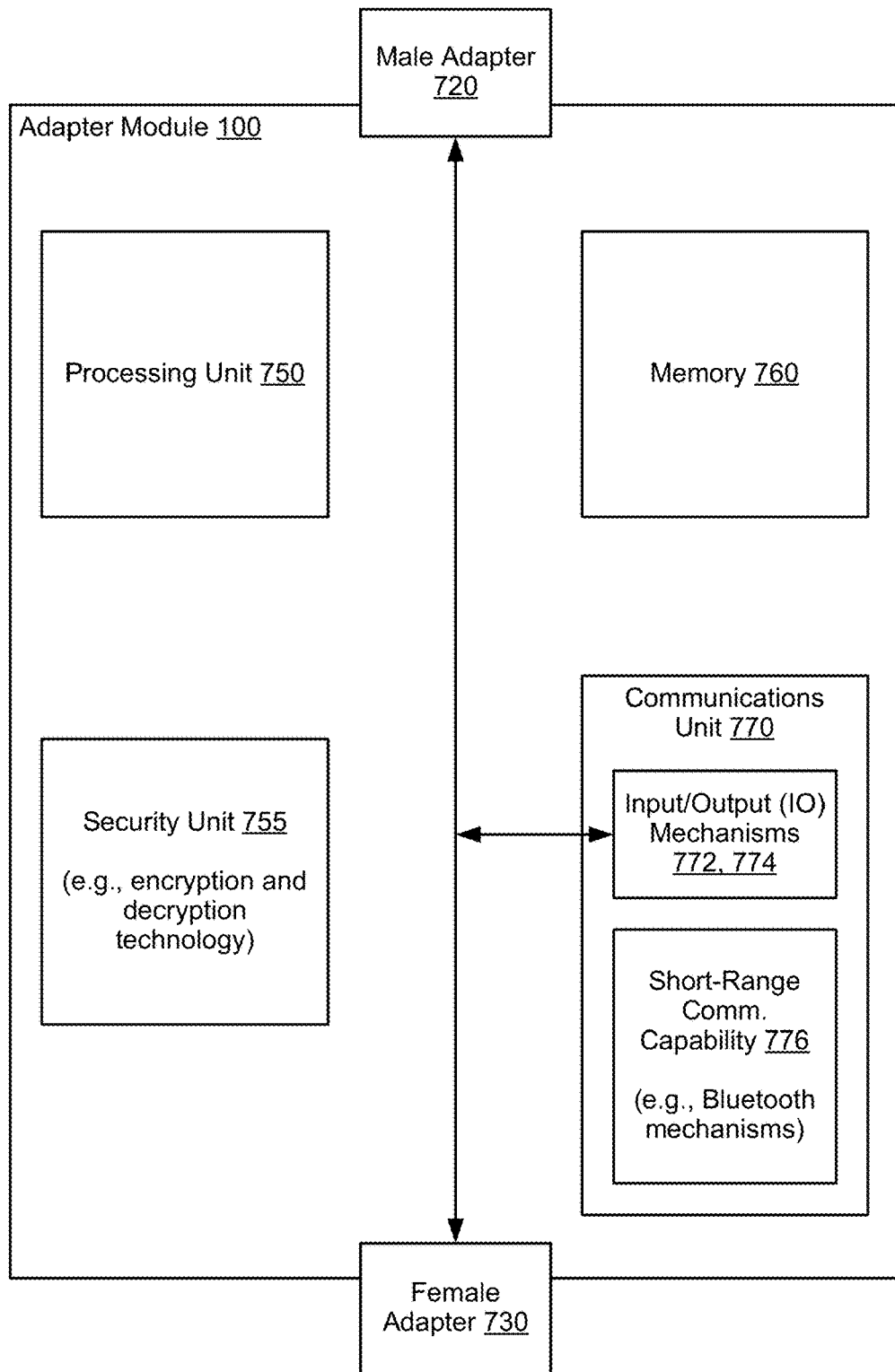
FIG. 20 is a block diagram of an adapter module in accordance with some implementations.

Adapter Module 100: As shown in FIGS. 1 and 2, the adapter module 100 (sometimes also herein called the "payment module 100") is a physical device that is installed in a machine 120 (a payment accepting unit 120). The shown adapter module 100 is an in-line dongle (a hardware device with software thereon) device that may be inserted in-line within a multi-drop bus (MDB) of a machine 120. The adapter module 100 bridges the communication between the machine 120 and a mobile device 150. Although described as a unique component, it should be noted that the adapter module 100 could be implemented as a plurality of devices or integrated into other devices (e.g., components of a machine 120). In its unique component form, the adapter module 100 can be easily inserted into a machine 120 so that the machine 120 is able to perform new features with the assistance of the adapter module 100. FIG. 20 shows components associated with the adapter module 100. As shown in FIG. 20, the communications unit 770 of the adapter module 100 includes short-range communication capability 776 (e.g., Bluetooth mechanisms). The shown example may be divided into multiple distinct components that are associated with each other or the example may be incorporated into or drawn from other technology (e.g., a computer or a payment accepting unit) as long as the components are associated with each other.

Figure 21:
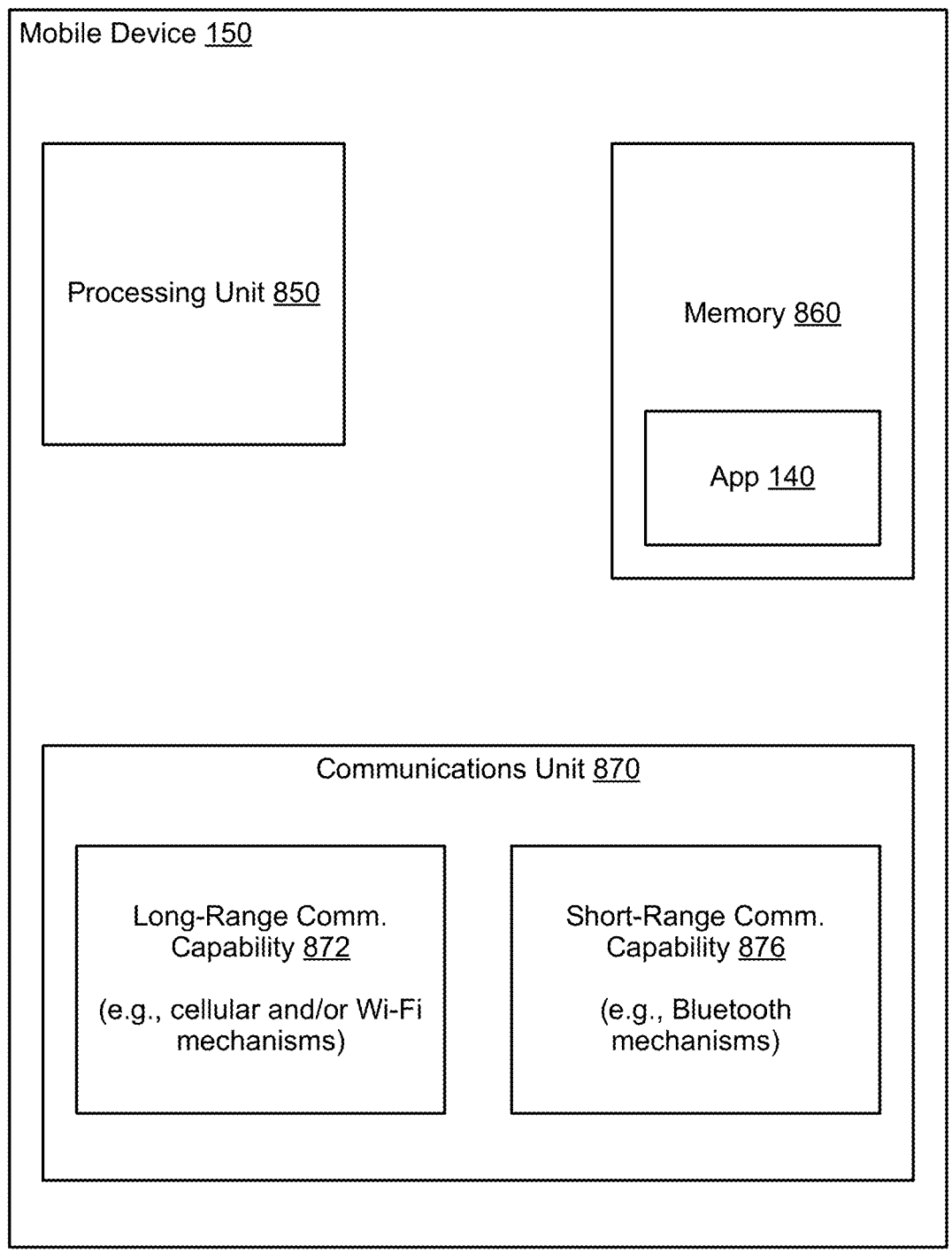
FIG. 21 is a block diagram of a mobile device in accordance with some implementations.

Mobile Device 150 and Application 140 (also referred to as a "mobile application," "mobile app," or "app"): In general, a mobile device 150 may be a user's personal mobile device 150. The mobile device 150 (with a mobile application 140 thereon) acts as a communication bridge between the adapter module 100 (associated with a payment accepting unit 120) and the server 130. The mobile device 150 and the application 140, however, are not "trusted" in that the communications (transmissions) it passes are encrypted. Encrypted (secured) communications are undecipherable (unencryptable, unreadable, and/or unusable) by the mobile device 150. This keeps the communications passed between the adapter module 100 and the server 130 secured and safe from hacking. Mobile devices include, but are not limited to smart phones, tablet or laptop computers, or personal digital assistants (PDAs), smart cards, or other technology (e.g., a hardware-software combination) known or yet to be discovered that has structure and/or capabilities similar to the mobile devices described herein. The mobile device 150 preferably has an application (e.g., the application 140) running on it. The term "app" is used broadly to include any software program(s) capable of implementing the features described herein. FIGS. 10A-10D show user interfaces for the application 140 displayed by the mobile device 150. It should be noted that the phrase "mobile device" can be assumed to include the relevant app unless specifically stated otherwise. Similarly, it should be noted that an "app" can be assumed to be running on an associated mobile device unless specifically stated otherwise. FIG. 21 shows components associated with the mobile device 150. The shown example may be divided into multiple distinct components that are associated with each other or the example may be incorporated into or drawn from other technology (e.g., the cell phone itself) as long as the components are associated with each other.

Payment accepting unit 120 (or Machine 120): A payment accepting unit 120 (or the machine 120) is equipment that requires payment for the dispensing of an product and/or service. Payment accepting units 120 may be vending machines, parking meters, toll booths, laundromat washers and dryers, arcade games, kiosks, photo booths, toll booths, transit ticket dispensing machines, and other known or yet to be discovered payment accepting units 120. Some payment accepting units 120 can accept cashless payments (payments other than cash (paper currency and coins)) by accepting payment from, for example, credit cards, debit cards, and mobile devices.

Network Connections: For purposes of this discussion, a persistent network connection is a wired or wireless communications connection that is ongoing (e.g., a dedicated connection, a dedicated online connection, and/or a hard-wired connection) or accessible on demand (e.g., the ability for the machine to make a temporary connection to a server or the ability for the user to contact a server from his mobile device). Typically the persistent network connection has been conducted over "long-range communication technology" or "long-range communication protocol" (e.g., hard-wired, telephone network technology, cellular technology (e.g., GSM, CDMA, or the like), Wi-Fi technology, wide area network (WAN), local area network (LAN), or any wired or wireless communication technology over the Internet that is known or yet to be discovered). Traditionally, machines that accept payment other than cash require a persistent (ongoing or accessible on demand) connection to a network to facilitate payment. This is true for machines that accept, for example, credit cards and debit cards. The payment accepting units 120 described herein do not require a traditional persistent network connection. The user's mobile device 150 acts as a communication bridge between the adapter module 100 and the server 130. Communications between user mobile devices 150 and the servers (e.g., a system management server 130 and/or a funding source server 160) take place using long-range communication technology. Communications between user mobile devices 150 and the adapter module 100 of the payment accepting unit 120 take place using "short-range communication technology" or "short-range communication protocol" (e.g., Bluetooth (such as Bluetooth 4.0, Bluetooth Smart, Bluetooth Low Energy (BLE)), near-field communication (NFC), Ultra Wideband (UWB), radio frequency identification (RFID), infrared wireless, induction wireless, or any wired or wireless technology that could be used to communicate a small distance (approximately a hundred feet or closer) that is known or yet to be discovered). Therefore, neither the adapter module 100 nor the payment accepting unit 120 requires a traditional persistent long-range wireless network connection. The communications technology shown in the figures may be replaced with alternative like communications technology and, therefore, specific shown communications technologies are not meant to be limiting. For example, Wi-Fi technology could be replaced with another long-range communication technology.

Figure 22:
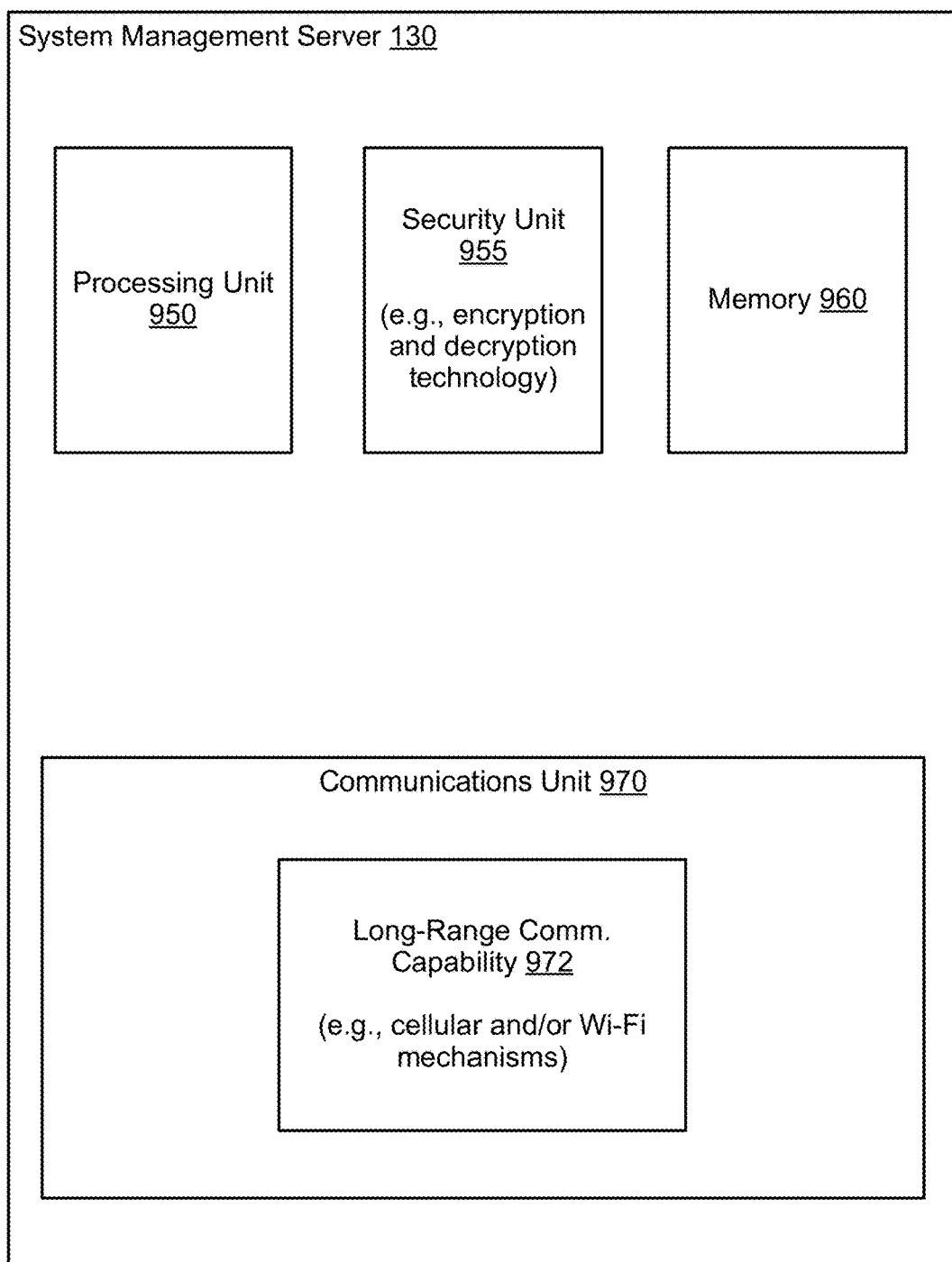
FIG. 22 is a block diagram of a server in accordance with some implementations.

Server: A server is the host processing server that may be operated by the company running the payment processing system. For each user, the server 130 preferably maintains at least one "virtual wallet" having at least one "balance" (which can be $0) of designated funds for which the server 130 keeps an accounting. The balance may represent, for example, "cash" or it may be a "promotional value" that represents funds that may be spent under certain circumstances. If these funds begin to be depleted, the user may be notified (e.g., via the application 140 on the mobile device 150) that additional funds need to be designated and/or transferred. Alternatively, funds from other sources (e.g., the funding source server 160) may be automatically transferred to restore a predetermined balance. The balance may also be increased based on a promotion (e.g., points earned or coupons). As shown in FIG. 22, the server includes appropriate processors 950, memory 960 (which would keep an accounting of the user's balance in a manner similar to a gift card), and communication systems 970. As shown in FIG. 22, the communications unit 970 of the server 130 includes long-range communication capability 972 (e.g., cellular technology and/or Wi-Fi mechanisms). The server 130 also includes a security unit 955 for encrypting and decrypting messages. The server 130 receives an authorization request (sometimes also herein called an "AuthRequest") from the adapter module 100 (via a mobile device 150) and, if funds are available, returns an authorization grant (sometimes also herein called an "AuthGrant" or an "authorization grant token") for funds. FIG. 22 shows components associated with the server 130. The shown example may be divided into multiple distinct components that are associated with each other or the example may be incorporated into or drawn from other technology (e.g., a computer or a main frame) as long as the components are associated with each other.

Advertise Presence: Each adapter module 100 advertises its presence by broadcasting signals (advertising broadcast signals) to mobile devices in the zones 102, 104, 106. Each adapter module 100 can listen to other adapter modules' advertisements.

Received Signal Strength Indicator (RSSI): The adapter module 100 may have a self-calibrating signal strength to determine zone thresholds (e.g., a payment zone threshold and an authentication zone threshold). At the time the user selects an item (product or service) from the payment accepting unit 120, the Received Signal Strength Indicator (RSSI) is logged. At this moment, it is presumed the user is within "arm's-length" (which may be a predetermined length approximating the distance of a user standing in front of a machine for the purpose of making a purchase) from the payment accepting unit 120. A mathematical computation (i.e., In-Range Heuristics) is conducted to derive the optimal RSSI threshold at which point payment should be triggered by an application 140 on a mobile device 150. The threshold may be payment accepting unit specific and can vary over a period of time. This optimal zone threshold is preferably reported to the mobile device 150 during an initial handshake.

In-Range Heuristics: A mathematical computation that determines the RSSI threshold to determine when a user is in the authorization zone 104 and/or the payment zone 102. This computation can take into consideration numerous historical data points as well as transaction specific information such as which the mobile device 150 is being used, payment accepting unit type, among other factors. Preferably the RSSI is logged while the user is making his selection (this is the one time in the entire process that the user definitely will be "in range" (e.g., they will be arm's length from the machine 120 because they are physically interacting with the machine 120). The type of user mobile device 150, accelerometer data (e.g., is the user moving or stationary), and/or other information may also be logged while the user is making his selection. The adapter module 100 can give a reference RSSI for the payment zone 102 for the machine 120, and the application 140 can make a +/− adjustment based on the specific mobile device 150 on which it is installed. Over a period of time, the payment processing system continues to improve itself based on additional data points.

Authorization Request ("AuthRequest:): When a user enters the authorization zone 104, the mobile device 150 notifies the adapter module 100 and the adapter module 100 sends a secured authorization request (e.g., the encrypted authorization request) as a "message" (also referred to as a communication or transmissions) to the server 130 via the mobile device 150. Encryption may be performed by a security unit 755 (FIG. 20) with security technology (e.g., encryption and decryption means) that may be associated with the processing unit 750 and/or the memory 760. Significantly, the AuthRequest is a request for authorization of funds, not a request for authorization of a transaction. The purpose of the funds is irrelevant to the server 130.

Authorization Grant Token ("AuthGrant"): This is a "message" (also referred to as a communication or transmissions) encrypted by the security unit 955 (FIG. 22) with security technology (e.g., encryption and decryption means) of the server 130 with the unique private key corresponding to the adapter module 100. The secured authorization grant (e.g., the encrypted authorization grant) is passed from the server 130 to the adapter module 100 via the mobile device 150 in the form of a message. The mobile device 150, however, is not able to decrypt and/or read the message. The authorization grant is in response to the authorization request. The amount of the funds granted by the AuthGrant may be determined by factors including, but not limited to, the amount of funds available (or, if funds are not available, a mini-loan could be granted), a pre-authorized amount (e.g., set by the server, set by the user during set-up, set by the funding source, or a standard amount), limited by time (e.g., only a certain amount per hour, or a predetermined amount at specific times of the day), limited to the maximum amount of an item on the machine (or enough for two or three items in the machine), or one or more of these and other factors. Significantly, the AuthGrant makes the funds available, but does not authorize a transaction. The AuthGrant may have an associated expiration period in that it may expire if it is not used in a pre-determined time period. The length of time before the AuthGrant expires may be determined by factors including, but not limited to, the trustworthiness of the user (e.g., the user has a long history with the payment processing system or some known provider (e.g., credit card provider, bank, or credit union), the user has a good credit rating, or the user has a large wallet balance), a pre-authorized time period (e.g., set by the server, set by the user during set-up, set by the funding source, or a standard time period), limited by time (e.g., predetermined time periods at specific times of the day such as longer times during breakfast, lunch, and dinner), limited by the machine or the products or services sold in the machine, limited by the number of other users near the machine (e.g., if it is a crowded machine, the AuthGrant may expire faster), or one or more of these and other factors. The AuthGrant remains valid until it expires or some other event occurs to end its validity (e.g., the user cancels it). This means that under normal circumstances the mobile device 150 will hold the AuthGrant authorizing use of funds for a pre-determined time period that will allow the user sufficient time to make a purchase. The authorized amount may be considered to be the "wallet balance" that is held in a virtual "wallet."

Synchronization: Time may be synchronized to the adapter module 100 from the server 130. The server 130 sends time information with encrypted messages and the adapter module 100 uses the time encoded in the messages for synchronization.

The mobile-device-to-machine payment processing system and components thereof may have associated hardware, software, and/or firmware (a variation, subset, or hybrid of hardware and/or software). The term "hardware" includes at least one "processing unit," "processor," "computer," "programmable apparatus," and/or other known or yet to be discovered technology capable of executing instructions or steps (shown as the processing unit 750 in FIG. 20, the processing unit 850 in FIG. 21, and the processing unit 950 in FIG. 22). The term "software" includes at least one "program," "subprogram," "series of instructions," or other known or yet to be discovered hardware instructions or hardware-readable program code. Software may be loaded onto hardware (or firmware) to produce a "machine," such that the software executes on the hardware to create structures for implementing the functions described herein. Further, the software may be loaded onto the hardware (or firmware) so as to direct the mobile-device-to-machine payment processing system (and components thereof) to function in a particular manner described herein or to perform a series of operational steps as described herein. "Hardware" such as the adapter module 100, the mobile device 150, and the payment accepting unit 120 may have software (e.g., programs and apps) loaded thereon. The phrase "loaded onto the hardware" also includes being loaded into memory (shown as the memory 760 in FIG. 20, the memory 860 in FIG. 21, and the memory 960 in FIG. 22)

associated with or accessible by the hardware. The term "memory" is defined to include any type of hardware (or other technology)-readable media (also referred to as computer-readable storage medium) including, but not limited to, attached storage media (e.g., hard disk drives, network disk drives, servers), internal storage media (e.g., RAM, ROM, EPROM, FLASH-EPROM, or any other memory chip or cartridge), removable storage media (e.g., CDs, DVDs, flash drives, memory cards, floppy disks, flexible disks), firmware, and/or other known or yet to be discovered storage media. Depending on its purpose, the memory may be transitory and/or non-transitory. Appropriate "messages," "communications," "signals," and/or "transmissions" (that includes various types of information and/or instructions including, but not limited to, data, commands, bits, symbols, voltages, currents, electromagnetic waves, magnetic fields or particles, optical fields or particles, and/or any combination thereof) over appropriate "communication paths," "transmission paths," and other means for signal transmission including any type of connection between two elements on the payment processing system (e.g., the adapter module 100, the mobile device 150, the payment accepting unit 120, hardware systems and subsystems, and memory) would be used as appropriate to facilitate controls and communications.

It should be noted that the terms "programs" and "subprograms" are defined as a series of instructions that may be implemented as software (i.e. computer program instructions or computer-readable program code) that may be loaded onto a computer to produce a "machine," such that the instructions that execute on the computer create structures for implementing the functions described herein or shown in the figures. Further, these programs and subprograms may be loaded onto a computer so that they can direct the computer to function in a particular manner, such that the instructions produce an article of manufacture including instruction structures that implement the function specified in the flow chart block or blocks. The programs and subprograms may also be loaded onto a computer to cause a series of operational steps to be performed on or by the computer to produce a computer implemented process such that the instructions that execute on the computer provide steps for implementing the functions specified in the flow chart block or blocks. The phrase "loaded onto a computer" also includes being loaded into the memory of the computer or a memory associated with or accessible by the computer. Separate, albeit interacting, programs and subprograms may be associated with the adapter modules 100, the server 130, and the mobile device 150 (including the mobile application 140) and these programs and subprograms may be divided into smaller subprograms to perform specific functions.

The terms "messages," "communications," "signals," and/or "transmissions" include various types of information and/or instructions including, but not limited to, data, commands, bits, symbols, voltages, currents, electromagnetic waves, magnetic fields or particles, optical fields or particles, and/or any combination thereof. Appropriate technology may be used to implement the "communications," "signals," and/or "transmissions" including, for example, transmitters, receivers, and transceivers. "Communications," "signals," and/or "transmissions" described herein would use appropriate technology for their intended purpose. For example, hard-wired communications (e.g., wired serial communications) would use technology appropriate for hard-wired communications, short-range communications (e.g., Bluetooth) would use technology appropriate for close communications, and long-range communications (e.g., GSM, CDMA, Wi-Fi, or the like) would use technology appropriate for remote communications over a distance. Appropriate security (e.g., SSL or TLS) for each type of communication is included herein. The security units 755 and 955 include technology for securing messages. The security technology may be, for example, encryption/decryption technology (e.g., software or hardware). Although encryption/decryption is discussed primarily as being performed using a unique private key, alternative strategies include, but are not limited to encryption/decryption performed using public/private keys (i.e., asymmetric cryptography), or other encryption/decryption strategies known or yet to be discovered. Appropriate input mechanisms and/or output mechanisms, even if not specifically described, are considered to be part of the technology described herein. The communications unit 770 (shown in FIG. 20) of the adapter module 100 is shown as including appropriate input and output mechanisms 772, 774 that may be implemented in association (e.g., directly or indirectly in functional communication) with male and female adapters 720, 730 of the adapter module 100. The communications unit 870 (shown in FIG. 21) of the mobile device 150 includes mechanisms for both long-range communications (shown as the long-range communication capability 872 such as cellular and/or Wi-Fi mechanisms) for communicating with the server 130 and short-range communications (shown as the short-range communication capability 876 such as Bluetooth mechanisms) for communicating with the adapter module 100.

When used in relation to "communications," "signals," and/or "transmissions," the terms "provide" and "providing" (and variations thereof) are meant to include standard means of provision including "transmit" and "transmitting," but can also be used for non-traditional provisions as long as the "communications," "signals," and/or "transmissions" are "received" (that can also mean obtained). The terms "transmit" and "transmitting" (and variations thereof) are meant to include standard means of transmission, but can also be used for non-traditional transmissions as long as the "communications," "signals," and/or "transmissions" are "sent." The terms "receive" and "receiving" (and variations thereof) are meant to include standard means of reception, but can also be used for non-traditional methods of obtaining as long as the "communications," "signals," and/or "transmissions" are "obtained."

Figure 19:
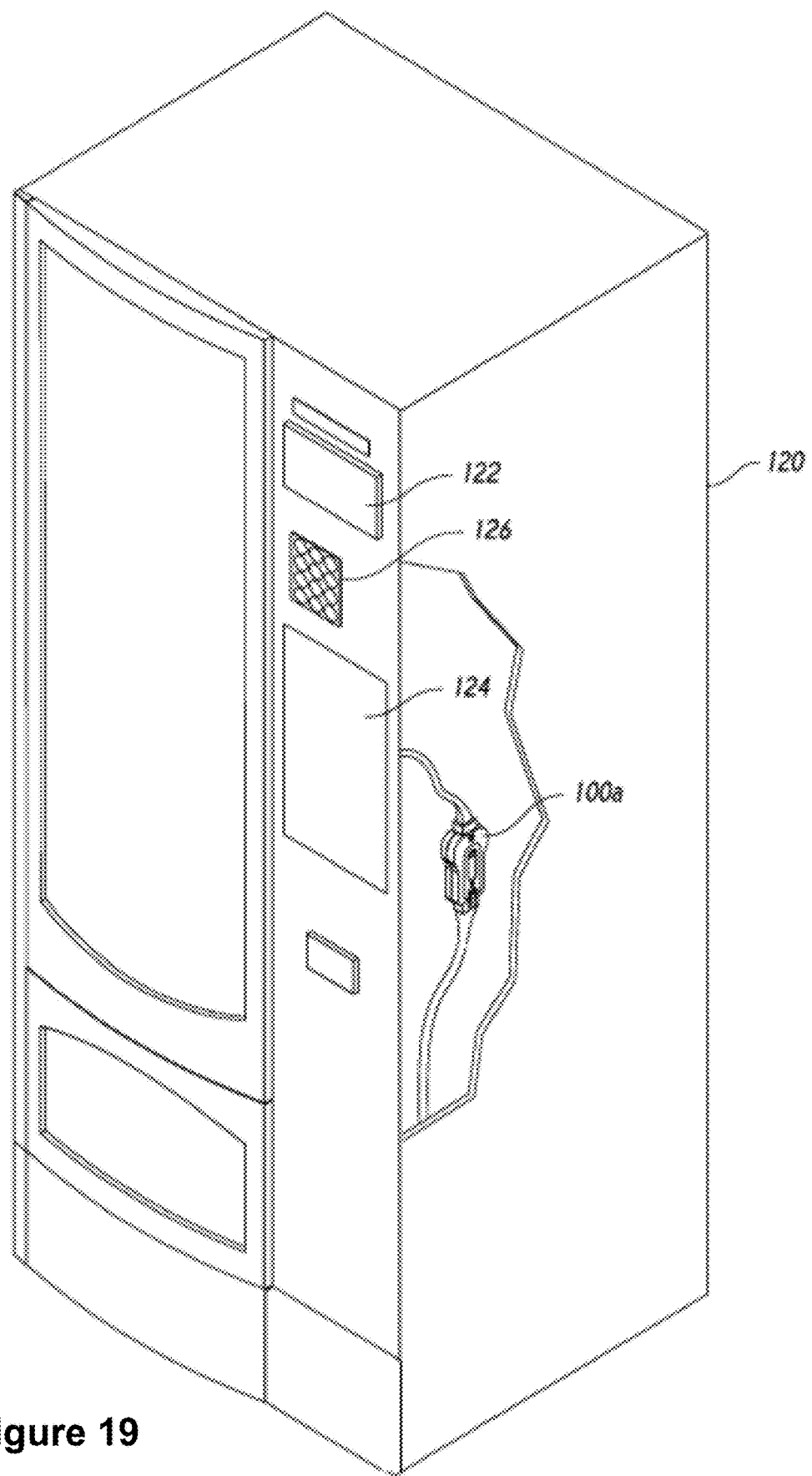
FIG. 19 is a perspective view of the in-line dongle adapter module of FIG. 11 within a vending machine in accordance with some implementations.

The term "associated" is defined to mean integral or original, retrofitted, attached, connected (including functionally connected), positioned near, and/or accessible by. For example, if the user interface (e.g., a traditional display 122 (FIG. 19), a touch screen display 124 (FIG. 19), a key pad 126 (FIG. 19), buttons 126 (FIG. 19, shown as part of the key pad 126), a keyboard (not shown), and/or other input or output mechanism) is associated with a payment accepting unit 120, the user interface may be original to the payment accepting unit 120, retrofitted into the payment accepting unit 120, attached to the payment accepting unit 120, and/or a nearby the payment accepting unit 120. Similarly, adapter modules 100 may be associated with payment accepting units 120 in that the adapter modules 100 may be original to the payment accepting unit 120, retrofitted into the payment accepting unit 120, attached to the payment accepting unit 120, and/or a nearby the payment accepting unit 120.

System Overview

Figure 5:
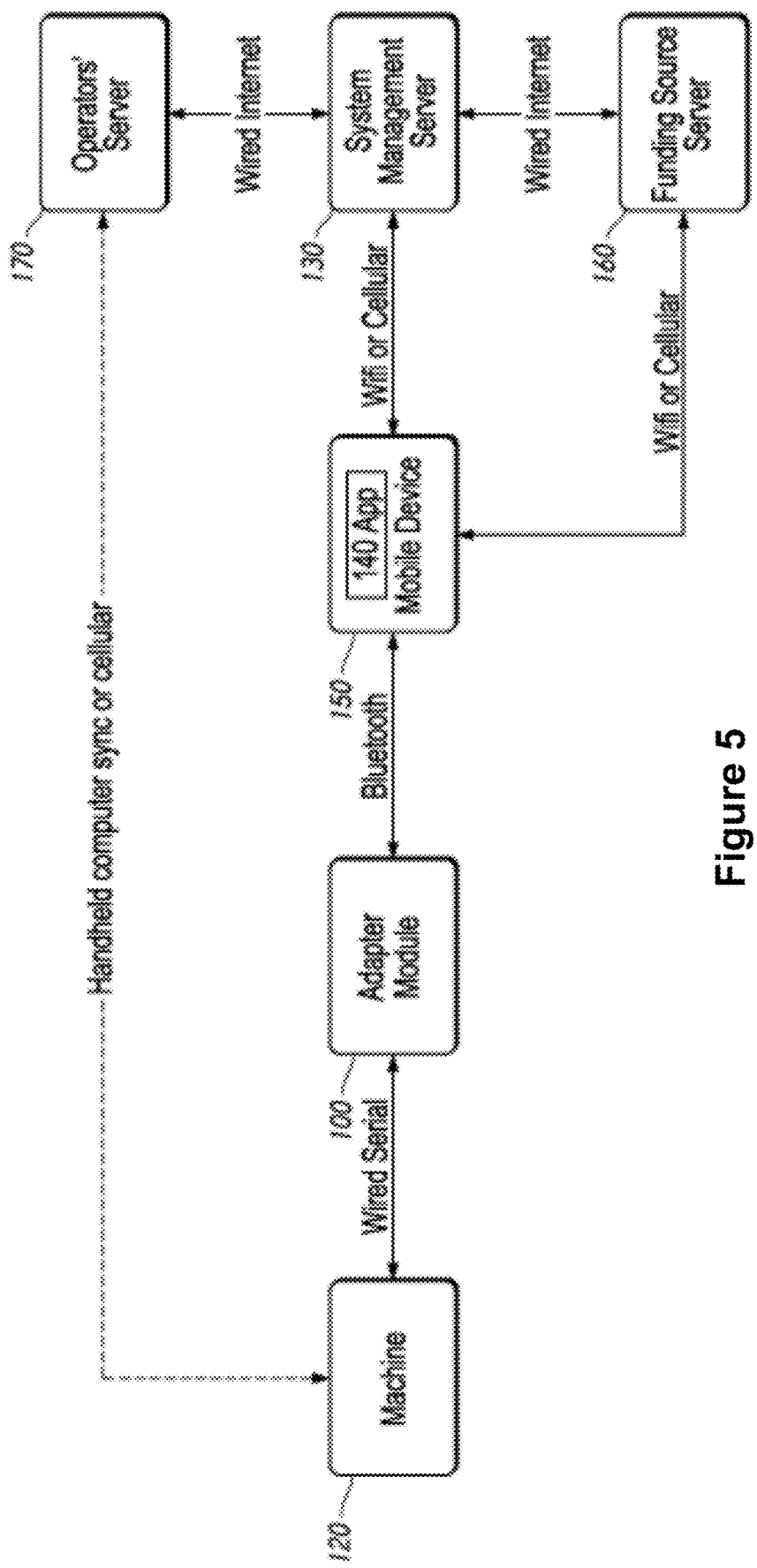
FIG. 5 is a block schematic that shows elements of the payment processing system including, but not limited to, the adapter module, the machine, the mobile device, and servers, as well as communications therebetween in accordance with some implementations.
Figure 6:
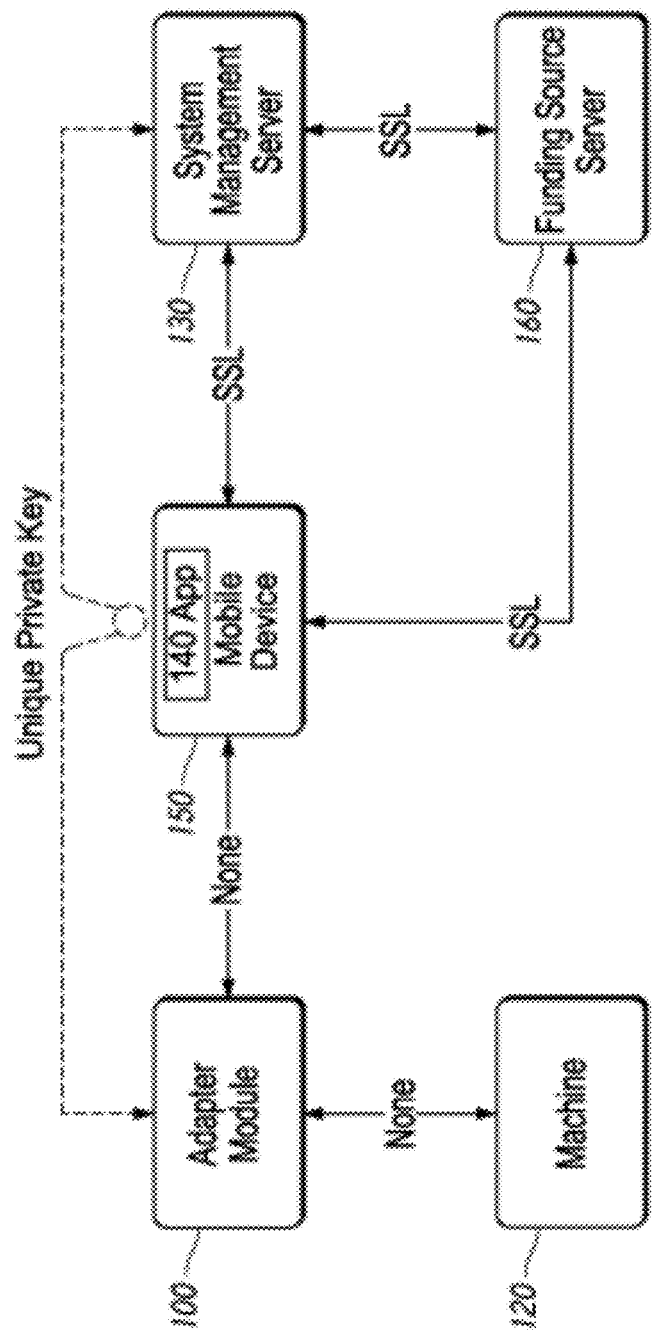
FIG. 6 is a block schematic that shows three areas of encryption used (each is bi-directional) between the adapter module, the machine, the mobile device, and/or servers in accordance with some implementations.
Figure 7:
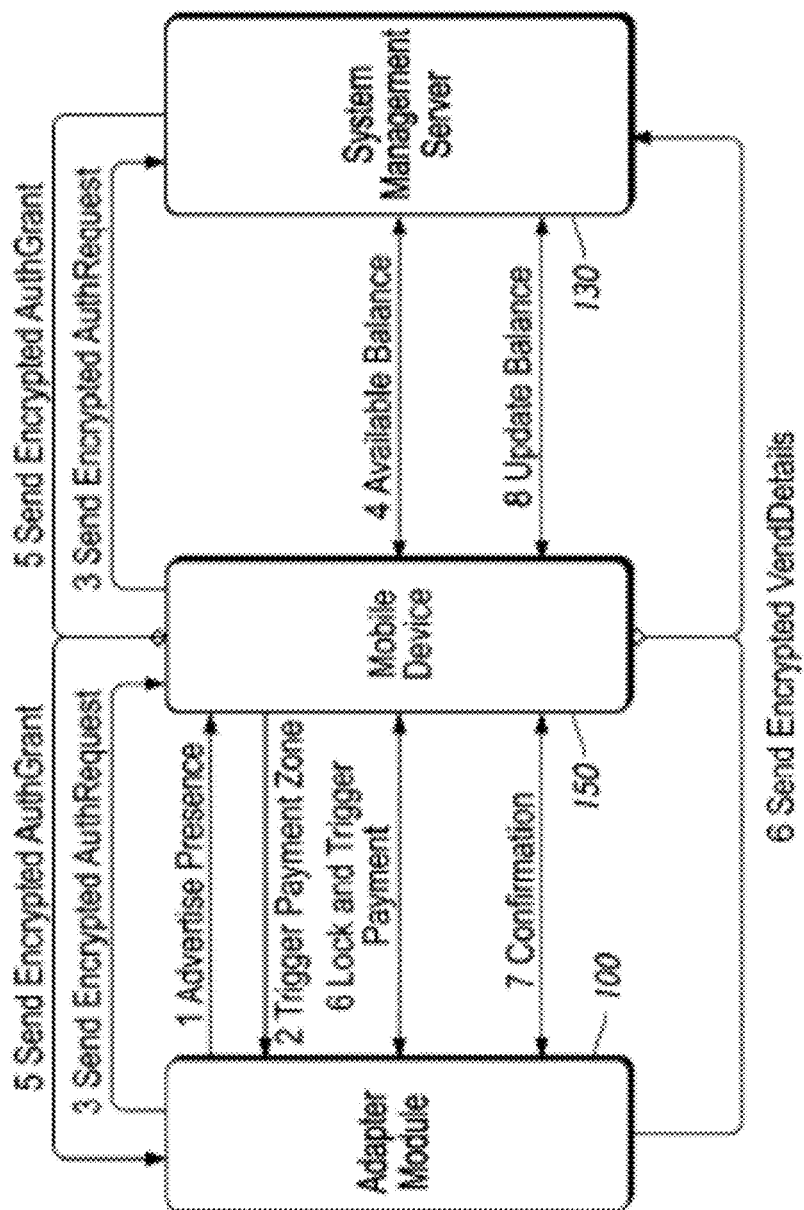
FIG. 7 is a block diagram that shows communications, messaging, vending sequence, and purchase flow between the adapter module, the mobile device, and a system management server in accordance with some implementations.

FIGS. 5, 6, and 7 together show major components of the mobile-device-to-machine payment system and the interactions there-between.

As shown, the adapter module 100 functionally connected bi-directionally to the payment accepting unit 120 via a wired serial connection such that no security is necessary. The adapter module 100 is also functionally connected bi-directionally to the mobile device 150 (and its installed mobile application 140) via short-range communication technology (e.g., a Bluetooth connection). Because the mobile device 150 is not a "trusted" link (e.g., it could be hacked by a user), only secured communications (transmissions) are passed between the adapter module 100 and the mobile device 150. This keeps communications secured and safe from hacking. The mobile device 150 (and its installed mobile application 140) is also functionally connected bi-directionally to a system management server 130 and/or a funding source server 160 via long-range communication technology (e.g., Wi-Fi or Cellular connection) that preferably has appropriate security (e.g., SSL security). Security between the mobile device 150 and the system management server 130 has the advantage of protecting communications from the mobile device 150 to the system management server 130 that may include sensitive data and may not be encrypted. The system management server 130 and the funding source server 160 may be connected via a wired Internet connection with SSL security. The system management server 130 may be connected via a wired Internet connection with SSL security to an operators' server 170. Although not necessary to implement a purchase transaction, for other purposes (e.g., inventory), the operators' server 170 may be connected to the payment accepting unit 120 using a handheld computer sync or a cellular connection.

Also, a unique private key may be used to securely transmit encrypted messages between the adapter module 100 and the system management server 130 (although the encrypted transmissions would most likely be routed through the mobile device 150). The server 130 stores a private key for each adapter module 100, and this key is only known to the adapter module 100 and the server 130. No intermediary is privy to this key (especially not the mobile device 150). When the adapter module 100 and the server 130 communicate messages (e.g., AuthRequest and AuthGrant), the security unit 755 of the adapter module 100 encrypts the message with its private key and passes the message to the mobile device 150. The mobile device 150 (which preferably cannot decrypt the message) passes the encrypted message to the server 130. The server 130 is able to decrypt the message using the security unit 955 of the adapter module 100 and the unique private key. The security unit 955 of the server 130 uses this same unique private key to encrypt messages to the adapter module 100 and sends the message to the mobile device 150 to relay to the adapter module 100 that is able to decrypt the message using the security unit 755 of the adapter module 100 and the unique private key.

FIG. 7 shows specific communications and messaging with a vending sequence (the numbers to the left of the communications and messaging) between the adapter module 100, the mobile device 150, and the system management server 130. These communications are discussed in more detail in the discussion pertaining to the schematic flow diagrams (FIGS. 8A-8G) and the flow charts (FIGS. 9A-9E).

It should be noted that FIGS. 5, 6, and 7 are examples, and are meant to help in the understanding of the mobile-device-to-machine payment system. For example, the shown long-range communications technology may be replaced with alternative long-range communications technology known or yet to be discovered, the shown short-range communication technology may be replaced with alternative short-range communication technology known or yet to be discovered, and the shown security may be replaced with alternative security known or yet to be discovered. The shown connections are meant to be examples, and there may be intermediaries that are not shown. The shown components have been simplified in that, for example, only one mobile device 150 (or machine 120, adapter module 100, or server 130) is shown where many may be included. Finally, the order of the steps may be changed and some steps may be eliminated.

Adapter Module

FIGS. 11-18 show views of adapter module 100a (referred to generally as adapter module 100). Adapter module 100 is a relatively low cost hardware component that is pre-configured to work with the industry standard multi-drop bus (MDB). On machines without MDB technology, the adapter module 100 can be configured or designed to work with other serial protocols or activate a switch. In essence the adapter module 100 simulates establishing payment on payment accepting unit 120 in much the same manner as other alternative forms of payment (e.g., cash).

Figure 18:
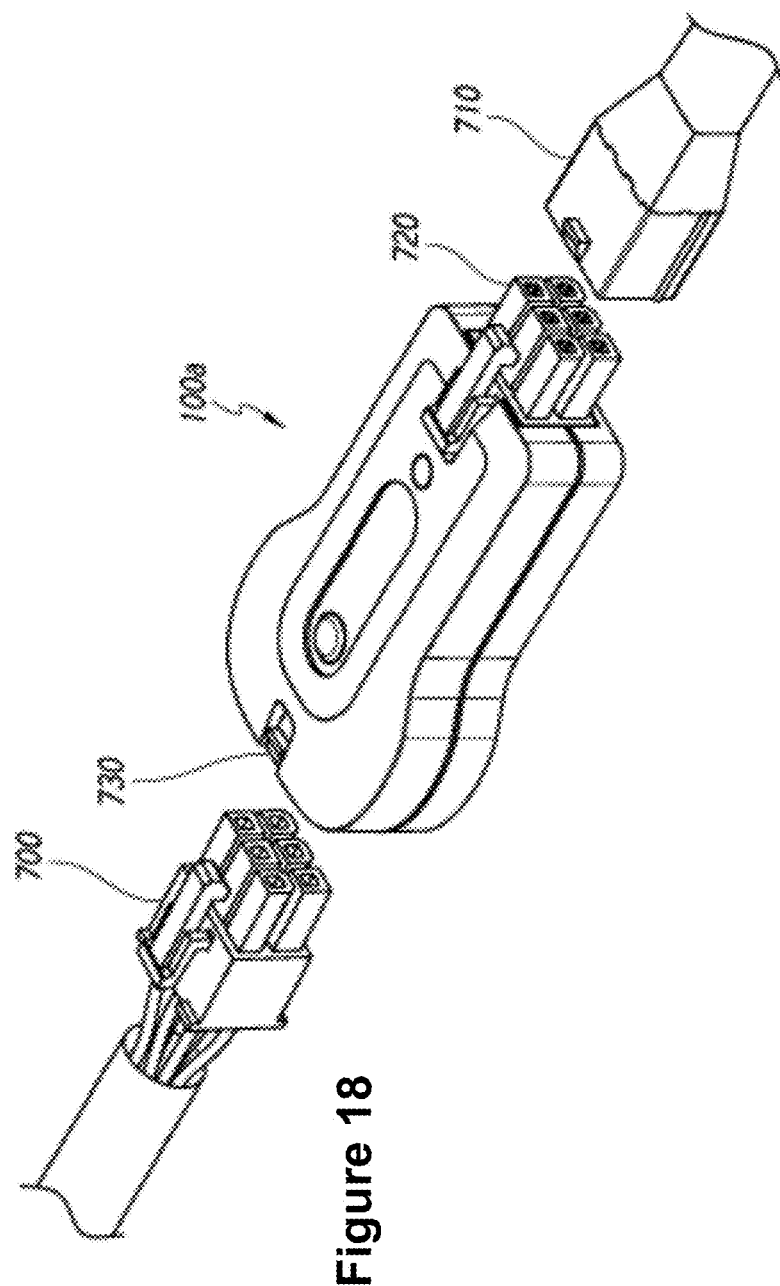
FIG. 18 is a perspective view taken from the second end of the in-line dongle adapter module of FIG. 11, the connectors and cables between which the in-line dongle adapter module is inserted being shown in broken lines for illustrative purposes in accordance with some implementations.

The shown adapter modules 100 are preferably designed to be used as an in-line dongle for in-line insertion within, for example, a MDB of a machine 120. The wire used in MDB technology uses male and female connection ends or adapters to allow the attachment of peripherals. In the case of a vending machine, the wire with the connection ends or adapters would be present to allow the attachment of a payment receiving mechanism (e.g., a coin mechanism). The MDB male and female adapters 700, 710 may be separated (as shown in FIGS. 17-18). The adapter module 100a in FIGS. 11 and 17-18 has a male adapter 720 and a female adapter 730. The adapter module 100a may be plugged (inserted) in serial ("in-line") with the wire. For example, the MDB female adapter 710 may be connected to the male adapter 720 of the adapter module 100 and the MDB male adapter 700 may be connected to the female adapter 730 of the adapter module 100. The resulting in-line configuration is shown in FIG. 19. It should be noted that the adapter modules 100 are designed to allow pass-through communications so that if the mobile-device-to-machine payment processing system is not enabled (e.g., for a particular purchase or simply turned off) the MDB functions as though the adapter module 100 is not there and the machine 120 can function normally.

Hands-Free Mode

Summarily, if it is available, a hands-free mode, from the user's perspective, would allow the user to approach a favorite payment accepting unit 120 and notice that the display (e.g., the displays 122 or 124 shown in FIG. 19) associated with the payment accepting unit 120 shows funds available (e.g., the wallet balance), he would select the product or service using input mechanisms (e.g., buttons 126 or a touch screen display 124 shown in FIG. 19) associated with the payment accepting unit 120, and he would retrieve his dispensed services or products.

During an initial handshake with the mobile device 150 (when the user is within range), the adapter module 100 reports to the mobile device 150 whether or not hands-free mode is available. If it is available, the installed mobile application 140 automatically connects to the payment accepting unit 120 without the user having to interact with the mobile device 150. The user observes that funds are available on the display 122, 124 of the payment accepting unit 120 and completes the purchase transaction as if cash was inserted in the machine 120 by inputting his selection on the payment accepting unit 120. The payment accepting unit 120 dispenses the product or service. After the selection is made, the change is returned to the mobile device 150.

Whether hands-free payment is available is determined by factors including, but not limited to whether if other mobile devices 150 are in range, if other adapter modules 100 are in range, if there are any alerts, if the payment trigger threshold is having wide variances and so deemed unstable, or if the payment accepting unit operator (e.g., a vending machine operator) has opted to disable hands-free mode for the payment accepting unit 120. In the latter instance, operators can disable via a maintenance mobile device 150, as well as through the operators' server 170 and/or the system management server 130.

FIG. 3 is a table that shows considerations, conditions, or factors that may be used to determine whether the hands-free pay feature is available. Starting at the "Favorite?" column, this indicates whether the payment accepting unit 120 is a favorite machine. Preferably the hands-free pay feature is only available for use with "favorite" payment accepting units 120 (e.g., a vending machine at work or school). The "Alert" column has to do with whether there is some reason (e.g., there are too many users in range) that the hands-free pay feature should not work and, if there is such a reason, the user will be notified (alerted) and may be able to use the manual mode to resolve the alert and/or complete the transaction. FIG. 3 shows situations in which a user is or is not able to make hands-free purchases from a machine 120 using a mobile application 140 on his mobile device 150. It should be noted that the shown interface is an example. For example, some of the features could be automated or preselected. (It should be noted that the left hand column, the "Tab" column, relates to whether the selected tab on the mobile application 140 is "all" or "favorite." FIGS. 10A-10D all show these tabs. Unlike the other columns in FIG. 3, this column has more to do with the functionality and view of the application 140 than specifically with the hands-free feature. The tabs would allow a user to select whether he wanted to be alerted when he was in range of all payment accepting units 120 or just "favorite" payment accepting units 120 and the application 140 would show the appropriate view.)

Balance Display: An optional feature of the mobile-device-to-machine payment system that is particularly helpful in the hands-free mode (although it may be available in the manual mode and/or in a multiple-vend scenarios) is when the user's mobile device 150 sends "credit" to the payment accepting unit 120 (either via hands-free payment or through a manual swipe), the wallet balance is sent to the payment accepting unit 120 that is then displayed to the user on a display 122, 124 of the machine 120. This is particularly beneficial during hands-free mode when the user does not retrieve the mobile device 150 and, therefore, may not know the balance. Also, in a multiple-vend scenario the user would not have to calculate a remaining balance.

An example of a hands-free, multiple-vend scenario where a balance is displayed by the payment accepting unit 120, follows: The user has $5.00 in his/her virtual wallet as that is the amount that has been authorized (the AuthGrant being stored on the mobile device 150). The user walks up to the payment accepting unit 120 and $5.00 is displayed on the display 122, 124 of the payment accepting unit 120 since hands-free mode was enabled and credit was sent (e.g., via the short-range communication capability) to the payment accepting unit 120. The user makes a selection of $1.50 by interacting (e.g., pressing buttons) with the machine 120. The item (product or service) is dispensed and the "change" is "returned" (e.g., via the short-range communication capability) to the virtual wallet. But since the user is still standing in the payment zone 102, the remaining wallet balance of $3.50 is sent to the payment accepting unit 120 and displayed so that the user can now see that he/she has a $3.50 balance. (It should be noted that the authorized funds may remain on the machine 120 and not be transferred back to the mobile device 150 between transactions.) The user decides to purchase a $1.50 item, and the transaction is completed as usual (e.g., by interacting with the machine 120). Now the user is still standing in the payment zone 102 and he/she sees the wallet balance of $2.00 on the display 122, 124 of the payment accepting unit 120. The user decides that he/she does not wish to purchase anything else and simply walks away. As he/she walks out of the payment zone 102, the credit is cleared from the machine 120, but he/she is left with the knowledge that his wallet balance is $2.00 even though he/she never touched the mobile device 150. Communications between the payment accepting unit 120 and the adapter module 100 (via the mobile device 150) handle the accounting incidental to the transaction. The remaining balance ($2.00) is technically stored on the server 130, and may be reflected on the application 140 on the mobile device 150.

Multiple Distinct Zones

As shown in FIGS. 1-2, the functions performed by the adapter module 100 can be divided into distinct zones: a first "communication zone" (e.g., "Bluetooth range" 106), a second "authorization zone" 104, and a third "payment zone" 102. The payment zone 102 is smaller than or equal to (overlapping completely) the authorization zone 104. Put another way, the payment zone 102 is within or coextensive with the authorization zone 104. The payment zone 102 is a subset of the authorization zone 104 with a ratio of the payment zone 102 to the authorization zone 104 ranging from 0.01:1 to 1:1. It is not necessarily a fixed ratio and can vary between different payment accepting units 120, different mobile devices 150, different users, and over time. While the zones 102, 104, 106 are depicted as having a uniform shape, the zones may not necessarily be uniform (or constant over time) in that the shape can vary. For example, the shape of the Bluetooth range 106 may vary depending on environmental conditions such as obstacles in the room and payment accepting unit 120 door/wall materials.

Bluetooth Range 106 (sometimes also herein called the "communication zone"): The outermost range is the Bluetooth range 106 (shown in FIGS. 1-2). This is the area in which the adapter module 100 is able to broadcast its presence. In most situations, the Bluetooth range 106 is a passive range in that no actual data is exchanged between the mobile device 150 and the adapter module 100. While in the Bluetooth range 106, the mobile device 150 monitors the RSSI (Received Signal Strength Indicator).

Authorization Zone 104: The middle region is the authorization zone 104 (shown in FIGS. 1-2). This is a computed area based on the RSSI. As mentioned, the mobile device 150 monitors the RSSI while it is in the Bluetooth range 106. When the RSSI reaches a certain predetermined threshold based on In-Range Heuristics, the mobile device 150 can be considered to be in the authorization zone 104. In the authorization zone 104 the mobile device 150 establishes a connection to the adapter module 100 (e.g., a Bluetooth connection (FIG. 5) with SSL protection (FIG. 6)) and informs the adapter module 100 of its presence. After a successful handshake with the adapter module 100, the mobile device 150 registers the adapter module 100 and the adapter module 100 requests an authorization to the server 130 via the mobile devices' network connection (e.g., a Wi-Fi or cellular connection (FIG. 5) with SSL protection (FIG. 6)). It is important to note the mobile device 150 and the adapter module 100 have a non-exclusive relationship at this point. The adapter module 100 may collect registrations for all mobile devices 150 that are within the authorization zone 104.

An authorization occurs in preparation for when the user enters the payment zone 102 (shown in FIGS. 1-2). An authorization expires in a set period of time (for example, five minutes), so if the mobile device 150 is still in the authorization zone 104 at the time of expiration, the adapter module 100 submits for and receives another authorization. This will continue for a set number of times (for example, the limit may be three times to limit cases of numerous authorizations for a mobile device that may remain in the authorization zone 104 for an extended period of time without completing a transaction). Should authorization fail (for instance if the limit had been reached) prior to the user entering the payment zone 102, the adapter module 100 will request authorization when the mobile device 150 enters the payment zone 102 (which adds a few seconds to the experience).

Payment Zone 102: As a user enters the payment zone 102, the mobile device 150 establishes exclusive control of the adapter module 100. Once established, any other user in the payment zone 102 is put into a "waiting" status.

In the payment zone 102, the payment can be triggered automatically if the payment processing system has and is in hands-free mode. In such instances, the mobile device 150 is running the application 140 in background mode and will send credit to the payment accepting unit 120 without any explicit user interaction. The user completes the transaction on the payment accepting unit 120 in much the same manner as if cash had been inserted into the payment accepting unit 120 to establish credit. After the user completes the transaction (that may include one or more purchases), details of the transaction are preferably returned to the mobile device 150 and server 130 in separate messages. The message to the server 130 is preferably encrypted with the adapter module's 100 private key (FIG. 6) to ensure data integrity. As shown in FIG. 7, the "private key" coded message (Encrypted VendDetails) is preferably sent via the mobile device 150. The message to the mobile device 150 may be sent solely for the purpose of closing the transaction. The transaction history and balance are updated server-side via the encrypted message sent to the server 130.

The other mode of operation is manual mode. In manual mode, the user launches the mobile device 150 and is able to swipe to send payment to the payment accepting unit 120. The user can also swipe back to cancel the payment. Like in hands-free mode, the purchase transaction is completed on the payment accepting unit 120 in the same manner as if cash were inserted into the payment accepting unit 120. The mobile device 150 is only used to send payment. Selection is made directly on the payment accepting unit 120.

Self-Calibrating Zone Threshold: A key, but optional feature, of the payment processing system is a self-calibrating payment zone RSSI threshold. Because RSSI can vary machine to machine, environment to environment, and device to device, having a fixed threshold at which payment is triggered can be problematic. The approach suggested herein is the creation of a self-calibrating threshold. When the user is interacting with the payment accepting unit 120 (such as when he makes his selection on the payment accepting unit 120), the payment accepting unit 120 notifies the adapter module 100 and the adapter module 100 logs the conditions such as RSSI, type of user mobile device 150, accelerometer data, and other information. It is at this point that it can be ascertained safely that the user is within arm's-length from the payment accepting unit 120 (by necessity the user is arm's-length because he is making some physical interaction with the payment accepting unit 120). This is the only point in the entire transaction in which it can be certain that the user is within arm's-length from the payment accepting unit 120.

FIG. 4 shows a simplified set of steps involved when users enter the payment zone 102. Specifically, FIG. 4 shows that credit is established 200 (this may have been done in the authorization zone 104, but if not it would be handled in the payment zone 102), that the user makes a selection using the machine 202, that the machine notifies the adapter module of the selection 204, that the adapter module (optionally) logs the RSSI 206, and that the purchase process(es) continues 208. Using the historically logged RSSI data, the adapter module 100 calculates one of several "average" RSSI using various mathematical models. This "average" could be a traditional average, a moving average, a weighted average, a median, or other similar summary function. The adapter module 100 could pre-process the historical data before running the function, such as to eliminate top and bottom data points, suspect data points, etc.

Optionally, during the handshake between the mobile device 150 and the adapter module 100, the information transmitted to the adapter module 100 may include, for example, the model of the mobile device 150. Using the received information pertaining to the mobile device models, the adapter module 100 can create multiple payment thresholds, one for each mobile device model. This allows for variances that may be inherent in different types of Bluetooth radios. An alternative to this method is for the adapter module 100 to broadcast a baseline payment zone threshold, and the mobile device 150 can use an offset from this baseline based on its specific model type. The payment zone thresholds (or baseline offsets) can be unique to specific types of mobile devices (e.g., by manufacturer, operating system, or component parts), models of mobile devices, or individual mobile devices (unique to each user).

In a typical scenario in which the payment zone threshold has been calibrated, the adapter module 100 advertises its presence along with the threshold at which it considers any mobile device 150 to be in the authorization zone 104. This is a one-way communication from adapter module 100 to mobile device 150. Once the mobile device 150 enters the authorization zone 104, there is a handshake that is established between the adapter module 100 and the mobile device 150. During this handshake, the mobile device 150 can share its model information with the adapter module 100, and the adapter module 100 can return the payment zone 102 threshold for that specific model.

Optionally, in addition to calibrating the payment zone threshold, the adapter module 100 can apply the self-calibrating model to the authorization zone 104 to calibrate the authorization zone threshold. As with the payment zone thresholds, the authorization zone thresholds can be unique to specific types of mobile devices, models of mobile devices, or individual mobile devices. In this scenario, the adapter module 100 would broadcast multiple thresholds by device type and the mobile device 150 would determine which threshold to apply (or alternatively broadcast a baseline and the mobile device 150 uses an offset based on its device model). Even in this scenario, the authorization zone 104 is a one-way communication.

Optionally, along with the threshold that is calculated (in the payment and/or the authorization zone(s)), a safety margin can be added to minimize scenarios in which a user is within range, but the mobile-device-to-machine payment processing system does not recognize it because the threshold may not have been reached. For example, if the calculated RSSI for an iPhone™ 5 on machine 4567 is −68 db, the mobile-device-to-machine payment processing system may add a safety margin of −5 db, and establish the threshold at −73 db. So when a user's phone is communicating with the adapter module 100 at an RSSI of −73 db or better, the mobile-device-to-machine payment processing system will allow the mobile device 150 to credit the payment accepting unit 120. The safety margin can be set on the server 130 and downloaded to the adapter module 100, or set on the mobile device 150, or set on the adapter module 100 itself.

Optionally, in the payment zone threshold, the mobile device 150 can use other data to determine when to cancel the exclusive control of the payment accepting unit 120, to identify when the user is moving out of the payment zone 102. External data could include accelerometer data from the mobile device 150. Using that data, the mobile device 150 can determine whether the user is standing relatively still in front of the payment accepting unit 120, or if the user is in motion—effectively walking away from the payment accepting unit 120.

Signal Unavailability Adaptation

The mobile-device-to-machine payment processing system described herein uses a mobile device's 150 short-range communication technology (e.g., Bluetooth mechanisms) (shown as short-range communication capability 876 in FIG. 21) and a mobile device's 150 long-range communications technology (e.g., cellular and/or Wi-Fi mechanisms) (shown as long-range communication capability 872 in FIG. 21). The short-range communication capability 876 communicates with the adapter module's 100 short-range communication technology (e.g., Bluetooth mechanisms) (shown as short-range communication capability 776 in FIG. 20). The long-range communication capability 872 communicates with the server's 130 long-range communications technology (e.g., cellular and/or Wi-Fi mechanisms) (shown as long-range communication capability 972 in FIG. 22). The mobile device 150 (with a mobile application 140 thereon) acts as a communication bridge between the adapter module 100 (associated with a payment accepting unit 120) and the server 130. This process is described herein and works properly if there is cellular or Wi-Fi coverage within the payment zone 102.

One option if there is no cellular or Wi-Fi coverage within the payment zone 102 is to determine whether there is cellular or Wi-Fi coverage within the authorization zone 104 or the Bluetooth range 106. If there is, then the sizes of the zones 102, 104, 106 could be adapted and the timing could be adapted. For example, if the mobile devices 150 detected problems with the cellular or Wi-Fi coverage within the payment zone 102, the user could carry his mobile device 150 into the other zones (or the mobile device 150 could use short-range communication technology to communicate with other mobile devices 150 within the authorization zone 104 or the Bluetooth range 106) to determine whether the zones have cellular or Wi-Fi coverage. If they do have coverage, communication between the mobile device 150 and the server 130 can be advanced (conducted earlier when the mobile device 150 is further from the machine 120) or delayed (conducted later when the mobile device 150 is further from the machine 120). This can be thought of as changing the size or shapes of the zones 102, 104, 106. The timing would also have to be adjusted so that the authorization of funds (AuthGrant) does not expire before the user has a chance to make a purchase. It also means that balance updates to the server 130 may happen after the user has moved away from the machine 120 and has cellular or Wi-Fi coverage again.

Another option if there is no cellular or Wi-Fi coverage within any of the zones 102, 104, 106 is for the user to obtain authorization while outside of the zones in a place with cellular or Wi-Fi coverage. This may occur, for example, if a user knows that he will be going to a place with a payment accepting unit 120 equipped with an adapter module 100 (perhaps to a favorite payment accepting unit 120) that does not have (or rarely has) cellular or Wi-Fi coverage. A user may also use the mobile application 140 to query payment accepting units 120 in a given range (e.g., within 50 miles) or at a given location (e.g., at a campground or in a particular remote city) to determine whether there is cellular or Wi-Fi coverage within the zones 102, 104, 106. The user can then obtain pre-authorization from the server 130 using the mobile application 140. Again, the timing would also have to be adjusted so that the authorization of funds (AuthGrant) does not expire before the user has a chance to make a purchase. It also means that balance updates to the server 130 may happen after the user has moved away from the machine 120 and has cellular or Wi-Fi coverage again. A mobile-device-to-machine payment system having the ability to implement this option would be able to accept cashless payments without requiring any network connection near the payment accepting unit 120. In some implementations, the mobile-device-to-machine payment processing systems described herein is located in a remote location where no signal is available, therefore, can accept cashless payments.

As an example of a situation in which there might be no cellular or Wi-Fi coverage within any of the zones 102, 104, 106 of a particular payment accepting unit 120, the user (a teenager) may be traveling to a remote location to attend summer camp where there is no cellular or Wi-Fi coverage. The camp may have several payment accepting units 120 (e.g., a machine that creates a dedicated "hot spot" that requires payment for use, vending machines, or machines for renting equipment such as bikes, kayaks, or basketballs). The camp facility might notify parents that the mobile-device-to-machine payment system is available. The parents, while at home, could obtain authorization for a particular amount (that could be doled out a certain amount per day or limited to type of machine or location) to be authorized and "loaded" into the user's mobile device 150 and specify that the authorization will not expire for a certain period or until a certain date. Thereafter, while at camp, the user could use the mobile application 140 on his mobile device 150 in a manner similar to those discussed elsewhere herein. Short-range communications may be used for communications between the adapter modules 100 (associated with the machines 120) and users' mobile devices 150.

One subtle but powerful component of the payment processing system described herein is that it requires a long-range communication capability (e.g., an Internet or cellular network connection) only in the authorization zone 104 and only for the time period required to send the AuthRequest and receive the AuthGrant. Once a valid AuthGrant is received by the mobile device 150, the long-range communication capability (e.g., an Internet or cellular network connection) is not required by either the mobile device 150 or the adapter module 100 in the payment zone 102 as long as the AuthGrant is valid (unexpired). This mechanism allows the system to seamlessly handle authenticated transactions in (temporary) offline mode, with the deferred acknowledgement and transaction messages performing the bookkeeping and cleanup when network connection is regained. The alternatives described above provide a unique way to artificially extend the authorization zone to include any location where the mobile device 150 can communicate with the server 130.

Multiple User Resolution

As shown in FIG. 2, in one practical scenario, multiple users are in the zones 102, 104, 106. As shown in FIG. 2, users 1, 2, and 3 are in the payment zone 102 near the machine 120; users 5 and 6 are shown as positioned between the authorization zone 104 and the Bluetooth range 106; users 4 and 7 are in the Bluetooth range 106, user 10 is positioned on the edge of the Bluetooth range 106; and users 8 and 9 are positioned outside of Bluetooth range 106. In some implementations, the mobile-device-to-machine payment processing system manages and resolves issues pertaining to multiple users.

Users 4 and 7 are within the Bluetooth range 106 and the user 10 is either entering or leaving the Bluetooth range 106. Within the Bluetooth range 106 the users' mobile devices 150 are able to see the adapter module's 100 advertisement. In this zone, the mobile device 150 preferably does not initiate a connection. The adapter module 100 is preferably unaware of the users in the Bluetooth range 106. All the adapter module 100 is doing is advertising its presence to any multitude of users that may be in Bluetooth range 106.

The adapter module 100 begins to log users as the users (and their respective mobile devices 150) enter the authorization zone 104 (shown in FIG. 2 as users 5 and 6). At this point, there is a non-exclusive connection initiated by the mobile device 150 to the adapter module 100. It does a handshake (e.g., to exchange information needed to obtain authorization and, optionally, to log information needed for a self-calibrating authorization zone threshold) and the mobile device 150 contacts the server 130 for an authorization (e.g., sending an AuthRequest and receiving an AuthGrant). The adapter module 100 registers all mobile devices 150 that have requested and received AuthGrants. The adapter module 100 continues communicating with any other mobile device 150 that enters the authorization zone 104. After initial contact, the adapter module 100 may provide the mobile device 150 with a deferral delay of when to check back in with the adapter module 100 allowing opportunity for other mobile devices 150 to communicate with the adapter module 100.

If there is only one user in the payment zone 102, a purchase transaction may be performed. If there are multiple users in the payment zone 102, the mobile-device-to-machine payment system must handle the situation.

One optional solution for handling the situation of the multiple users in the payment zone 102 is queuing users in the payment zone 102. Once any mobile device 150 enters the payment zone 102, it establishes exclusivity to a particular mobile device 150 (e.g., in a first-come-first-serve manner). Technically, however, the adapter module 100 is not establishing an exclusive connection to the mobile device 150. The adapter module 100 can still perform a round-robin poll and communicate with and advertise to other mobile devices 150. Instead, the adapter module 100 establishes a queue prioritized by RSSI and time (e.g., who was first and whether the authorization has expired) and it notifies (e.g., alerts) other mobile devices 150 to wait. The earliest valid (unexpired) authorization takes precedence when there is any tie in the RSSI. Otherwise, for example, the strongest average RSSI takes priority. Preferably the queue is not a static measure of the RSSI but an averaged measure over the period of time in the queue. This compensates for a scenario in which a user may be walking around in the queue and then shows up at the payment accepting unit 120 just as the previous user is finishing. If another user was also in the payment zone 102 and stood there the entire time, but may have newer authorization, he could win out.

Anytime that the adapter module 100 cannot determine exactly which user is in the payment zone 102 in front of the payment accepting unit 120, the adapter module 100 will disable hands-free payment. The mobile device 150 will send an alert to the user and he can use swipe to pay (manual mode). All users in payment zone 102 will show "Connected" and the first to swipe payment to the payment accepting unit 120 then locks out other users.

Multiple Module Resolution

In the scenario where there are multiple modules present, determining which payment accepting unit 120 a user is in front of can be a challenge. In some implementations, the mobile-device-to-machine payment processing system described herein allows adapter modules 100 to communicate to other adapter modules 100 in range via Bluetooth. Each user receives authorization grants for specific payment accepting units 120. This means if there are multiple adapter modules 100 within the same authorization zone 104, there will be multiple authorization grants for the user. When the user enters the payment zone 102, it can be difficult to differentiate which payment accepting unit 120 the user is in front of if the payment zones 102 overlap.

To solve this problem, when the user enters the payment zone 102, the adapter modules 100 communicate with each other to determine the RSSI for the particular user (based on the signal from his mobile device 150) to triangulate which adapter module 100 (and the associated payment accepting unit 120) is closer to the user. Optionally, the inter-module communications can restrict the user to establishing an exclusive connection with only one payment accepting unit 120.

Optionally, when the user connects to a payment accepting unit 120, the mobile device 150 can send a communication to the payment accepting unit 120 for momentary display to the user on the display 122, 124 of the payment accepting unit 120. For example, the mobile device 150 can send a communication (e.g., "connected" or "Fred's Mobile Device Connected") to the payment accepting unit's display 122, 124 for a predetermined period of time (e.g., 1-3 seconds) so when the user is in payment zone 102, it is clear which payment accepting unit 120 the user is connected to prior to making a purchase (either in hands-free or manual mode).

In addition, when the user is in manual mode, the mobile device 150 can display (e.g., on the touch screen 152 as shown in FIGS. 10A-10D) a visual indication of the payment accepting unit 120 (e.g., a picture and/or a payment accepting unit ID of the payment accepting unit 120) for visual confirmation. If the user is in manual mode, the user can manually change the payment accepting unit 120.

Descriptive Scenario

FIG. 7, FIGS. 8A-8G, and 9A-9E (as well as other figures) can be used to understand a detailed scenario of the mobile-device-to-machine payment processing system described herein. A flow of communications and steps are loosely described below with reference to these (and other figures). It should be noted that alternative scenarios could include, for example, a modified order of the steps performed.

Prior to vending transactions, a user downloads a mobile application 140 onto his mobile device 150, creates an account, and configures a funding source via, for example, a funding source server 160. A funding source may be, for example, a debit card, a credit card, campus cards, rewards points, bank accounts, payment services (e.g., PayPal™) or other payment option or combination of payment options known or yet to be discovered. The funding sources may be traditional and/or nontraditional payment sources that are integrated into the ecosystem described herein and then used indirectly as a source of funds. Funds from the funding source are preferably held on the server 130 such that when an AuthRequest is received by the server 130, the server 130 can send an AuthGrant authorizing funds for a purchase.

The user can specify one or more "favorite" adapter module(s) 100 (that has a one-to-one relationship to the payment accepting unit 120) that he may visit regularly, such as a vending machine at school or work. Favorite adapter modules 100 appear on a pre-filtered list and allow for additional rich features such as hands-free payment.

Figure 8A:
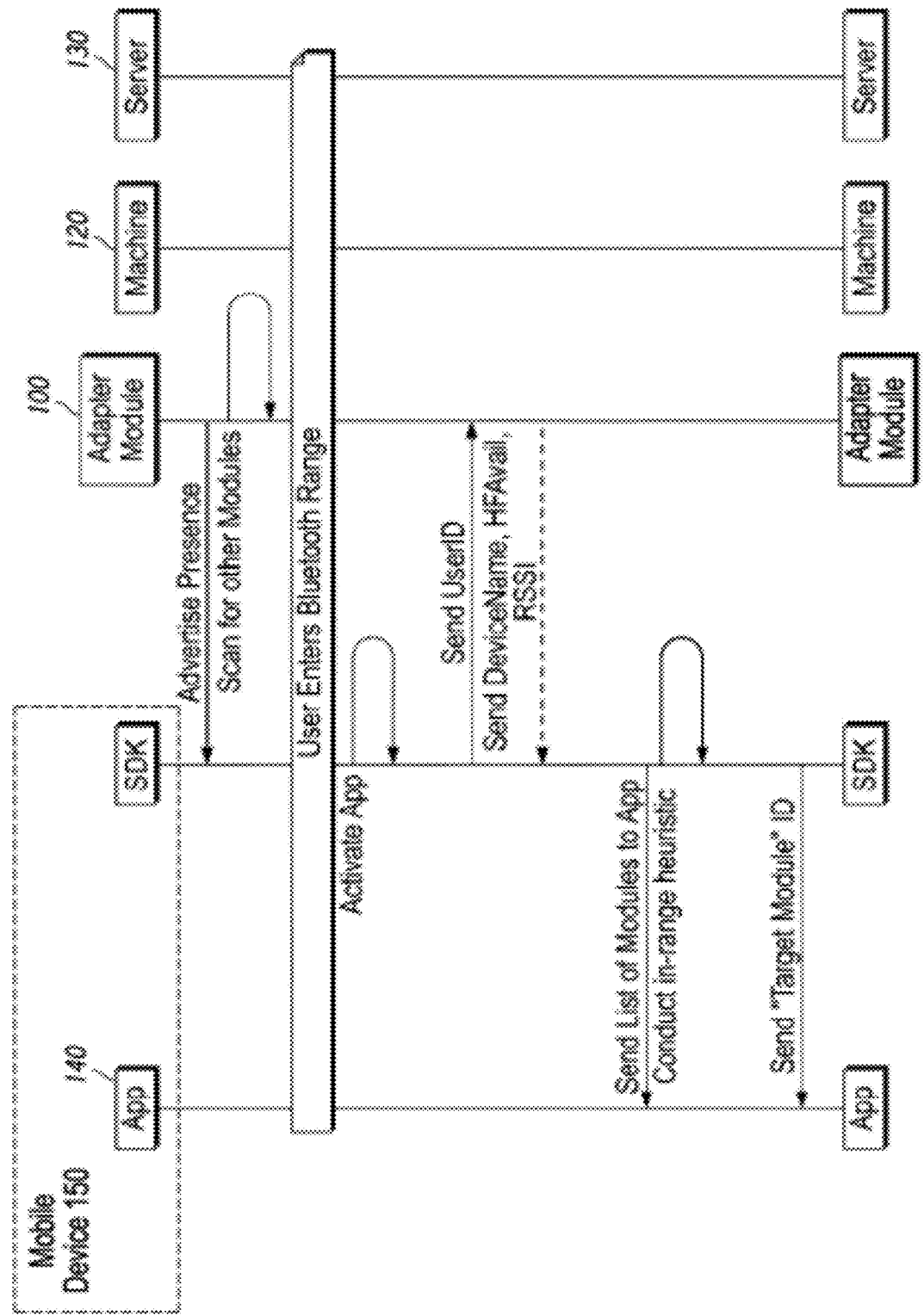
FIG. 8A is a schematic process flow diagram that shows additional elements and features of the payment processing system (e.g., communications, messaging, vending sequence, and purchase flow) when the user enters the "communication zone" (e.g., Bluetooth range) in accordance with some implementations.

The payment accepting unit 120 may be equipped with an adapter module 100 that is constantly advertising its availability via Bluetooth (or other "signals," "communications," and/or "transmissions"). This ongoing advertising and scanning for adapter modules is shown in FIG. 8A. As shown, the mobile device 150 is continuously scanning for any adapter module 100 within Bluetooth (or other "signal," "communication," and/or "transmission") range. When the user is within range of that adapter module 100, the mobile device 150 tracks and monitors the signal strength until a predetermined "authorization zone" threshold is achieved.

Figure 8B:
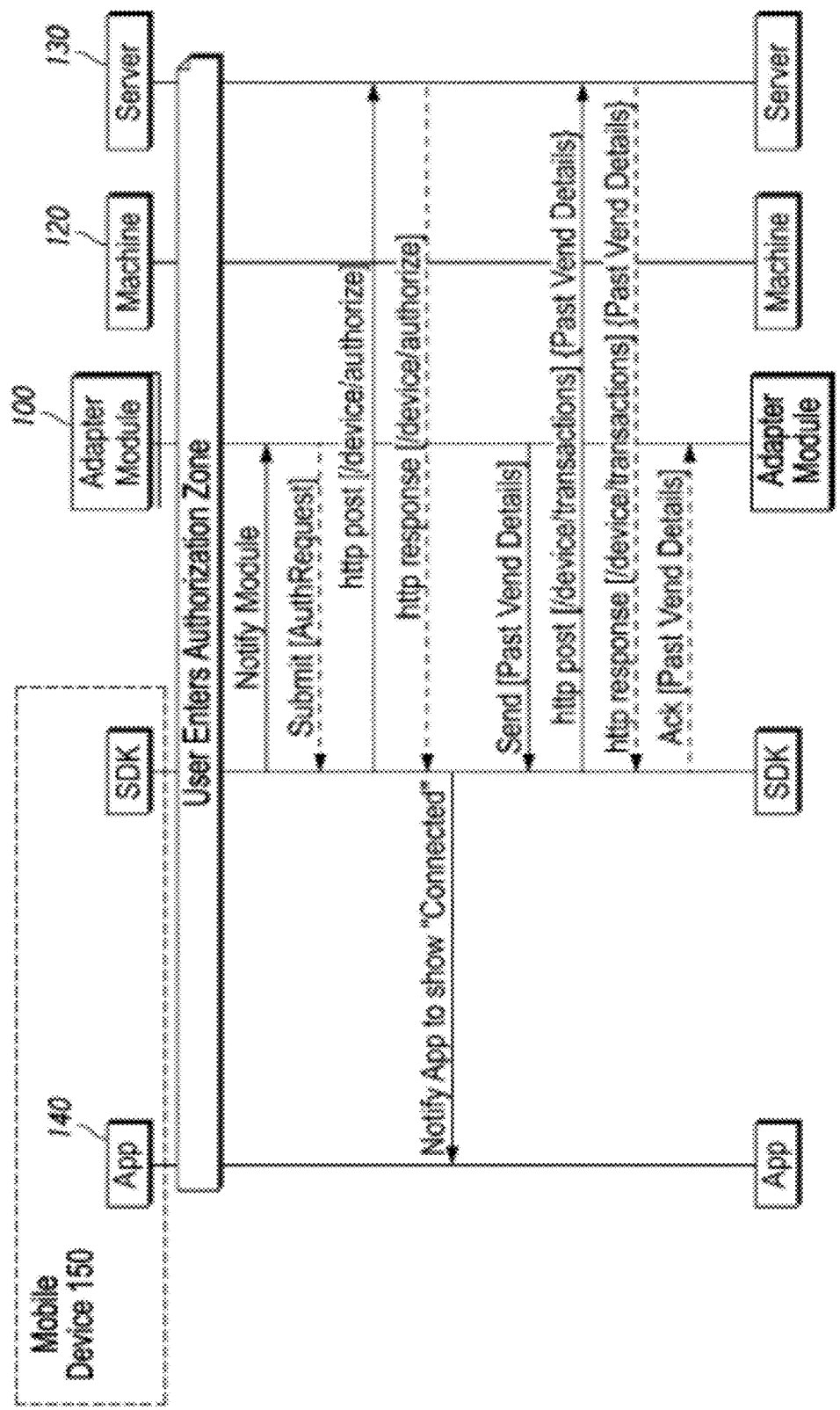
FIG. 8B is a schematic process flow diagram that shows additional elements and features of the payment processing system (e.g., communications, messaging, vending sequence, and purchase flow) when the user enters the "authorization zone" in accordance with some implementations.
Figure 9A:
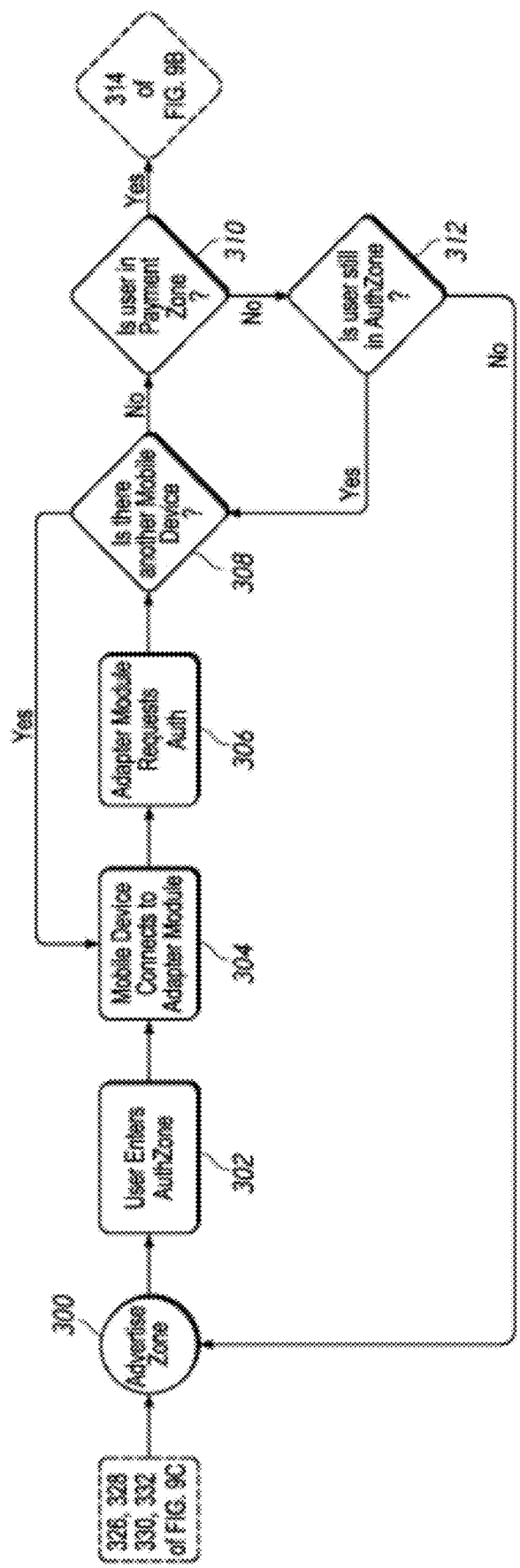
FIGS. 9A-9E are flow charts that show example steps and features of the payment processing system (e.g., communications, messaging, vending sequence, and purchase flow) in accordance with some implementations.

FIGS. 8B and 9A generally show that when the authorization zone threshold is reached, the mobile device 150 enters the authorization zone (block 302) and registers the adapter module 100. The mobile device 150 connects to the server 130 (block 304). The application 140 on the mobile device 150 creates a request for authorization (AuthRequest) and passes the AuthRequest to the server 130 using appropriate communication technology (e.g., GSM, CDMA, Wi-Fi, or the like) (block 306). The server 130 responds with an authorization grant (AuthGrant) encrypted with the specific adapter module's private key (block 306). This authorization token may minimally include the User identifier (ID), Apparatus ID (for the adapter module 100), authorization amount, and expiration time. The mobile device 150 receives the AuthGrant from the server 130, and retains it until the mobile device 150 is ready to issue payment to an adapter module 100. The mobile device 150 collects all pending AuthGrants that may be one or more depending on how many adapter modules 100 are in-range. Unused AuthGrants that expire are purged from the mobile device 150 and the server 130. It is important to note that the mobile device 150 is unable to read the AuthGrant because it is encrypted with the adapter module's unique private key that is only known to server 130 and adapter module 100. This provides a preferred key element of security in the system as the adapter module 100 only trusts AuthGrants that are issued by the server 130, and the AuthGrants cannot be read or modified by the mobile device 150 or any other party in between the server and the adapter module 100. Additional mobile devices 150 may enter the authorization zone 104 (block 308).

As the user approaches a specific adapter module 100, the user enters the payment zone 102 and an event threshold is triggered based on heuristics performed by the mobile device 150. Blocks 310 and 312 show the loop steps of waiting for a mobile device 150 from the authorization zone 104 to enter the payment zone 102. If the user leaves the authorization zone 104 without entering the payment zone 102, the adapter module 100 returns to advertising its presence (block 300).

Figure 8C:
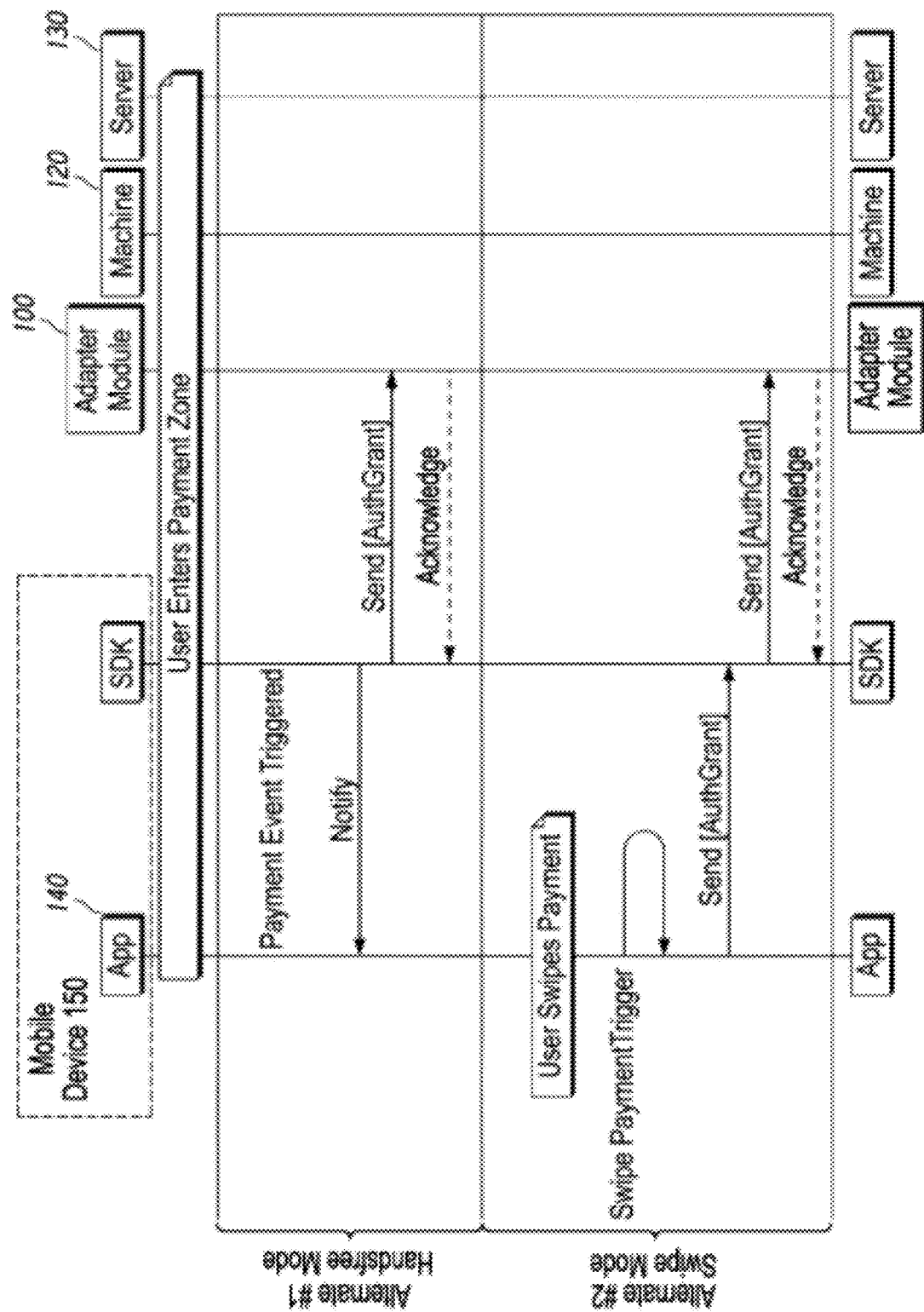
FIG. 8C is a schematic process flow diagram that shows additional elements and features of the payment processing system (e.g., communications, messaging, vending sequence, and purchase flow) when the user enters the "payment zone" and, in particular, detailing a hands-free mode embodiment and a swipe mode embodiment in accordance with some implementations.
Figure 9B:
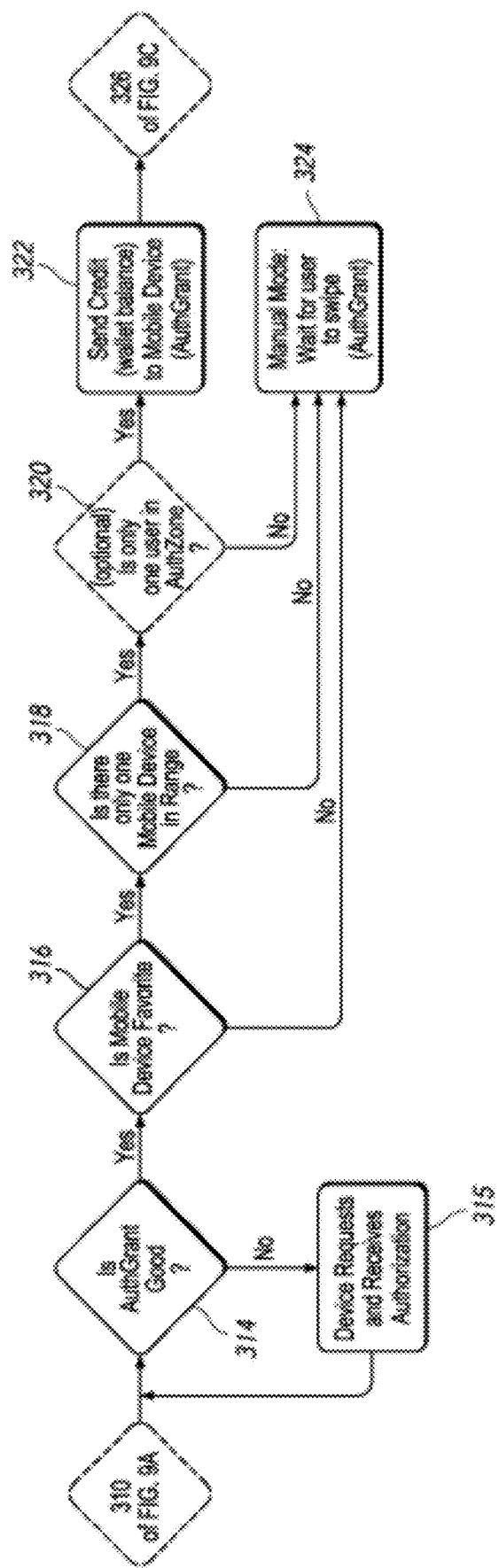

FIGS. 8C and 9B generally show the user entering the payment zone. The mobile device 150 verifies that it has an unexpired and valid AuthGrant. If the AuthGrant is not good, it may be requested again, repeating the Authorization Request process (block 315). If the AuthGrant is good, the mobile device 150 sends the valid AuthGrant (including the wallet balance (block 322)) to the adapter module 100 to initiate a transaction. The mobile device 150 may issue the AuthGrant automatically without specific user interaction if the hands-free mode is supported (and the device is a favorite (block 318), there is only one device in the payment zone 102 (block 318), and (optionally) there is only one user in the authorization zone 104 (block 320). If any of these factors are not present, the mobile device 150 will prompt and/or wait for the user to begin the transaction manually (block 324).

Figure 8D:
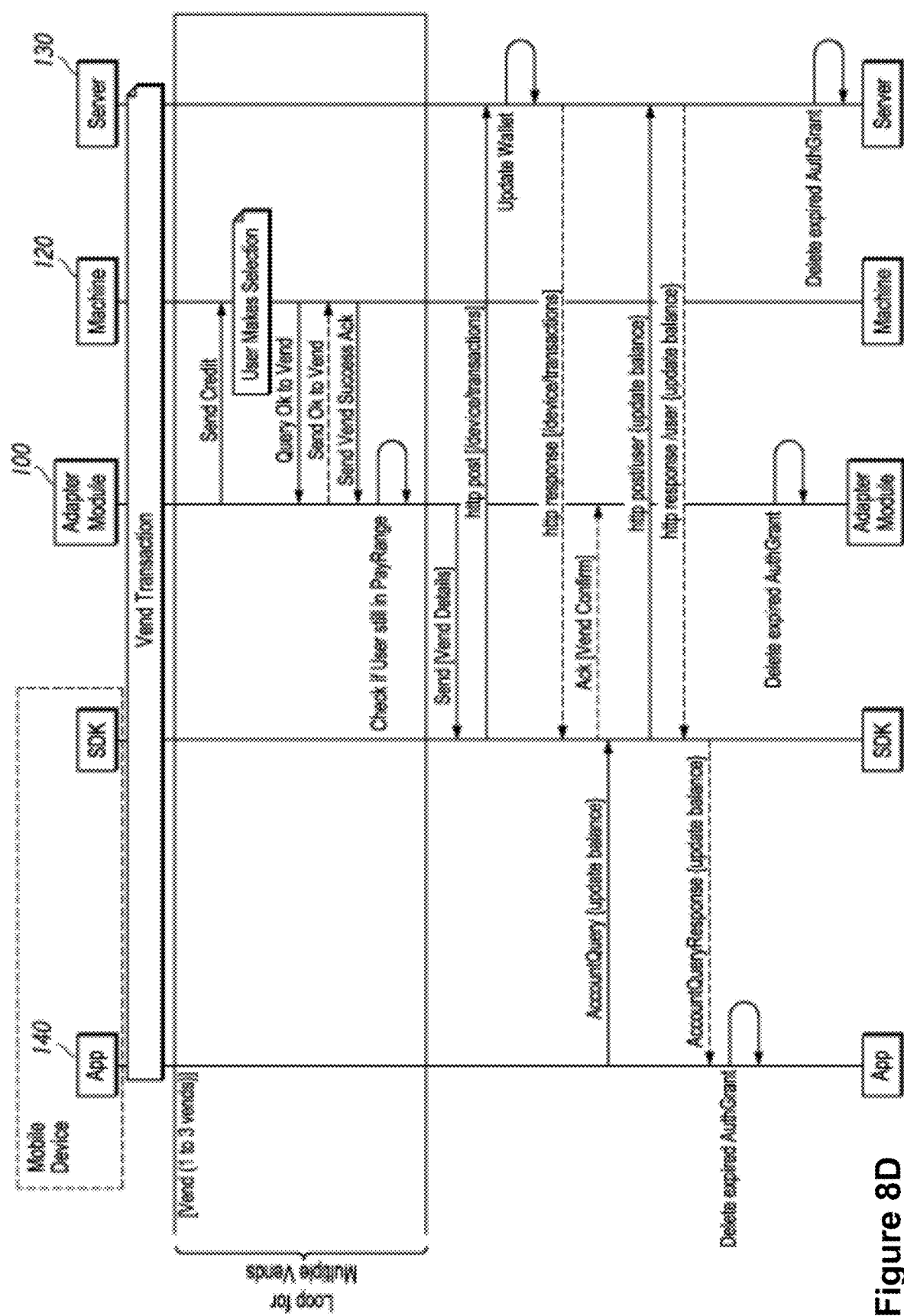
FIG. 8D is a schematic process flow diagram that shows additional elements and features of the payment processing system (e.g., communications, messaging, vending sequence, and purchase flow) in a vending transaction including a loop for multiple transactions in accordance with some implementations.
Figure 9C:
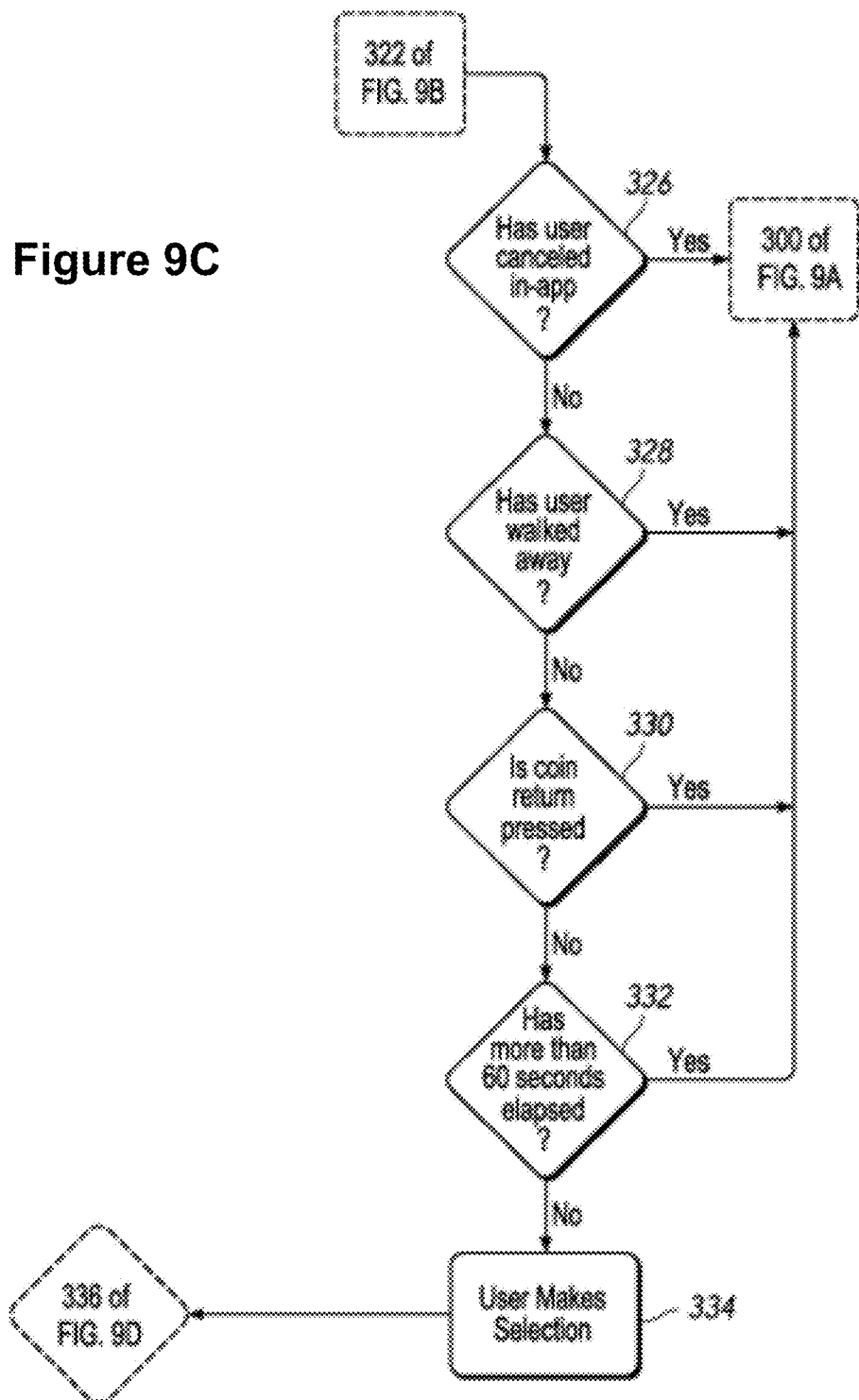
Figure 9D:
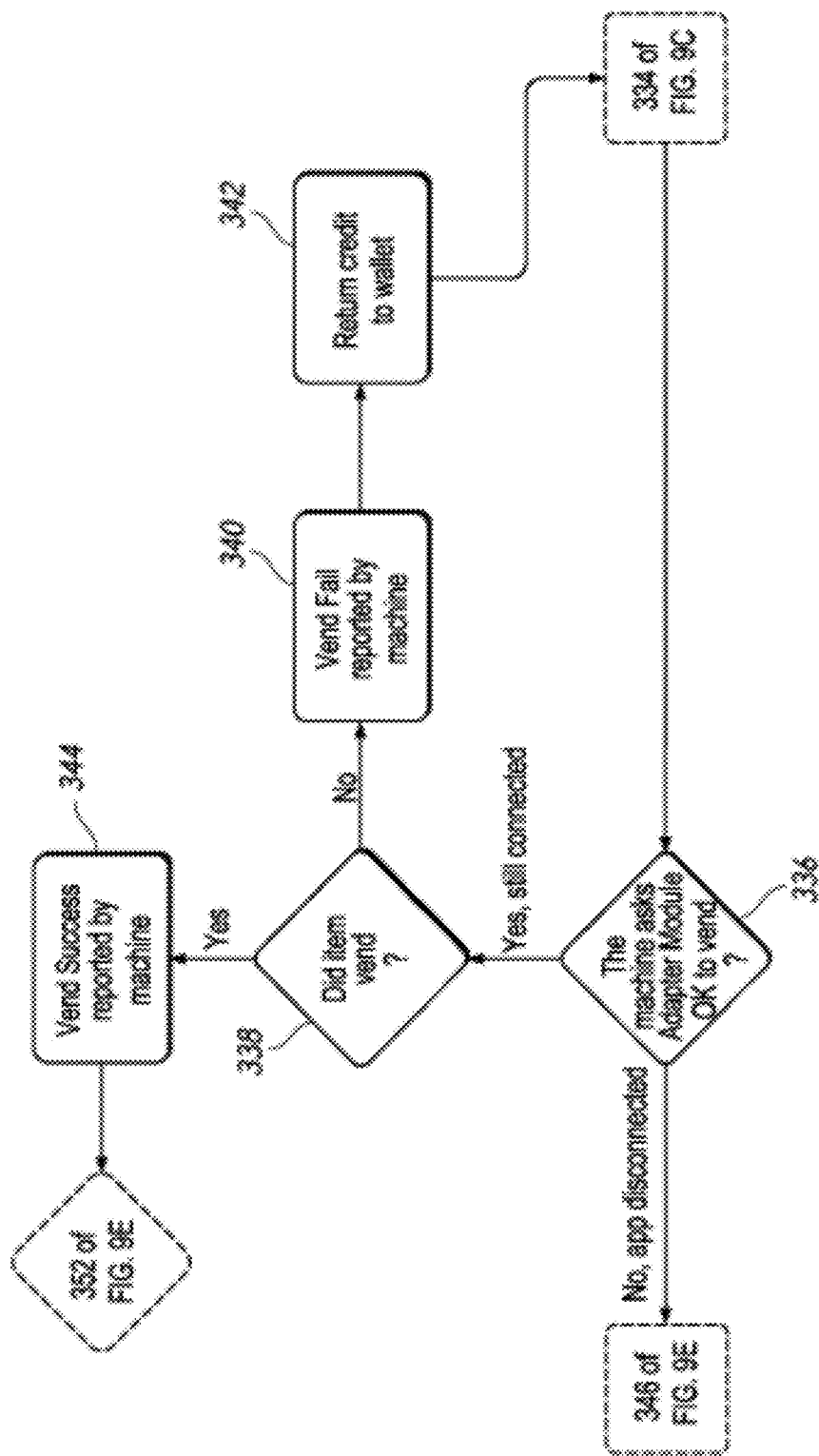

FIGS. 8D, 9C, and 9D generally show the transaction process. As shown in FIG. 9C, the adapter module 100 runs through a series of questions to determine if there are any issues that would prevent vending including: has the user canceled in-app? (block 326), has the user walked away? (block 328), is the coin return pressed? (block 330), has more than a predetermined period of time elapsed? (block 332). If the answer to any of these questions is "yes," the transaction does not proceed. If the answers to all of these questions is "no," the user makes a selection (block 334) on the payment accepting unit 120 in the same or similar manner as compared to if cash or credit were presented to the payment accepting unit 120. If the machine 120 is able to vend (block 336), it attempts to release the product. If the vend fails (block 338) it is reported by the machine (block 340) and a credit is returned to the virtual wallet (block 342). If the vend is successful (block 338) it is reported by the machine (block 344). Put another way, after the transaction is complete, the adapter module 100 returns to the mobile device 150 the details of the transaction as well as an encrypted packet containing the vend details to be sent to the server 130 via the mobile device 150. Optionally, the adapter module 100 can pass additional information not directly related to the transaction such as payment accepting unit health, sales data, error codes, etc.

Figure 9E:
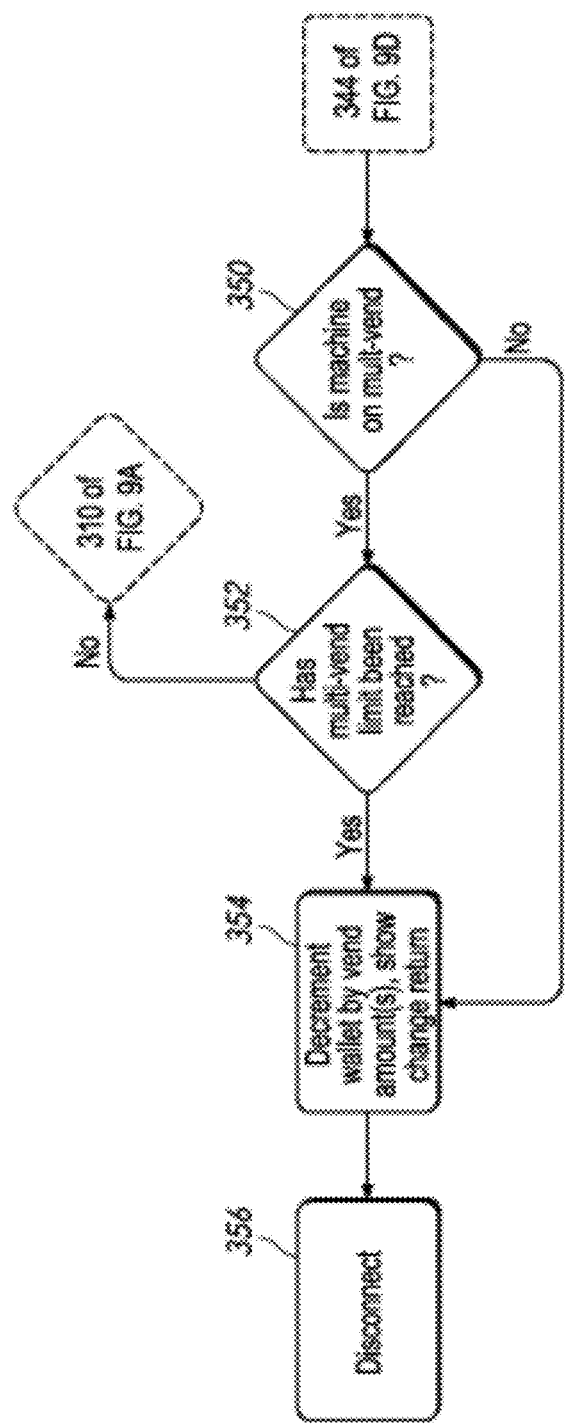
Figure 10A:
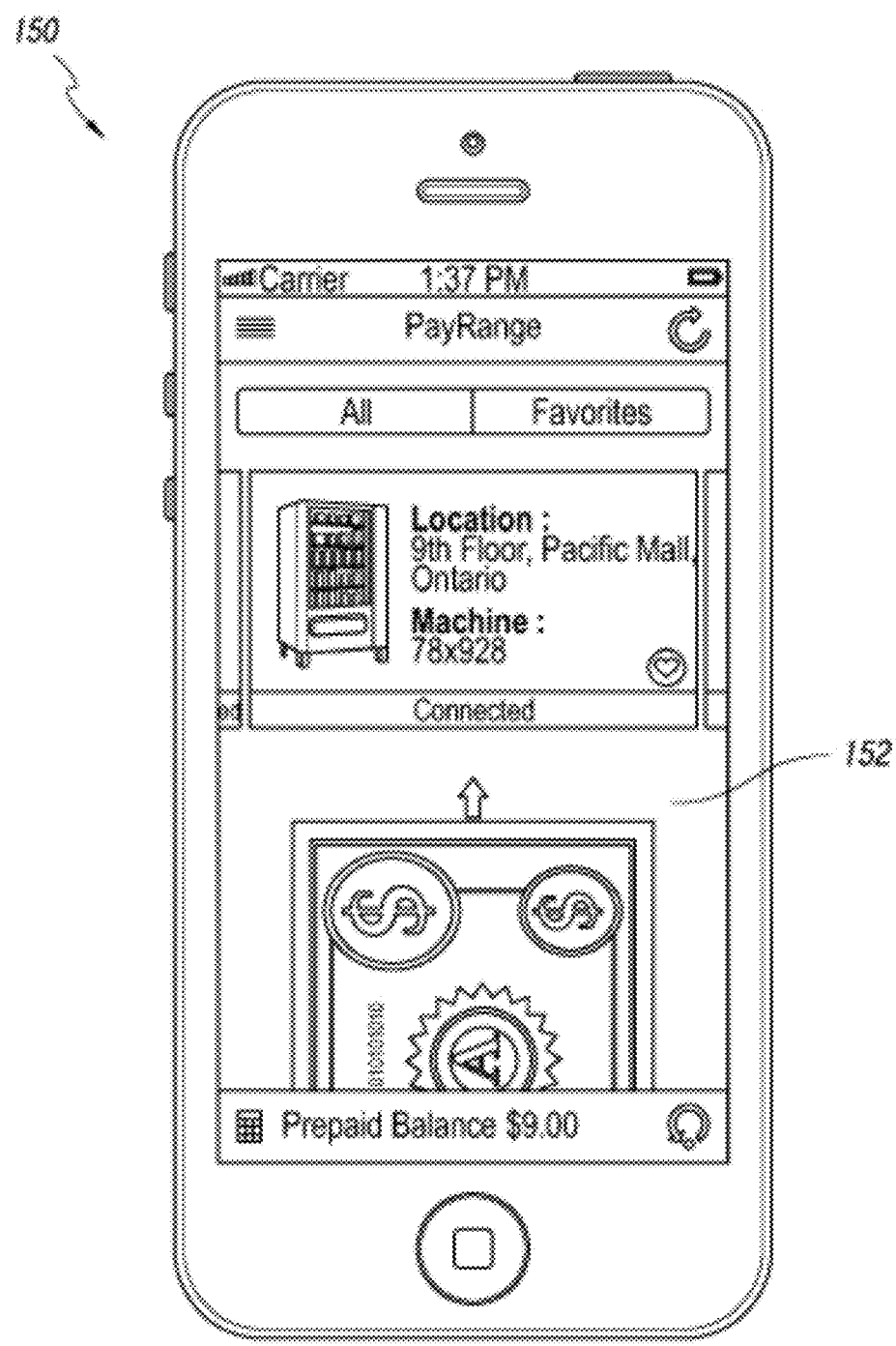
FIGS. 10A-10D show a mobile device with a graphical representation of a mobile application shown thereon, the mobile application being used as part of the mobile-device-to-machine payment processing system in accordance with some implementations.
Figure 10B:
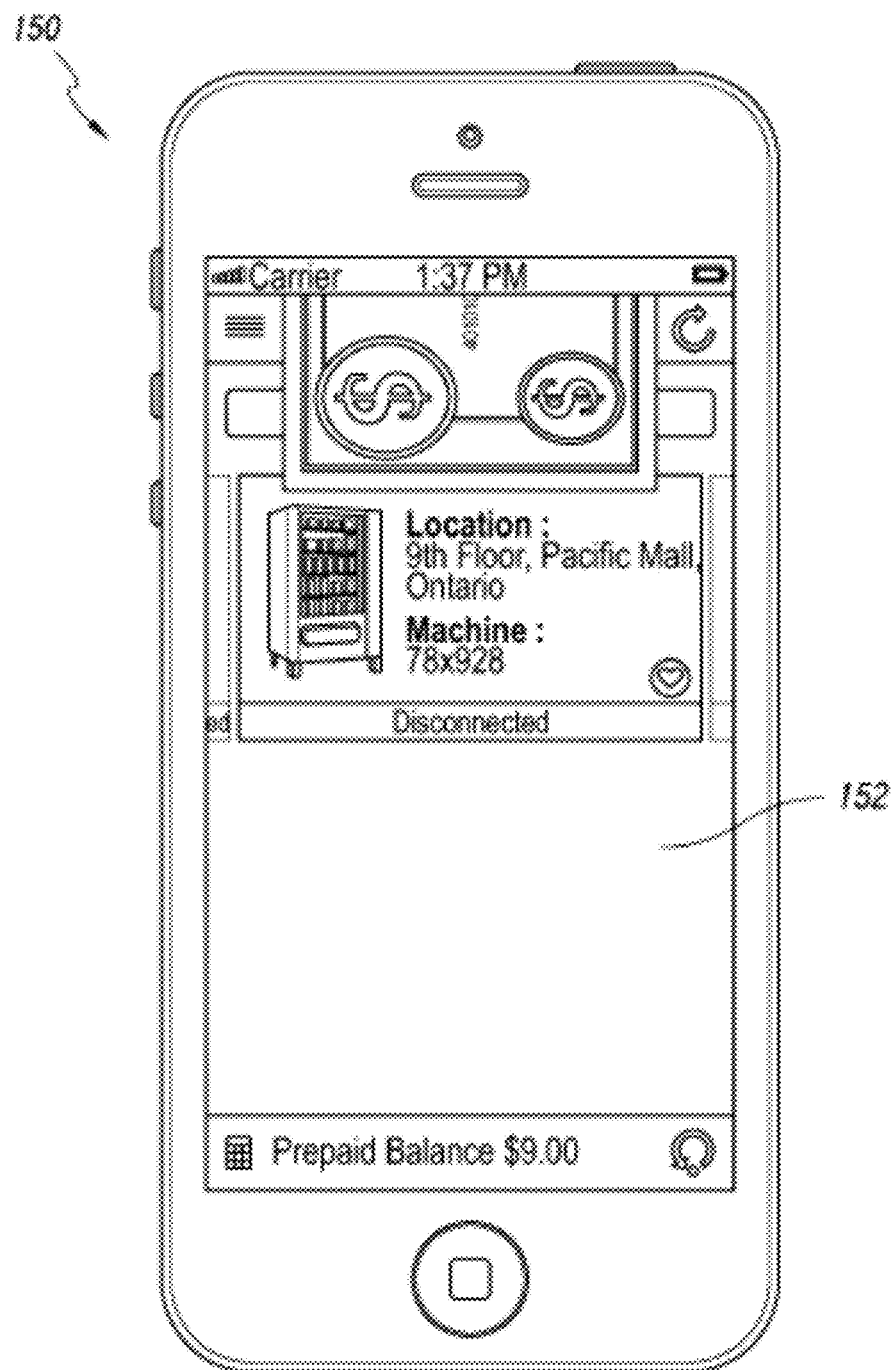
Figure 10C:
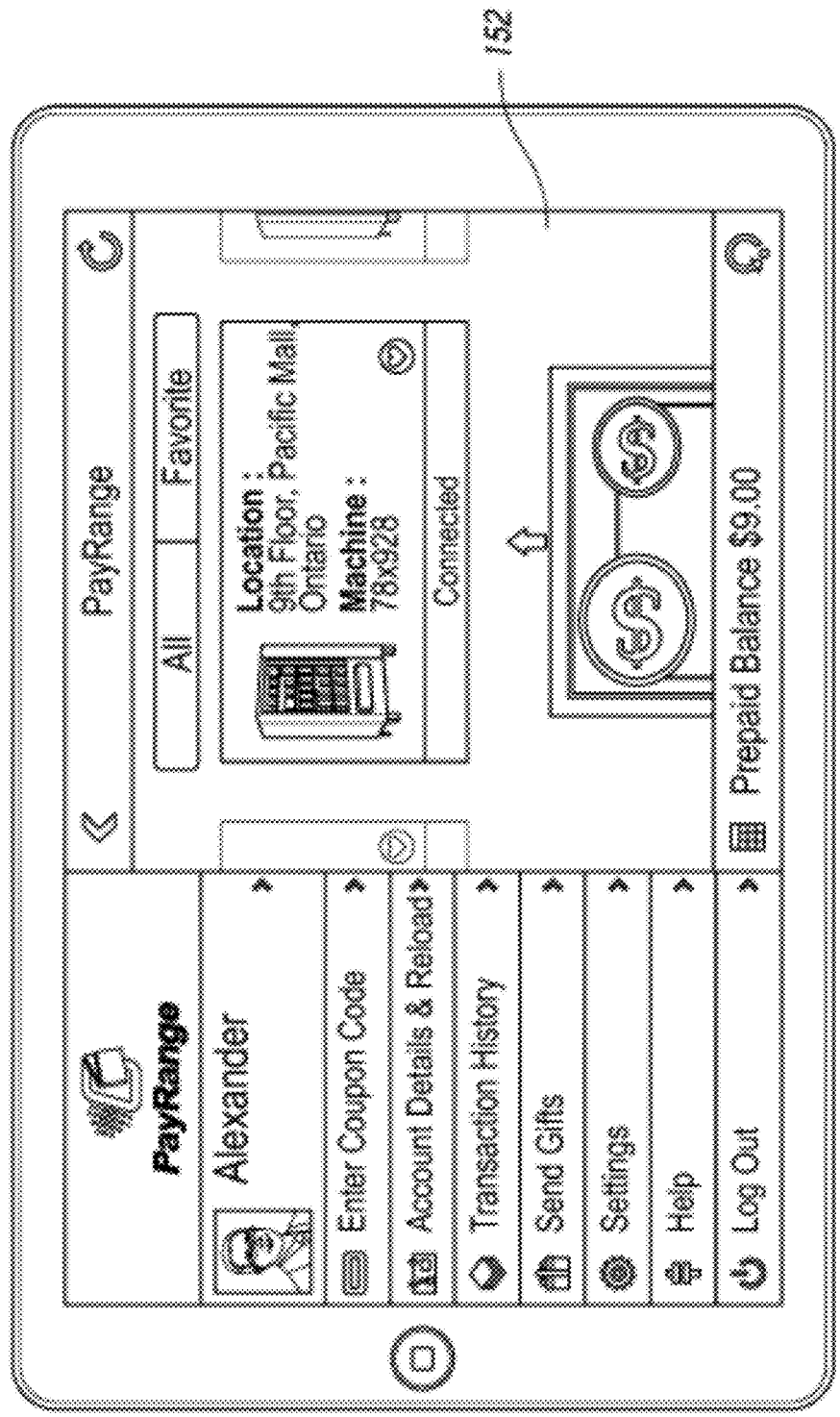
Figure 10D:
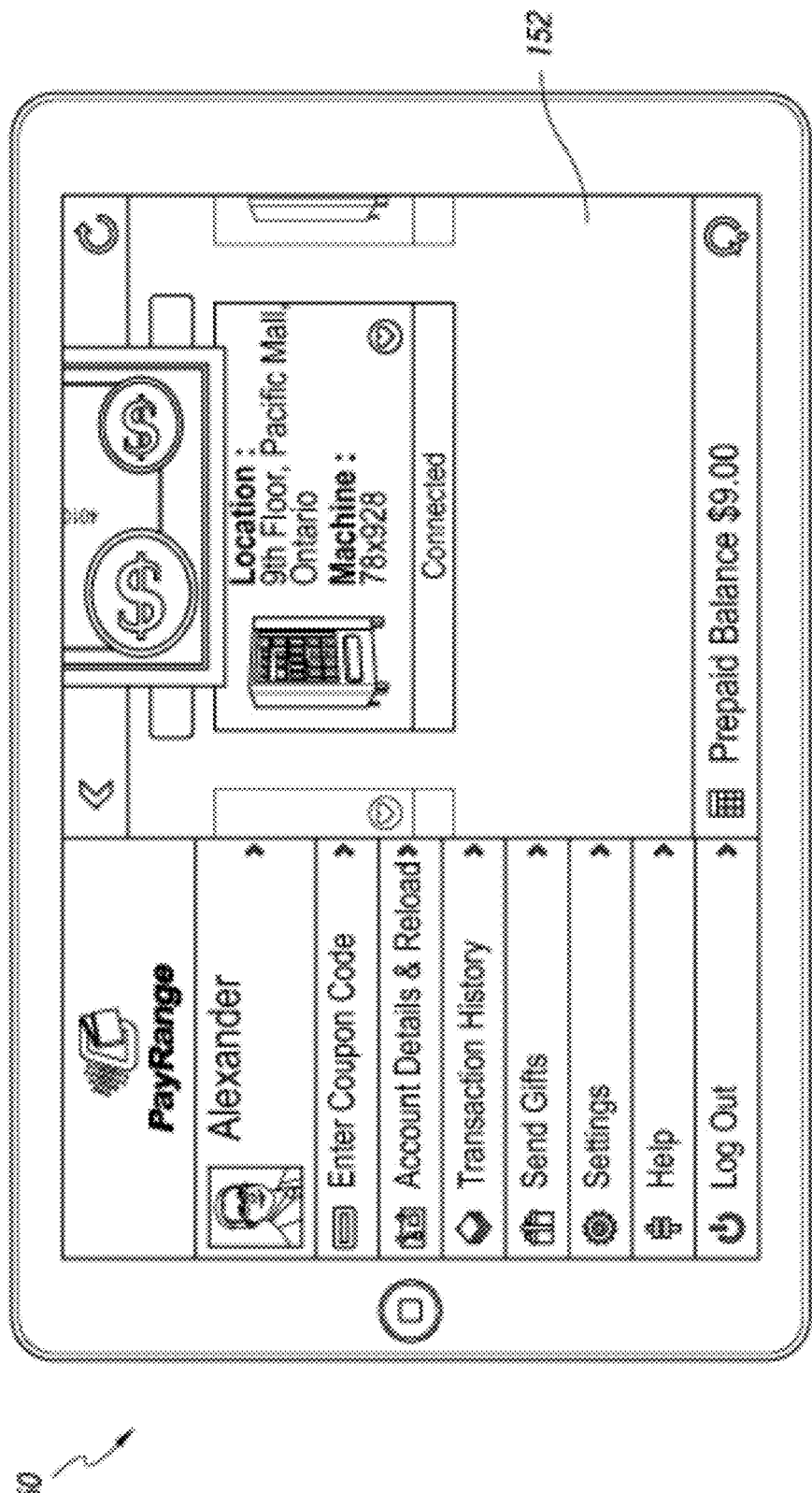
Figure 12:
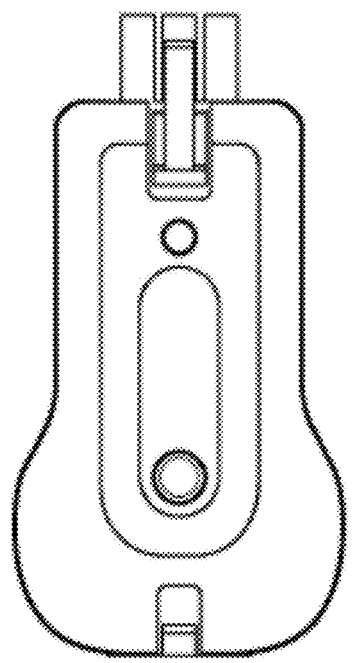
FIG. 12 is a front plan view of the in-line dongle adapter module of FIG. 11 in accordance with some implementations.
Figure 13:
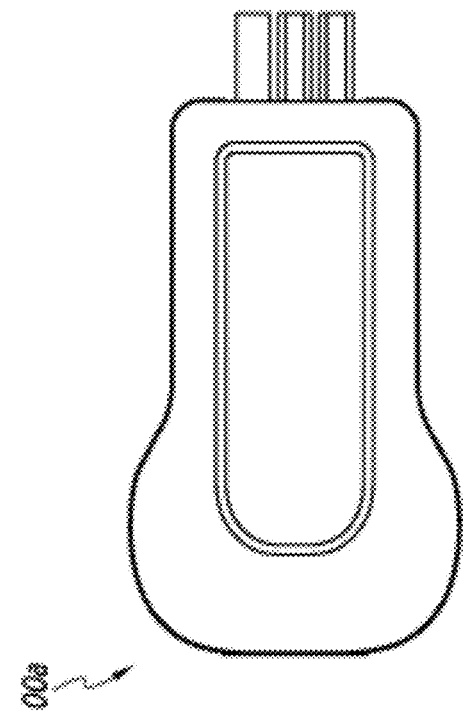
FIG. 13 is a back plan view of the in-line dongle adapter module of FIG. 11 in accordance with some implementations.
Figure 11:
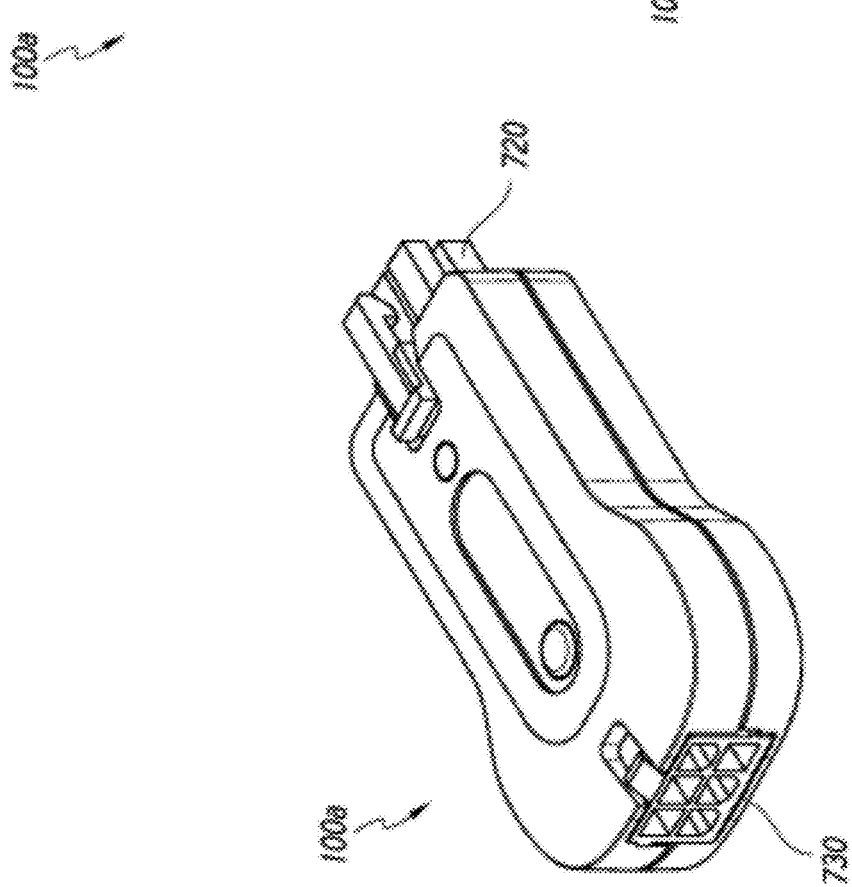
FIG. 11 is a perspective view of the in-line dongle adapter module in accordance with some implementations.

FIGS. 8D and 9E generally show the multi-vend function. If the machine has enabled multi-vend capabilities (block 350) and the multi-vend limit has not been reached, the process returns to the question of whether the user is in the payment zone (block 310 of FIG. 9A). If the machine does not have enabled multi-vend capabilities (block 350) or the multi-vend limit has been reached, the wallet is decremented by the vend amount(s) and "change" is returned to the virtual wallet (block 354) and the process ends (block 356).

Figure 8E:
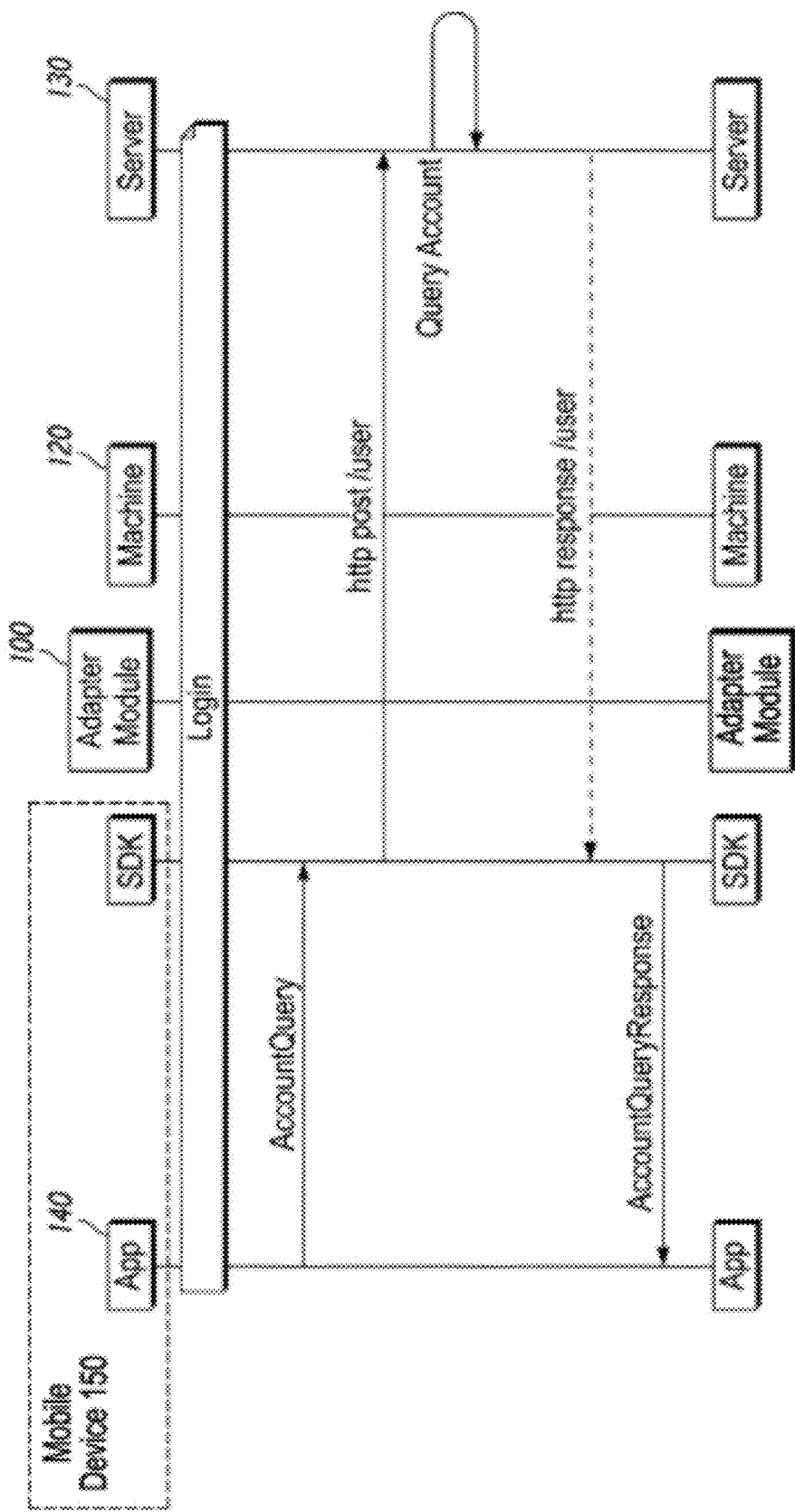
FIG. 8E is a schematic process flow diagram that shows additional elements and features of the payment processing system (e.g., communications, messaging, vending sequence, and purchase flow) in the login mode in accordance with some implementations.
Figure 8F:
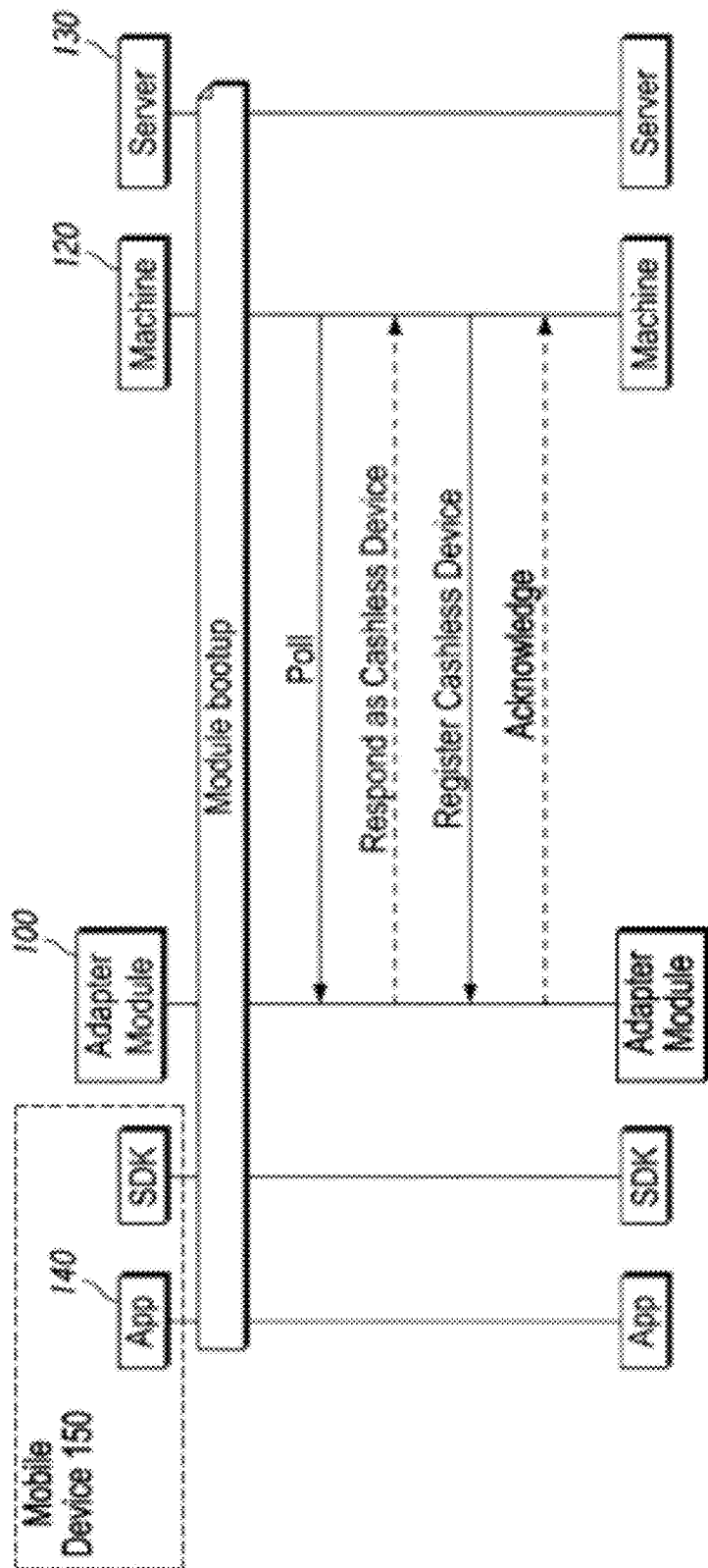
FIG. 8F is a schematic process flow diagram that shows additional elements and features of the payment processing system (e.g., communications, messaging, vending sequence, and purchase flow) during boot-up of the adapter module in accordance with some implementations.
Figure 8G:
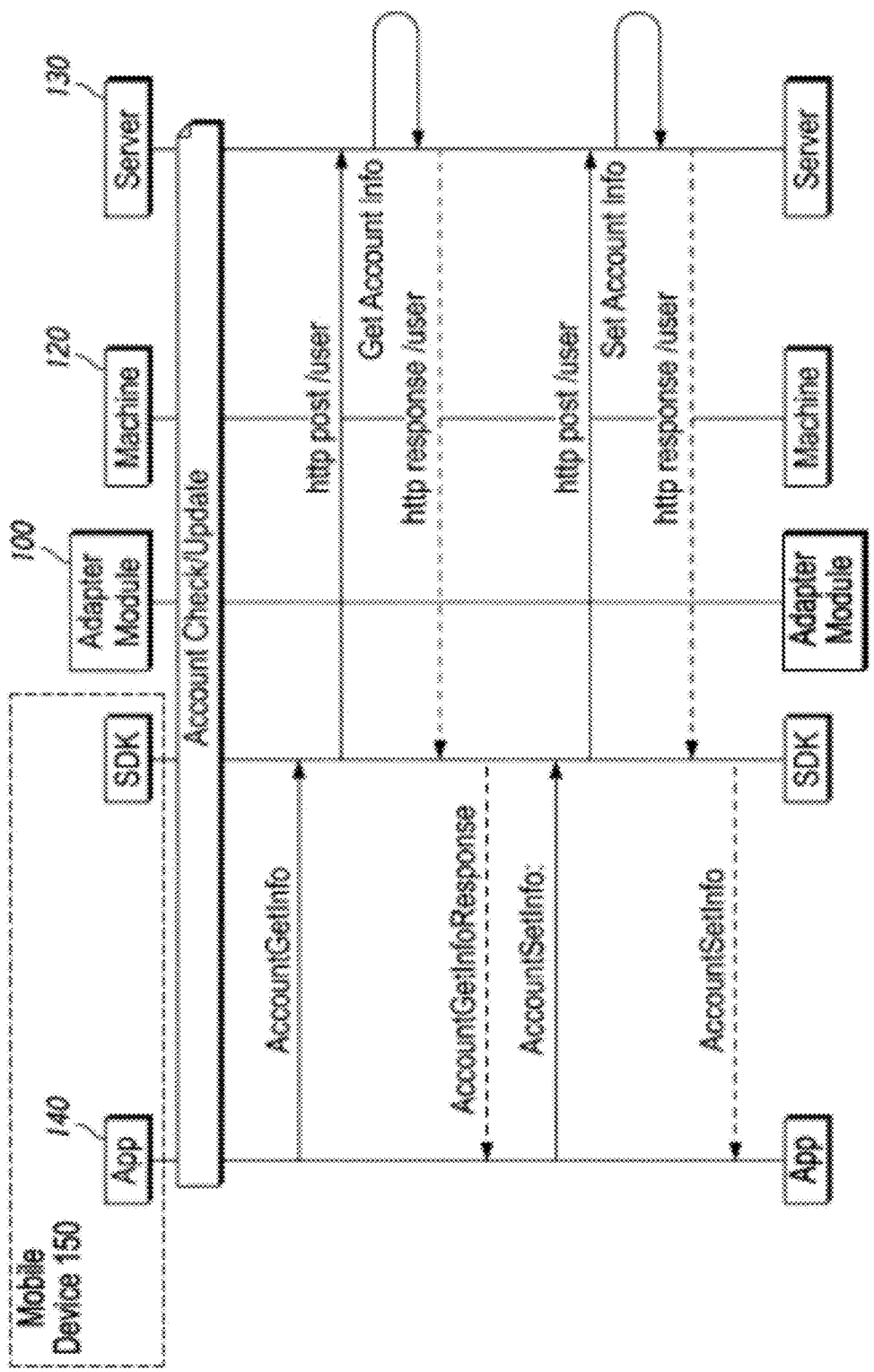
FIG. 8G is a schematic process flow diagram that shows additional elements and features of the payment processing system (e.g., communications, messaging, vending sequence, and purchase flow) during an account check/update process in accordance with some implementations.

FIG. 8E is a schematic flow diagram of an example login process. FIG. 8F is a schematic flow diagram of an example boot-up process. FIG. 8G is a schematic flow diagram of an example account check/update process.

Several of the figures are flow charts (e.g., FIGS. 9A-9E) illustrating methods and systems. It will be understood that each block of these flow charts, components of all or some of the blocks of these flow charts, and/or combinations of blocks in these flow charts, may be implemented by software (e.g., coding, software, computer program instructions, software programs, subprograms, or other series of computer-executable or processor-executable instructions), by hardware (e.g., processors, memory), by firmware, and/or a combination of these forms. As an example, in the case of software, computer program instructions (computer-readable program code) may be loaded onto a computer to produce a machine, such that the instructions that execute on the computer create structures for implementing the functions specified in the flow chart block or blocks. These computer program instructions may also be stored in a memory that can direct a computer to function in a particular manner, such that the instructions stored in the memory produce an article of manufacture including instruction structures that implement the function specified in the flow chart block or blocks. The computer program instructions may also be loaded onto a computer to cause a series of operational steps to be performed on or by the computer to produce a computer implemented process such that the instructions that execute on the computer provide steps for implementing the functions specified in the flow chart block or blocks. Accordingly, blocks of the flow charts support combinations of steps, structures, and/or modules for performing the specified functions. It will also be understood that each block of the flow charts, and combinations of blocks in the flow charts, may be divided and/or joined with other blocks of the flow charts without affecting the scope of the invention. This may result, for example, in computer-readable program code being stored in whole on a single memory, or various components of computer-readable program code being stored on more than one memory.

Additional Implementations

Figure 23:
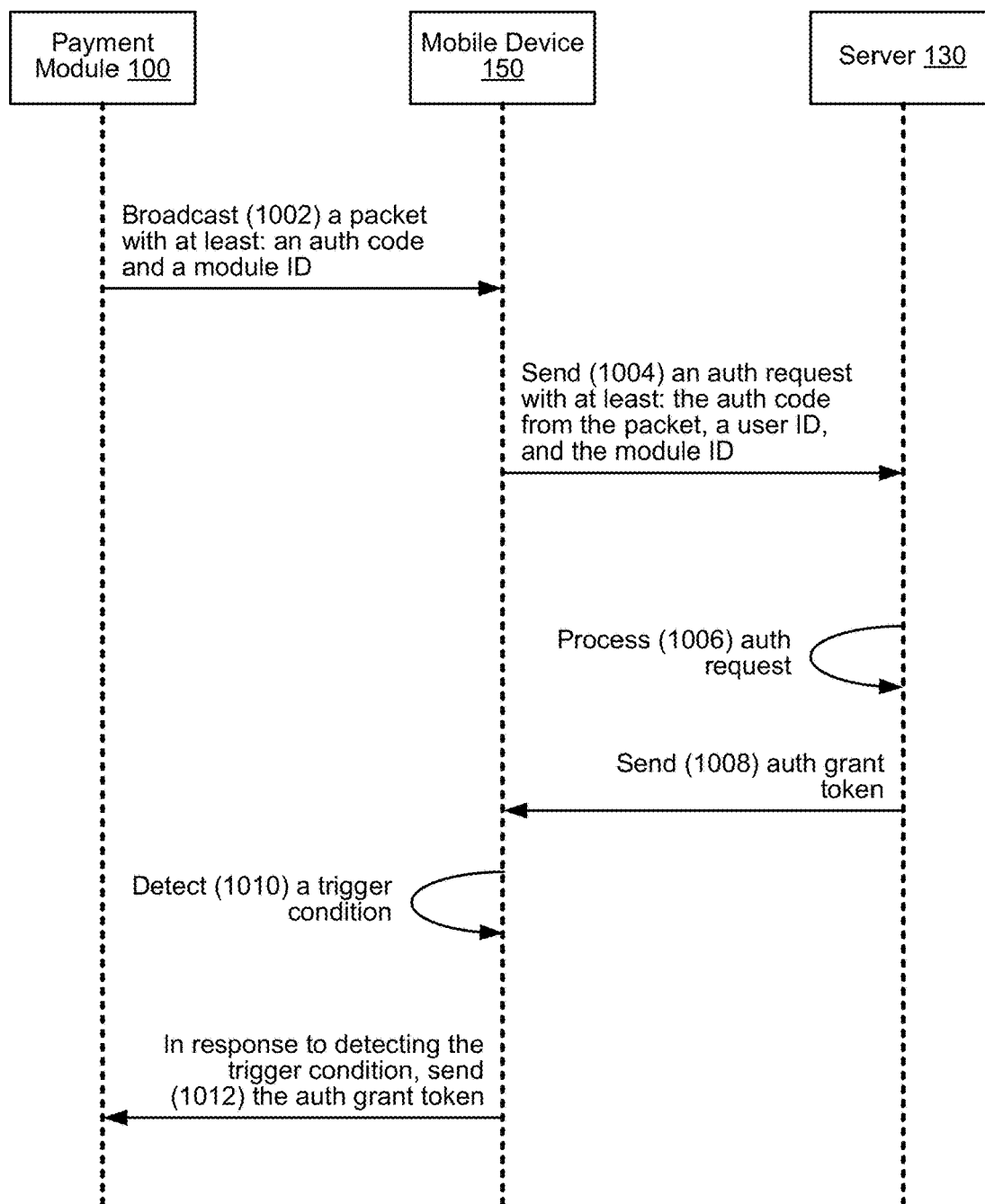
FIG. 23 is a schematic flow diagram of a process for authenticating a user to perform a transaction in the payment processing system in accordance with some implementations.

FIG. 23 illustrates a schematic flow diagram of a process 1000 of authenticating a user to perform a transaction in the payment processing system in accordance with some implementations. In some implementations, the payment processing system includes one or more payment modules 100 (e.g., each associated with a respective payment accepting unit 120 such an automatic retailing machine for dispensing goods and/or services), one or more mobile devices 150 (e.g., each executing the application 140 for the payment processing system either as a foreground or background process), and the server 130. The server 130 manages the payment processing system and, in some cases, is associated with an entity that supplies, operates, and/or manufactures the one or more payment modules 100. For brevity, the process 1000 will be described with respect to a respective payment module 100 and a respective mobile device 150 in the payment processing system.

The payment module 100 broadcasts (1002), via a short-range communication capability (e.g., BLE), a packet of information (sometimes also herein called "advertised information"). The packet of information at least includes an authorization code and an identifier associated with the payment module 100 (module ID). In some implementations, the packet of information further includes a firmware version of the payment module 100 and one or more status flags corresponding to one or more states of the payment module 100 and/or the payment accepting unit 120. The information included in the packet broadcast by the payment module 100 is further discussed below with reference to FIG. 24A.

In some implementations, the payment module 100 sends out a unique authorization code every X seconds (e.g., 100 ms, 200 ms, 500 ms, etc.). In some implementations, the unique authorization codes are randomly or pseudo-randomly generated numbers. In some implementations, the payment module 100 stores broadcasted authorization codes until a received authorization grant token matches one of the stored authorization codes. In some implementations, the payment module 100 stores broadcasted authorization codes for a predetermined amount of time (e.g., Y minutes) after which time an authorization code expires and is deleted. In some implementations, the authorization code is encrypted with a shared secret key known by the server 130 but unique to the payment module 100. In some implementations, the payment module 100 initializes a random number and then the authorization codes are sequential counts from this random number. In such implementations, the payment module 100 stores the earliest valid (unexpired) counter without a need to store every valid authorization code. In some implementations, the authentication code included in the broadcast packet of information is a hash value of the randomly or pseudo-randomly generated number or the sequential number.

The mobile device 150 receives the broadcasted packet of information, and the mobile device 150 sends (1004), via a long-range communication capability (e.g., GSM, CDMA, Wi-Fi, or the like), an authorization request to the server 130. For example, an application 140 that is associated with the payment processing system is executing as a foreground or background process on the mobile device 150. In this example, the application 140 receives the broadcasted packet of information when the mobile device 150 is within the communication zone of the payment module 100 (i.e., BLE range) and either automatically sends the authorization request to the server 130 or sends the authorization request to the server 130 when the mobile device 150 is within the authorization zone of the payment module 100. In some implementations, the broadcasted packet of information includes a baseline authorization zone threshold (i.e., an authorization zone criterion) indicating a baseline RSSI that the mobile device 150 (or the application 140) is required to observe before being within the authorization zone of the payment module 100. In some implementations, the mobile device 150 (or the application 140) offsets the baseline authorization zone threshold based on the strength and/or reception of the short-range communication capability (e.g., BLE radio/transceiver) of the mobile device 150. In some implementations, the authorization request at least includes the authorization code which was included in the broadcasted packet of information, an identifier associated with the user of the mobile device 150 or the user account under which the user of the mobile device 150 is logged into the application 140 (user ID), and the identifier associated with the payment module 100 (module ID). In some implementations, the authentication code included in authorization request is the hash value in cleartext. The authorization request is further discussed below with reference to FIG. 24B.

After receiving the authorization request, the server 130 processes (1006) the authorization request. In some implementations, the server 130 decrypts the authorization code included in the authorization request with the shared secret key corresponding to the payment module 100. In some implementations, the server 130 determines whether the user associated with the user ID in the authorization request has sufficient funds in his/her account for the payment processing system to perform a transaction at the machine 120 that is associated with the payment module 100 corresponding to the module ID in the authorization request.

The server 130 sends (1008), via a long-range communication capability (e.g., GSM, CDMA, Wi-Fi, or the like), an authorization grant token to the mobile device 150. In some implementations, the server 130 does not send the authorization grant token if the authorization code in the authorization request cannot be decrypted with the shared secret key corresponding to the payment module 100 (e.g., the authorization code is corrupted or hacked). In some implementations, the server 130 does not send the authorization grant token if the user associated with the user ID in the authorization request does not have sufficient funds in his/her account. In some implementations, in addition to the authorization grant token, the server 130 sends a message directly to the mobile device 150 which is not encrypted with the shared secret key corresponding to the payment module 100. After receiving the message, the mobile device 150 displays an appropriate message to the user such as insufficient balance or declined authorization. In some implementations, the server 130 sends an authorization grant token for an amount equal to zero; in which case, the payment module 100 interprets this as a declined or failed authorization which can result for any number of reasons including, but not limited to, insufficient balance or credit.

The mobile device 150 receives the authorization grant token, and, subsequently, the mobile device 150 detects (1010) a trigger condition. In some implementations, the mobile device 150 (or the application 140) detects the trigger condition via the hand-free mode (e.g., upon entrance into the payment zone of the payment module 100) or manual mode (e.g., interacting with the user interface of the application 140 to initiate a transaction with the payment accepting unit associated with the payment module 100).

In some implementations, unused authorization grants (e.g., if there was no trigger condition or it expired) are canceled by the mobile device 150 by sending a cancellation message to the server 130 corresponding to the unused authorization grant. In some implementations, the server 130 denies or limits the number of authorization grants sent to the mobile device 150 until it has received transaction information or cancellation of authorization outstanding authorization grants sent to the mobile device 150.

In response to detecting the trigger condition, the mobile device 150 sends (1012), via a short-range communication capability (e.g., BLE), the authorization grant token to the payment module 100. Subsequently, the machine 120 displays credit to the user (e.g., via one of the displays 122 or 124 shown in FIG. 19) and the user interacts with the input mechanisms of the machine 120 (e.g., via the buttons 126 or a touch screen display 124 shown in FIG. 19) to purchase products and/or services.

Figure 24A:
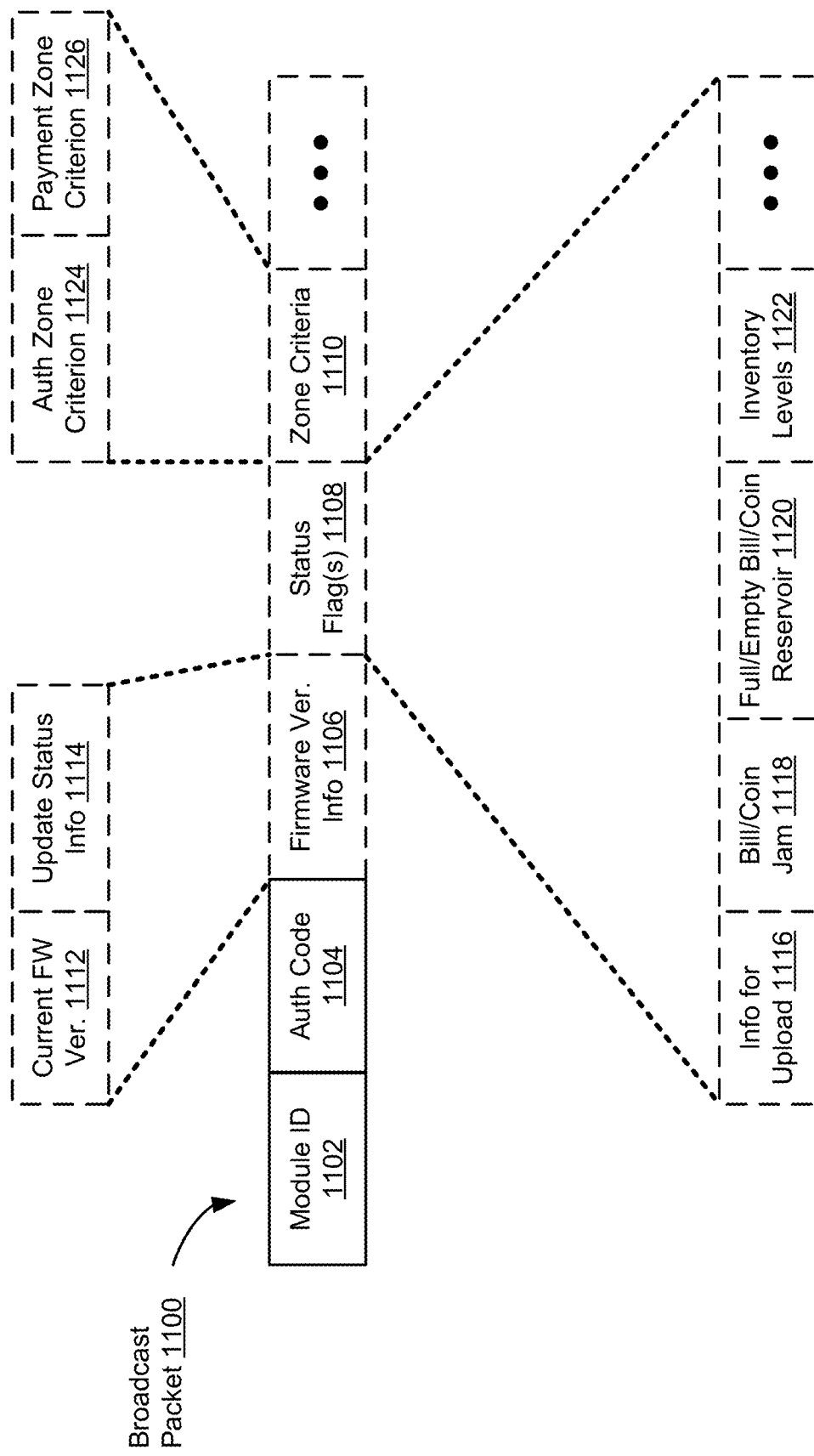
FIG. 24A is a block diagram of a packet of information broadcast by the payment module (sometimes also herein called the "adapter module") in accordance with some implementations.

FIG. 24A illustrates a block diagram of a packet 1100 of information broadcast by the payment module 100 (e.g., in step 1002 of the process 1000 in FIG. 23) in accordance with some implementations. In some implementations, the packet 1100 at least includes: module ID 1102 and authorization code 1104. In some implementations, the packet 110 additional includes: a firmware version 1106 and one or more status flags 1108.

In some implementations, the module ID 1102 is a unique identifier corresponding to the payment module 100 (sometimes also herein called the "adapter module 100") that broadcast the packet 1100.

In some implementations, the authorization code 1104 is a hash value in cleartext. In some implementations, the payment module 100 randomly or pseudo-randomly generates a number or determines a sequential number (See step 1002 of process 1000 in FIG. 23) and performs a predetermined hash function (e.g., SHA-256) on the number to produce the hash value as the authorization code 1104. In some implementations, the authorization code 1104 is a unique code that is encrypted with a secret encryption key corresponding to the payment module 100. The secret encryption key is shared with the server 130, which enables the server 130 to decrypt the authorization code 1104 and encrypt the authorization grant token but not the mobile device 150. In some implementations, the encryption between server 130 and payment module 100 is accomplished by two pairs of public/private keys.

In some implementations, the firmware version information 1106 identifies a current firmware version 1112 of the payment module 100. In some implementations, the firmware version information 1106 also includes update status information 1114 indicating one or more packets received by the payment module 100 to update the firmware or one or more packets needed by the payment module 100 to update the firmware. In some implementations, the one or more status flags 1108 indicate a state of the payment module 100 and/or the payment accepting unit 120 associated with the payment module 100. In some implementations, the one or more status flags 1108 indicate a state of the payment module 100 such upload information indicator 1116 indicating that that the payment module 100 has information to be uploaded to the server 130 (e.g., transaction information for one or more interrupted transactions). In some implementations, upload information indicator 1116 triggers the mobile device 150 to connect to payment module 100 immediately (e.g., if it has interrupted transaction information to be uploaded to the server 130). In some implementations, the one or more status flags 1108 indicate a state of the payment accepting unit 120 including one or more of an error indicator 1118 (e.g., indicating that a bill and/or coin acceptor of the payment accepting unit 120 is experiencing a jam, error code, or malfunction), a currency level indicator 1120 (e.g., indicating that the level of the bill and/or coin acceptor reservoir of the payment accepting unit 120 is full or empty), and/or inventory level(s) indicator 1122 (e.g., indicating that one or more products of the payment accepting unit 120. In some implementations, the one or more status flags 1108 are error codes issued by payment accepting unit 120 over the MDB.

In some implementations, the zone criteria information 1110 specifies an authorization zone criterion 1124 (e.g., a baseline authorization zone threshold indicating a baseline RSSI that the mobile device 150 (or the application 140) is required to observe before being within the authorization zone of the payment module 100) and/or a payment zone criterion 1126 (e.g., a baseline payment zone threshold indicating a baseline RSSI that the mobile device 150 (or the application 140) is required to observe before being within the payment zone of the payment module 100). In some implementations, the baseline authorization zone threshold and the baseline payment zone threshold are default values determined by the server 130 or stored as variables by the application 140, in which case the authorization zone criterion 1124 and payment zone criterion 1126 are offsets to compensate for the strength and/or reception of the short-range communication capability (e.g., BLE radio/transceiver) of the payment module 100. Alternatively, zone criteria information 1110 includes a spread between the baseline authorization zone threshold and the baseline payment zone threshold. Thus, the mobile device 150 (or the application 140) determines the baseline authorization zone threshold and the baseline payment zone threshold based on the spread value and a default value for either the baseline authorization zone threshold or the baseline payment zone threshold. For example, the spread indicates −10 db and the default baseline payment zone threshold is −90 db; thus, the baseline authorization zone threshold is −80 db. Continuing with this example, after determining the baseline authorization zone threshold and the baseline payment zone threshold, the mobile device 150 (or the application 140) may further adjust the authorization zone threshold and/or the payment zone threshold based on the strength and/or reception of its short-range communication capability (i.e., BLE radio/transceiver).

Figure 24B:
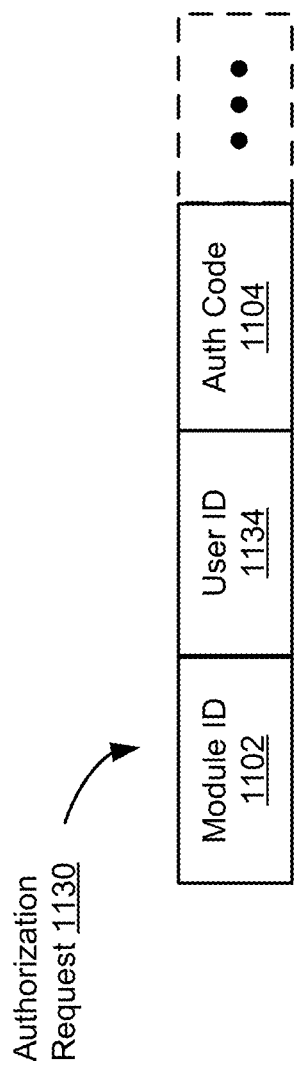
FIG. 24B is a block diagram of an authorization request in accordance with some implementations.

FIG. 24B is a block diagram of an authorization request 1130 sent by the mobile device 150 to the server 130 (e.g., in step 1004 of the process 1000 in FIG. 23) in accordance with some implementations. In some implementations, the authorization request 1130 at least includes: a module ID 1102, a user ID 1134, and an authorization code 1104.

In some implementations, the module ID 1102 is a unique identifier corresponding to the payment module 100 that broadcast the 1100 that included the authorization code 1104.

In some implementations, the user ID 1134 is an identifier associated with the user of the mobile device 150 sending the authorization request 1130 to the server 130. In some implementations, the user ID 1134 is associated with the user account under which the user of the mobile device 150 is logged into the application 140.

In some implementations, the authorization code 1130 includes the authorization code 1104 included in the packet 1100 of information that was broadcast by the payment module 100.

Figure 24C:
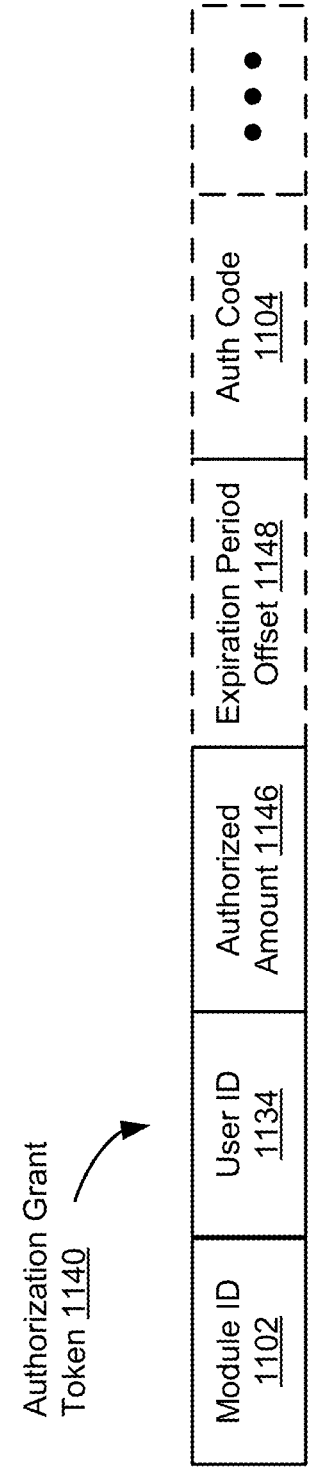
FIG. 24C is a block diagram of an authorization grant token in accordance with some implementations.

FIG. 24C is a block diagram of an authorization grant token 1140 sent by the server 130 to the mobile device 150 (e.g., in step 1008 of the process 1000 in FIG. 23) in accordance with some implementations. In some implementations, in accordance with a determination that the authorization code 1136 included in the authorization request 1130 from the mobile device 150 is valid and that the user associated with the mobile device 150 has sufficient funds in his/her account for the payment processing system, the server 130 generates the authorization grant token 1140. In some implementations, the authorization grant token 1140 at least includes: a module ID 1102, a user ID 1134, an authorized amount 1146, (optionally) an expiration period offset 1148, and (optionally) the authorization code 1104.

In some implementations, the module ID 1102 is a unique identifier corresponding to the payment module 100 that broadcast the packet 1100 that included the authorization code 1104.

In some implementations, the user ID 1134 is an identifier associated with the user of the mobile device 150 that sent the authorization request 1130 to the server 130.

In some implementations, the authorized amount 1146 indicates a maximum amount for which the user of the mobile device 150 is authorized for a transaction using the authorization grant token 1140. For example, the authorized amount 1146 is predefined by the user of the mobile device 150 or by the server 130 based on a daily limit or based on the user's total account balance or based on a risk profile of the user correspond to the user ID 1134.

In some implementations, the expiration period 1148 offset indicates an offset to the amount of time that the payment module 100 holds the authorization grant token 1140 valid for initiation of a transaction with the machine 120 associated with the payment module 100. For example, the expiration period offset 1148 depends on the history and credit of the user of mobile device 150 or a period predefined by the user of mobile device 150.

In some implementations, the authorization grant token 1140 further includes the authorization code 1104 that was included in the authorization request 1130. In some implementations, when the authorization code 1104 is the hash value, the server 130 encrypts the authorization grant token 1140 including the hashed value with the shared secret encryption key associated with payment module 100. Subsequently, when mobile device 150 sends the authorization grant token 1140 to payment module 100 after detecting a trigger condition, the payment module 100 decrypts the authorization grant token 1140 using the secret key known only to server 130 and payment module 100 (which authenticates the message and the authorization grant), and then matches the hash value included in the decrypted authorization grant token 1140 to previously broadcast valid (unexpired) hash values (i.e., auth codes) to determine validity of the (which was known only by payment module 100).

Figure 24D:
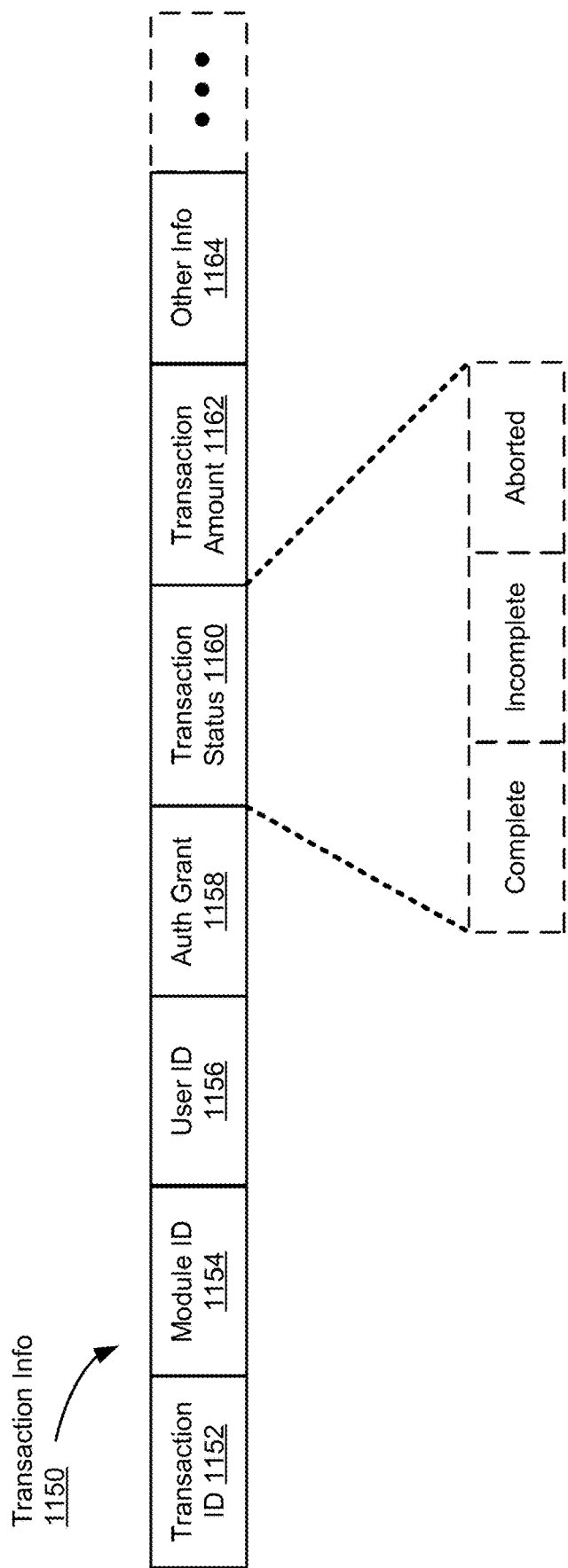
FIG. 24D is a block diagram of transaction information generated by the payment module in accordance with some implementations.

FIG. 24D illustrates a block diagram of transaction information 1150 generated by the payment module 100 (e.g., in step 1254 of the process 1250 in FIG. 25B) in accordance with some implementations. In some implementations, the transaction information 1150 includes: a transaction ID 1152 for the respective transaction, a module ID 1154, a user ID 1156, (optionally) the authorization code 1158, transaction status information 1160, the transaction amount 1162, and other information 1164.

In some implementations, the transaction ID 1152 is a unique identifier corresponding to the respective transaction. In some implementations, the transaction ID 1152 is encoded based on or associated with the time and/or date on which and the location at which the respective transaction took place.

In some implementations, the module ID 1154 is a unique identifier corresponding to the payment module 100 that performed the respective transaction.

In some implementations, the user ID 1156 is an identifier associated with the user of the mobile device 150 that initiated the respective transaction.

In some implementations, the authorization code 1158 corresponds to the original authorization code (e.g., auth code 1104, FIGS. 24A-24C) and/or authorization grant token (e.g., auth grant token 1140, FIG. 24C) that was used to initiate the respective transaction. In some implementations, the authorization code 1156 is encrypted with a unique encryption key corresponding to the payment module 100.

In some implementations, the transaction status information 1160 includes an indication whether the respective transaction was completed, not-completed, or aborted. For example, the respective transaction is incomplete if a jam occurred at the payment accepting unit 120 and the user did not receive the product associated with the respective transaction. For example, if the user walks away from the payment accepting unit 120 after money was credited for the respective transaction, the respective transaction is aborted. In another example, if respective transaction times out after a predetermined time period because the user failed to select a product at the payment accepting unit 120, the respective transaction is aborted. In another example, if the user actuates a bill or coin return mechanism of the payment accepting unit 120, the respective transaction is aborted.

In some implementations, the transaction amount 1162 indicates the amount of the respective transaction or the amount of each of multiple transactions (e.g., in a multi-vend scenario). In some implementations, the transaction amount 1162 is encrypted with a unique encryption key corresponding to the payment module 100.

In some implementations, the other information 1164 includes other information related to the respective transaction such as the items dispensed by the payment accepting unit 120 and the type of transaction (e.g., coins, bills, credit card, manual mode, hands-free mode, etc.). In some implementations, the other information 1164 includes other information related to the payment module 100 and/or the payment accepting unit 120 associated with the payment module 100. For example, the other information 1164 includes a verification request to the server 130 in order to implement new firmware. In another example, the other information 1164 includes transaction information from one or more previous interrupted transactions. In another example, the other information 1164 includes transaction information for one or more transactions paid via bills and/or coins. In another example, the other information 1164 includes inventory information as to one or more products of the payment accepting unit 120.

Figure 25A:
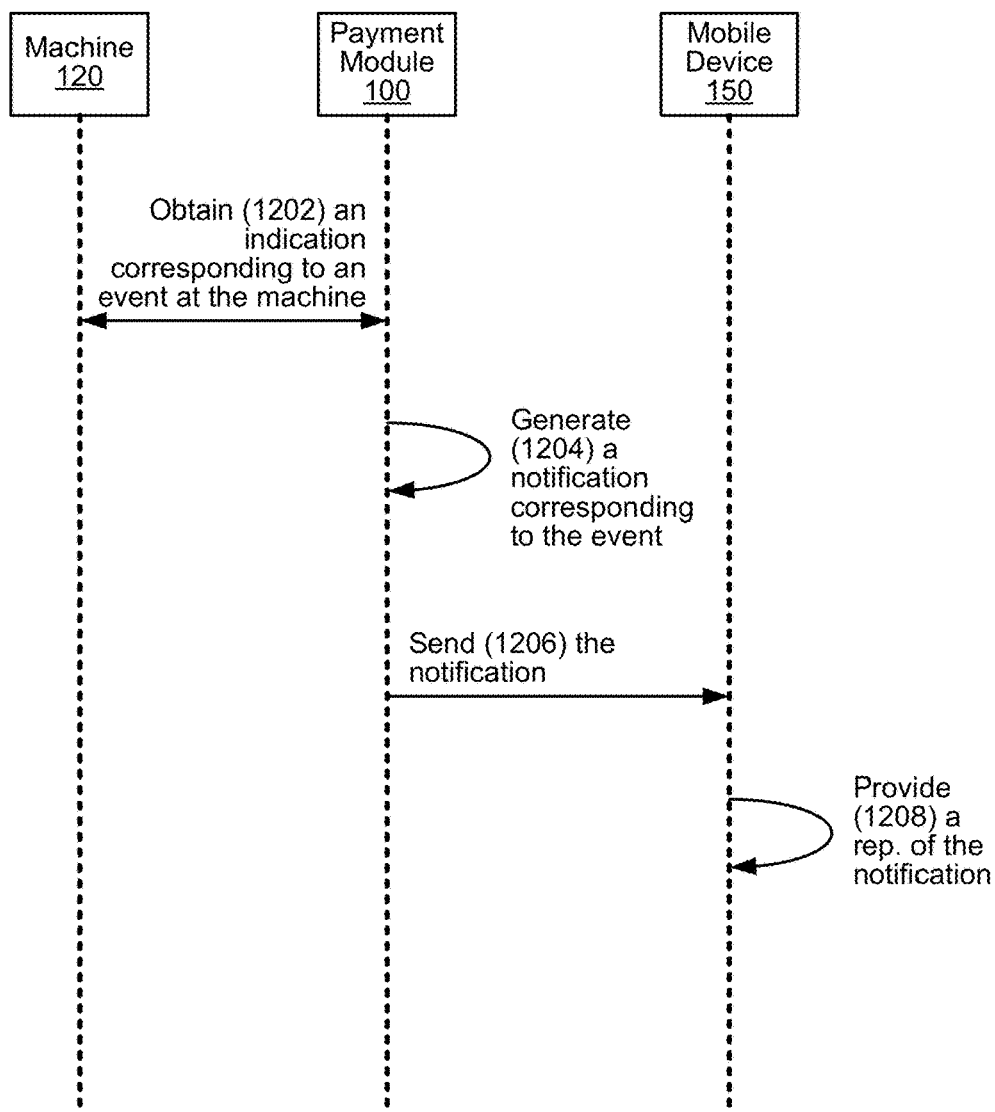
FIG. 25A illustrates a schematic flow diagram of a process for providing a representation of a machine event at a mobile device in accordance with some implementations

FIG. 25A illustrates a schematic flow diagram of a process 1200 for providing a representation of a machine event at a mobile device in accordance with some implementations. In some implementations, the payment processing system includes one or more payment modules 100 (e.g., each associated with a respective payment accepting unit 120 such an automatic retailing machine for dispensing goods and/or services), one or more mobile devices 150 (e.g., each executing the application 140 for the payment processing system either as a foreground or background process), and the server 130. The server 130 manages the payment processing system and, in some cases, supplies, operates, and/or manufactures the one or more payment modules 100. For brevity, the process 1200 will be described with respect to a respective payment module 100 associated with a respective payment accepting unit 120 (sometimes also herein called the "machine 120") and a respective mobile device 150 in the payment processing system.

In some implementations, the process 1200 occurs after the mobile device 150 sends the AuthGrant in FIG. 8C. In some implementations, the process 1200 occurs after the mobile device 150 sends the authorization grant to the payment module 100 in operation 1012 of process 1000 in FIG. 23.

The payment module 100 obtains (1202) an indication corresponding to an event at the machine 120. For example, after the process 1000 in FIG. 23, the user of the mobile device 150 selects a product to purchase from the machine 120 by interacting with one or more input mechanisms of the machine 120 (e.g., buttons 126 or a touch screen display 124 shown in FIG. 19), and the machine 120 dispenses the selected product. Continuing with this example, after the product is dispensed, the transaction is complete and the payment module 100 obtains an indication from the machine of the completed transaction. In some implementations, the indication includes the amount of the transaction and (optionally) machine status information associated with the machine 120 such as inventory information as to one or more products of the payment accepting unit 120 and/or the like. In some implementations, the indication includes status information indicating that the transaction was aborted (e.g., via actuation of a coin return mechanism at the machine 120) or that there was an error with the transaction (e.g., a vending jam or other malfunction with the machine 120).

After obtaining the indication corresponding to completion of the first transaction, the payment module 100 generates (1204) a notification corresponding to the event at the machine 120.

The payment module 100 sends (1206), via a short-range communication capability (e.g., BLE), the notification to the mobile device 150. In some embodiments, in addition to the notification corresponding to the event at machine 120, the payment module 100 sends a promotion or advertisement to the mobile device 150 that is targeted to the user of the mobile device 150 based on the transaction or the user ID included in the AuthGrant or authorization grant token that initiated the transaction. In some embodiments, in addition to the notification corresponding to the event at machine 120, the payment module 100 sends a pseudo randomly selected promotion or advertisement to the mobile device 150 that is selected from a set of promotions or advertisements stored by the payment module 100. For example, the promotion is a coupon for a free soda following the purchase of ten sodas from the machine 120 by the user of the mobile device 150. For example, the promotion is a random 50% off coupon or free soda coupon. For example, the transaction corresponds to a vended soda and the advertisement corresponds to a new soda from the same company that produces the vended soda.

The mobile device 150 provides (1208) a representation of the notification. For example, in FIG. 26A, the mobile device 150 displays user interface 1302 on touch screen 152 with a message 1306 that indicates that the first transaction is complete. For example, in FIG. 26C, the mobile device 150 displays user interface 1320 on touch screen 152 with a message 1322 that indicates that the transaction was aborted. For example, in FIG. 26D, the mobile device 150 displays user interface 1330 on touch screen 152 with a message 1332 that indicates that there was an error with the transaction. For example, the mobile device 150 also displays a representation of the promotion of advertisement on the user interface for the application 140.

Figure 25B:
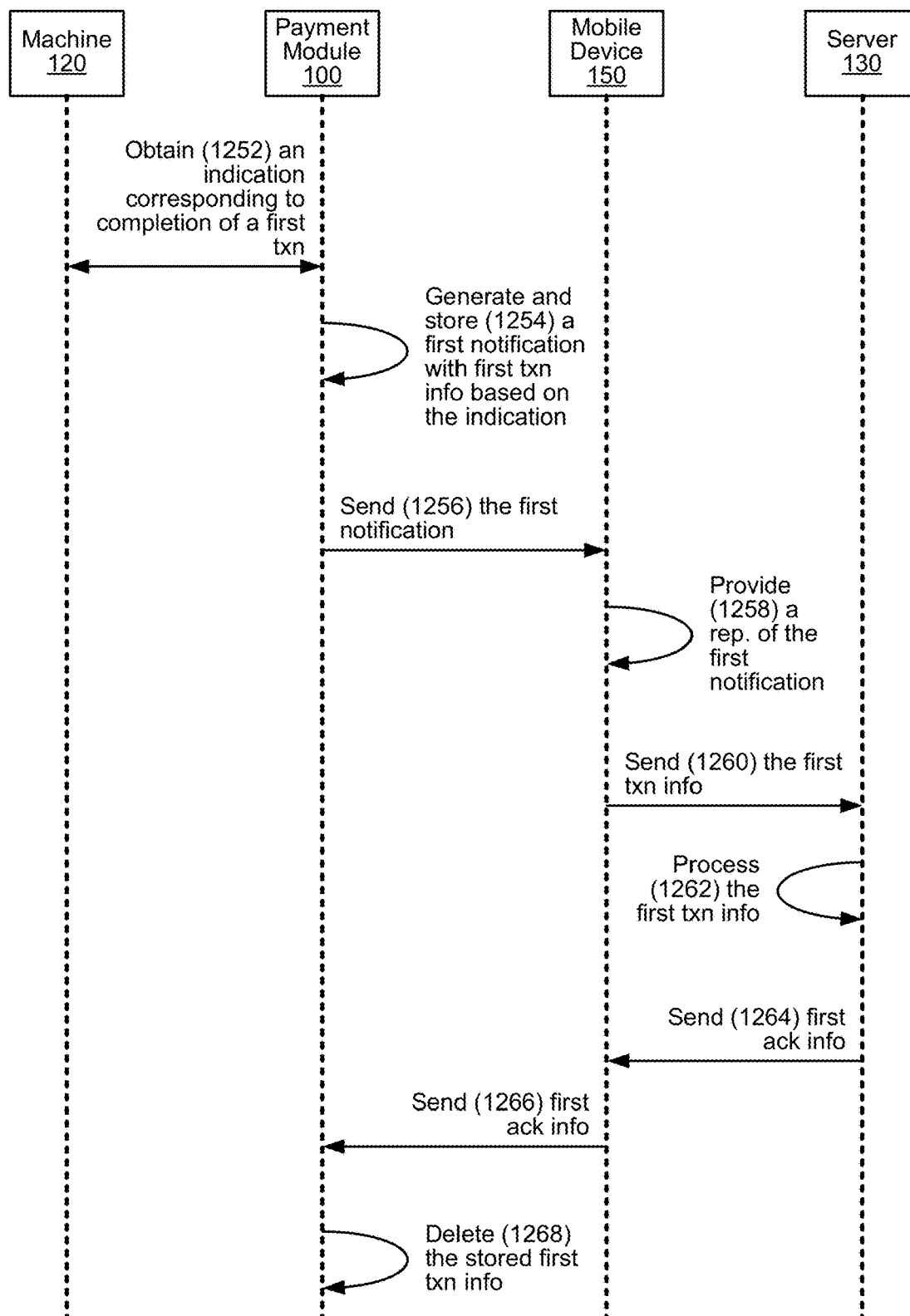
FIG. 25B is a schematic flow diagram of a process for processing acknowledgment information in the payment processing system in accordance with some implementations.

FIG. 25B illustrates a schematic flow diagram of a process 1250 for processing acknowledgement information in accordance with some implementations. In some implementations, the payment processing system includes one or more payment modules 100 (e.g., each associated with a respective payment accepting unit 120 such an automatic retailing machine for dispensing goods and/or services), one or more mobile devices 150 (e.g., each executing the application 140 for the payment processing system either as a foreground or background process), and the server 130. The server 130 manages the payment processing system and, in some cases, supplies, operates, and/or manufactures the one or more payment modules 100. For brevity, the process 1250 will be described with respect to a respective payment module 100 associated with a respective payment accepting unit 120 (machine 120) and a respective mobile device 150 in the payment processing system.

In some implementations, the process 1250 occurs after the mobile device 150 sends the AuthGrant in FIG. 8C. In some implementations, the process 1250 occurs after the mobile device 150 sends the authorization grant to the payment module 100 in operation 1012 of process 1000 in FIG. 23.

The payment module 100 obtains (1252) an indication corresponding to completion of a first transaction from the machine 120. For example, after the process 1000 in FIG. 23, the user of the mobile device 150 selects a product to purchase from the machine 120 by interacting with one or more input mechanisms of the machine 120 (e.g., buttons 126 or a touch screen display 124 shown in FIG. 19), and the machine 120 dispenses the selected product. Continuing with this example, after the product is dispensed, the transaction is complete and the payment module 100 obtains an indication from the machine of the completed transaction. In some implementations, the indication includes the amount of the transaction and (optionally) machine status information associated with the machine 120 such as inventory information as to one or more products of the payment accepting unit 120 and/or the like.

After obtaining the indication corresponding to completion of the first transaction, the payment module 100 generates (1254) a first notification with first transaction information based on the indication, and the payment module 100 stores the first transaction information. In some implementations, the first transaction information includes a transaction ID for the first transaction, a module ID corresponding to payment module 100, a user ID corresponding to the mobile device 150, transaction status information indicating that the first transaction is complete, and the transaction amount indicated by the indication. In some implementations, the payment module 100 retains the authorization code included in the original broadcasted packet and/or the authorization grant token and includes the authorization code in the first transaction information. In some implementations, the authorization code is encrypted with a secret key corresponding to the payment module 100, which is shared with the server 130 but not the mobile device 150. In some implementations, the first transaction information further includes other information such as the machine status information included in the first notification or transaction information corresponding to previous interrupted transaction(s). See FIG. 24D and the accompanying text for further discussion regarding transaction information 1150.

The payment module 100 sends (1256), via a short-range communication capability (e.g., BLE), the first notification with first transaction information to the mobile device 150. In some embodiments, in addition to first transaction information corresponding to completion of the first transaction at machine 120, the first notification includes a promotion or advertisement to the mobile device 150 that is targeted to the user of the mobile device 150 based on the transaction or the user ID included in the AuthGrant or authorization grant token that initiated the transaction. In some embodiments, in addition to first transaction information corresponding to completion of the first transaction at machine 120, the first notification includes a pseudo randomly selected promotion or advertisement to the mobile device 150 that is selected from a set of promotions or advertisements stored by the payment module 100. For example, the promotion is a coupon for a free soda following the purchase of ten sodas from the machine 120 by the user of the mobile device 150. For example, the promotion is a random 50% off coupon or free soda coupon. For example, the transaction corresponds to a vended soda and the advertisement corresponds to a new soda from the same company that produces the vended soda.

The mobile device 150 provides (1258) a representation of the first notification. For example, in FIG. 26A, the mobile device 150 displays user interface 1302 on touch screen 152 with a message 1306 that indicates that the first transaction is complete. For example, the mobile device 150 also displays a representation of the promotion of advertisement on the user interface for the application 140.

The mobile device 150 sends (1260), via a long-range communication capability (e.g., GSM, CDMA, Wi-Fi, or the like), the first transaction information to the server 130.

The server 130 processes (1262) the first transaction information. For example, the server 130 debits the account of the user associated with the user ID in the first transaction information in the amount indicated by the first transaction information.

The server 130 sends (1264), via a long-range communication capability (e.g., GSM, CDMA, Wi-Fi, or the like), first acknowledgment information to the mobile device 150. In some implementations, the first acknowledgment information acknowledges that the server 130 received the first transaction information. In some implementations, the first acknowledgment information includes the user ID, the module ID, the transaction ID, and (optionally) the authorization grant included in the transaction information (e.g., auth grant 1158, FIG. 24D).

After receiving the first acknowledgement information, the mobile device 150 sends (1266), via a short-range communication capability (e.g., BLE), the first acknowledgment information to the payment module 100.

After receiving the first acknowledgment information, the payment module 100 deletes (1268) the stored first transaction information.

Attention is now directed towards implementations of user interfaces and associated processes that may be implemented on the mobile device 150 with zero or more speakers, zero or more microphones, and a display. For example, the display is a touch screen (sometimes also herein called a "touch screen display") enabled to receive one or more contacts and display information (e.g., media content, websites and web pages thereof, user interface for the application 140, and/or user interfaces for applications). FIGS. 26A-26D illustrate example user interfaces for providing a representation of a machine event at a mobile device in accordance with some implementations.

FIGS. 26A-26D show user interfaces displayed on mobile device 150 (e.g., a mobile phone); however, one skilled in the art will appreciate that the user interfaces shown in FIGS. 26A-26D may be implemented on other similar computing devices. The user interfaces in FIGS. 26A-26D are used to illustrate the processes described herein, including the process described with respect to FIGS. 25A-25B and 27A-27B.

For example, a user of the mobile device 150 approaches a machine 120 (e.g., vending machine 78x928 as shown in FIGS. 10A-10D) and executes application 140 on the mobile device 150 so as to perform an electronic transaction with the machine 120. For example, with reference to FIGS. 10C-10D, the user of the mobile device 150 initiates a transaction with the machine 120 (e.g., vending machine 78x928) by performing a swipe gesture at a location corresponding to the representation of the dollar bill (e.g., a substantially vertical swipe gesture from a location corresponding to the representation of the dollar bill to the top edge of the mobile device 150).

Figure 26A:
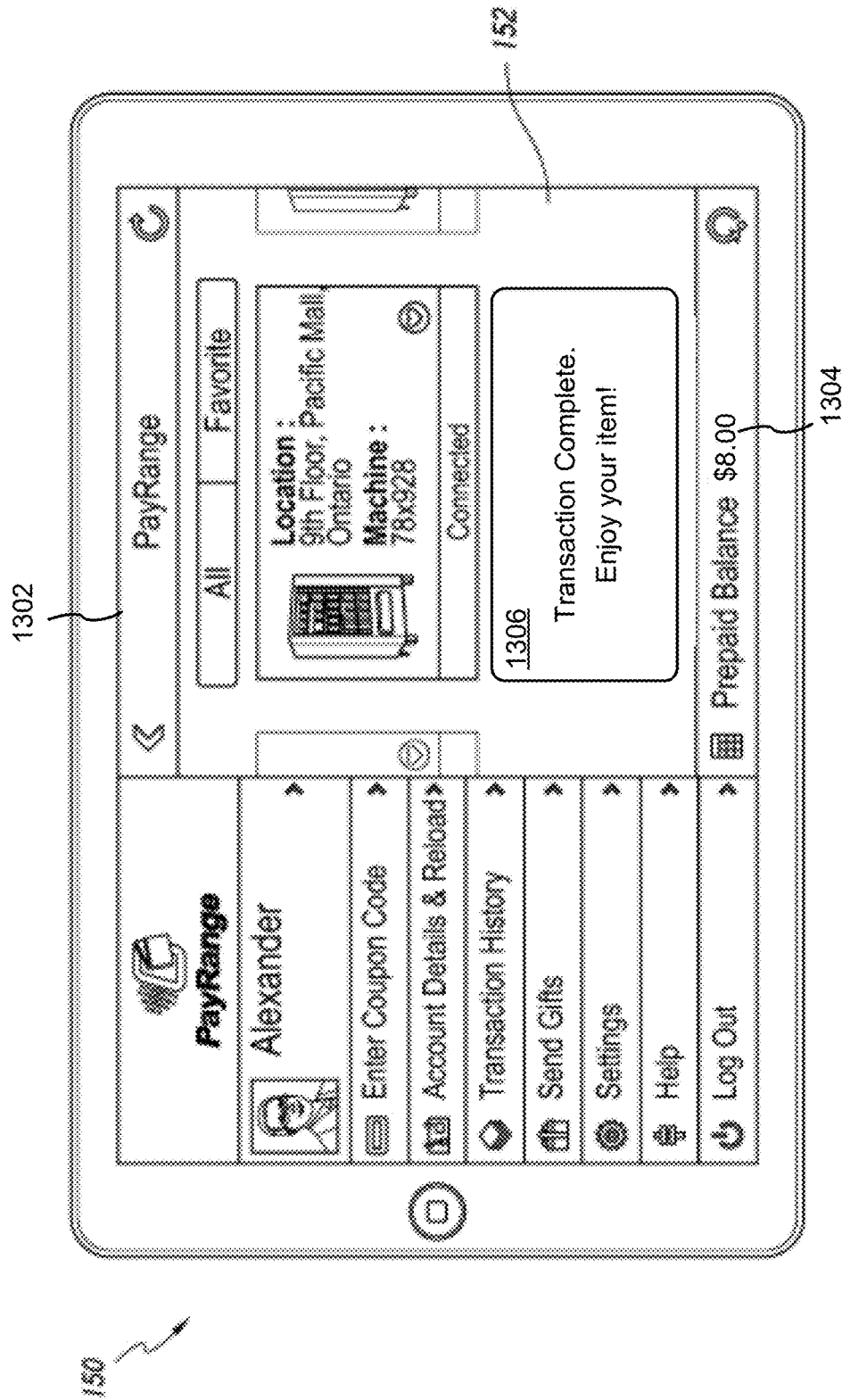
FIGS. 26A-26D illustrate example user interfaces for providing a representation of a machine event at a mobile device in accordance with some implementations.

FIG. 26A illustrates the mobile device 150 displaying a user interface 1302 of the application 140 on touch screen 152 after the user of the mobile device 150 initiates and performs a transaction with the machine 120. In FIG. 26A, the user interface 1302 includes prepaid balance 1304 which indicates that $1.00 has been deducted from the prepaid balance after performing a transaction with the machine 120 as compared to the prepaid balance in FIG. 10C-10D (i.e., $9.00 in FIGS. 10C-10D and $8.00 in FIG. 26A). In FIG.

26A, the user interface 1302 also includes a message 1306 indicating that the transaction with the machine 120 is complete.

Figure 26B:
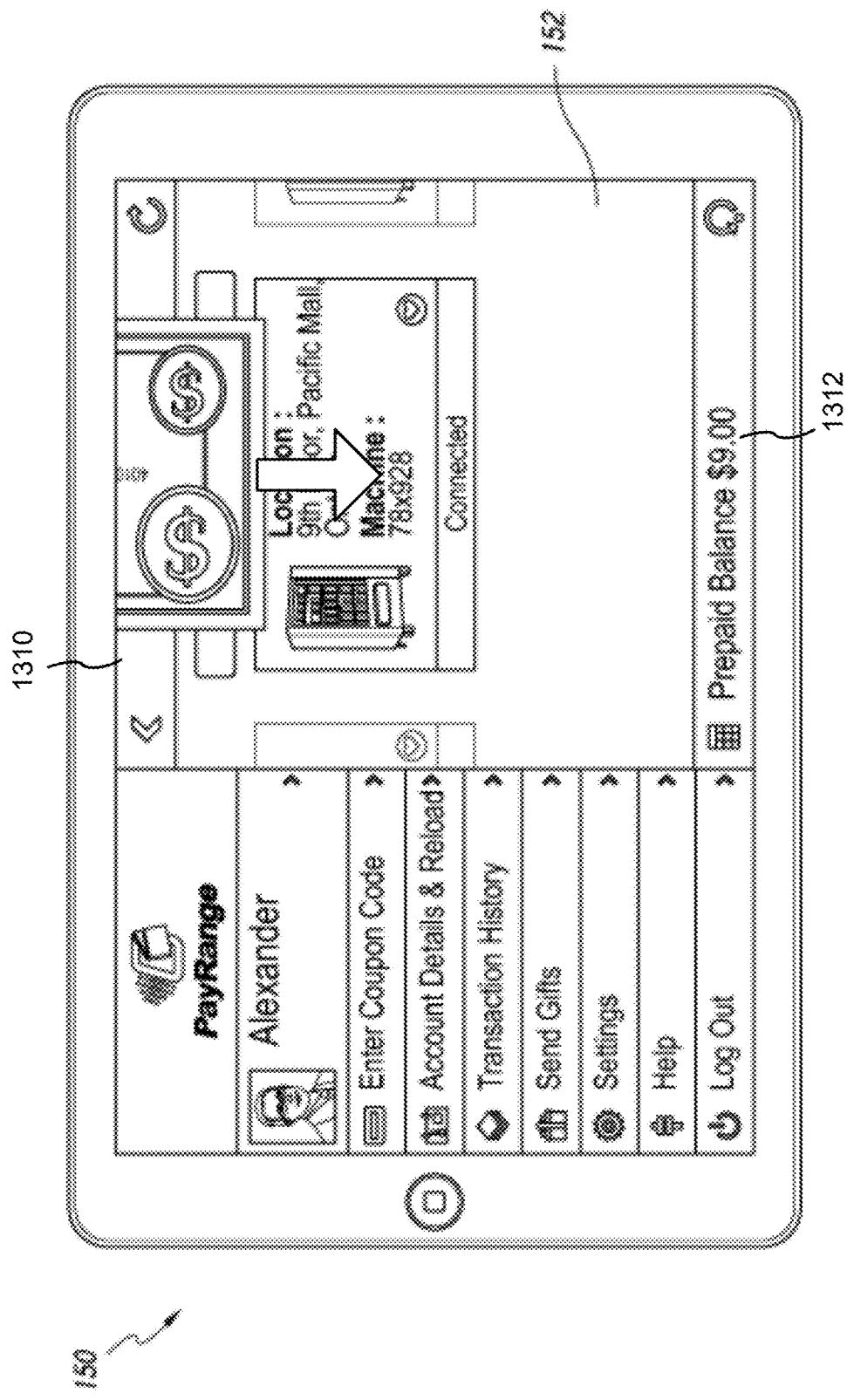

FIG. 26B illustrates the mobile device 150 displaying a user interface 1310 of the application 140 on touch screen 152 after the user of the mobile device 150 initiates a transaction with the machine 120 and an error with the transaction occurs or the transaction is aborted. In FIG. 26B, the user interface 1310 shows the representation of the dollar bill sliding onto the touch screen 152 (e.g., in a substantially top to bottom manner). In FIG. 26B, the interface 1310 includes prepaid balance 1312 which indicates that no money has been deducted from the prepaid balance after performing a transaction with the machine 120 as compared to the prepaid balance in FIG. 10C-10D (i.e., $9.00 in FIGS. 10C-10D and $9.00 in FIG. 26B).

Figure 26C:
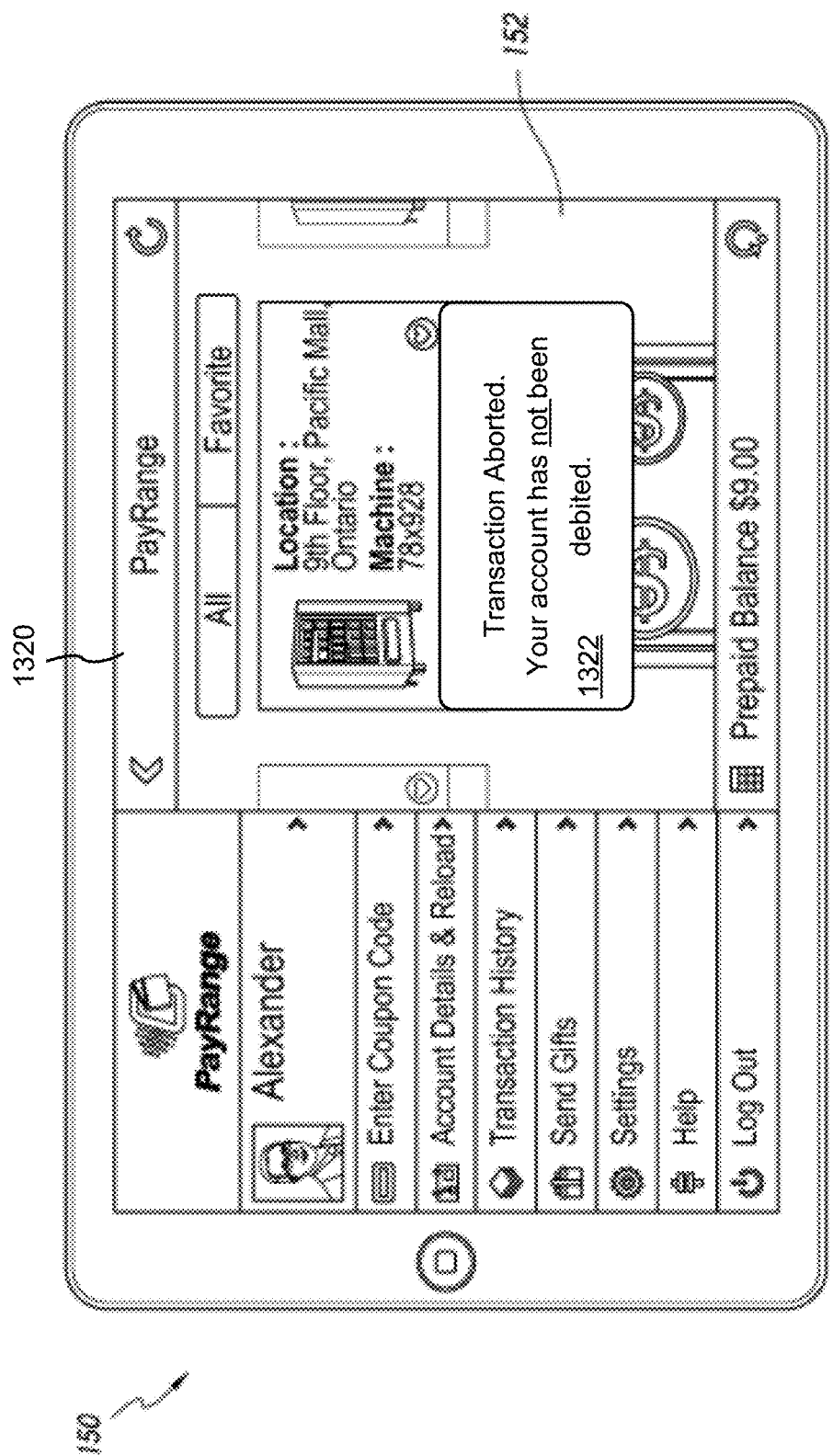

FIG. 26C illustrates the mobile device 150 displaying a user interface 1320 of the application 140 on touch screen 152 after the representation of the dollar bill slides onto the touch screen 152 in FIG. 26B due to the transaction being aborted. For example, the user aborts the transaction by actuating a coin return mechanism of the machine 120. In another example, the user aborts the transaction by selection an abort affordance on the interface of the application 140 (not shown). In FIG. 26C, the user interface 1320 includes a message 1322 indicating that the transaction with the machine 120 was aborted and that the user's account was not debited for the aborted transaction.

Figure 26D:
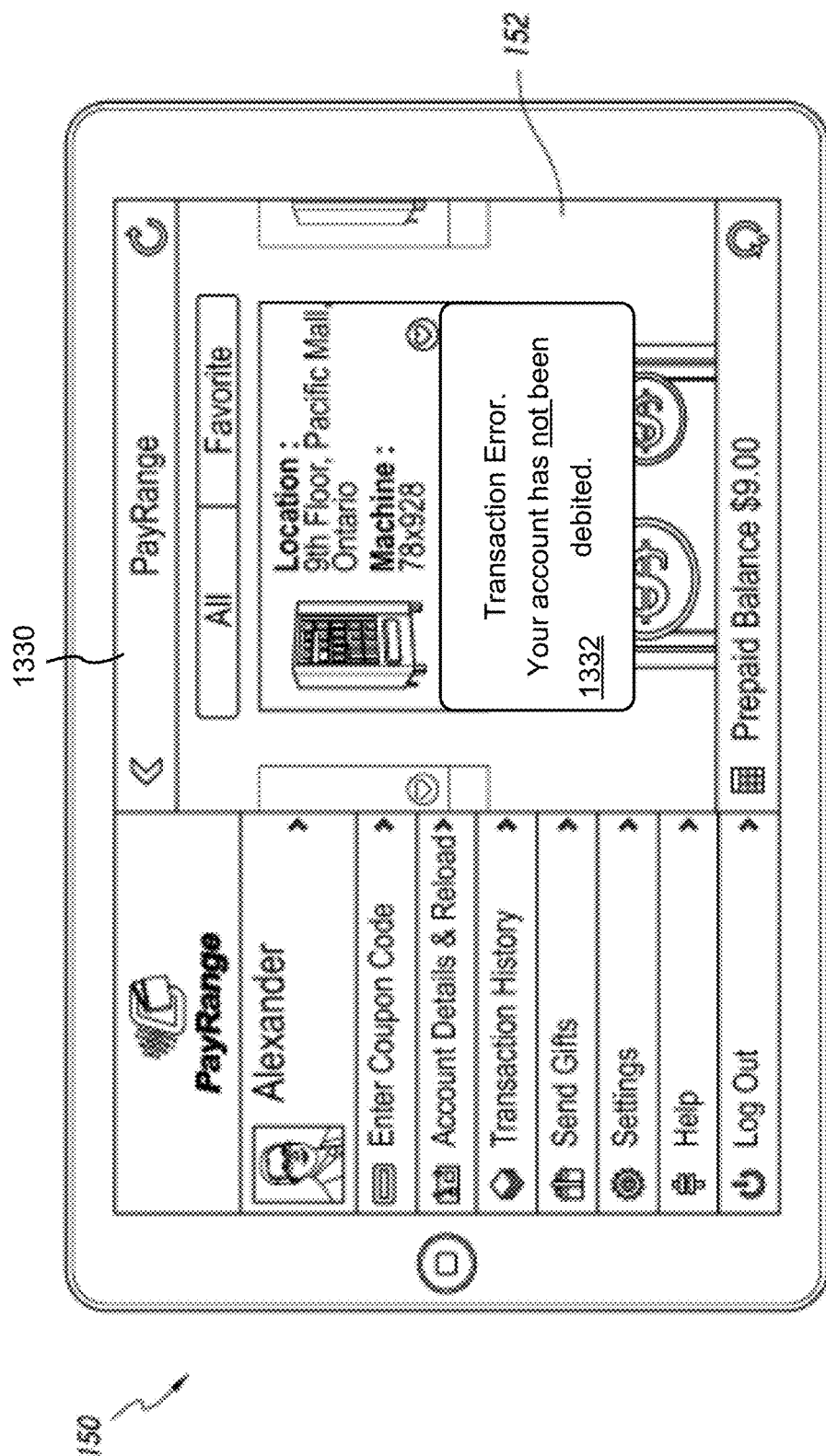

FIG. 26D illustrates the mobile device 150 displaying a user interface 1330 of the application 140 on touch screen 152 after the representation of the dollar bill slides onto the touch screen 152 in FIG. 26B due to the occurrence of an error with the transaction. For example, a malfunction with the machine 120 (e.g., a vending jam or stuck item) causes the error to occur. In FIG. 26D, the user interface 1330 is associated with the application 140 executed on the mobile device 150. In FIG. 26D, the user interface 1330 includes a message 1332 indicating that an error occurred during the transaction with the machine 120 and that the user's account was not debited for the transaction.

Figure 27B:
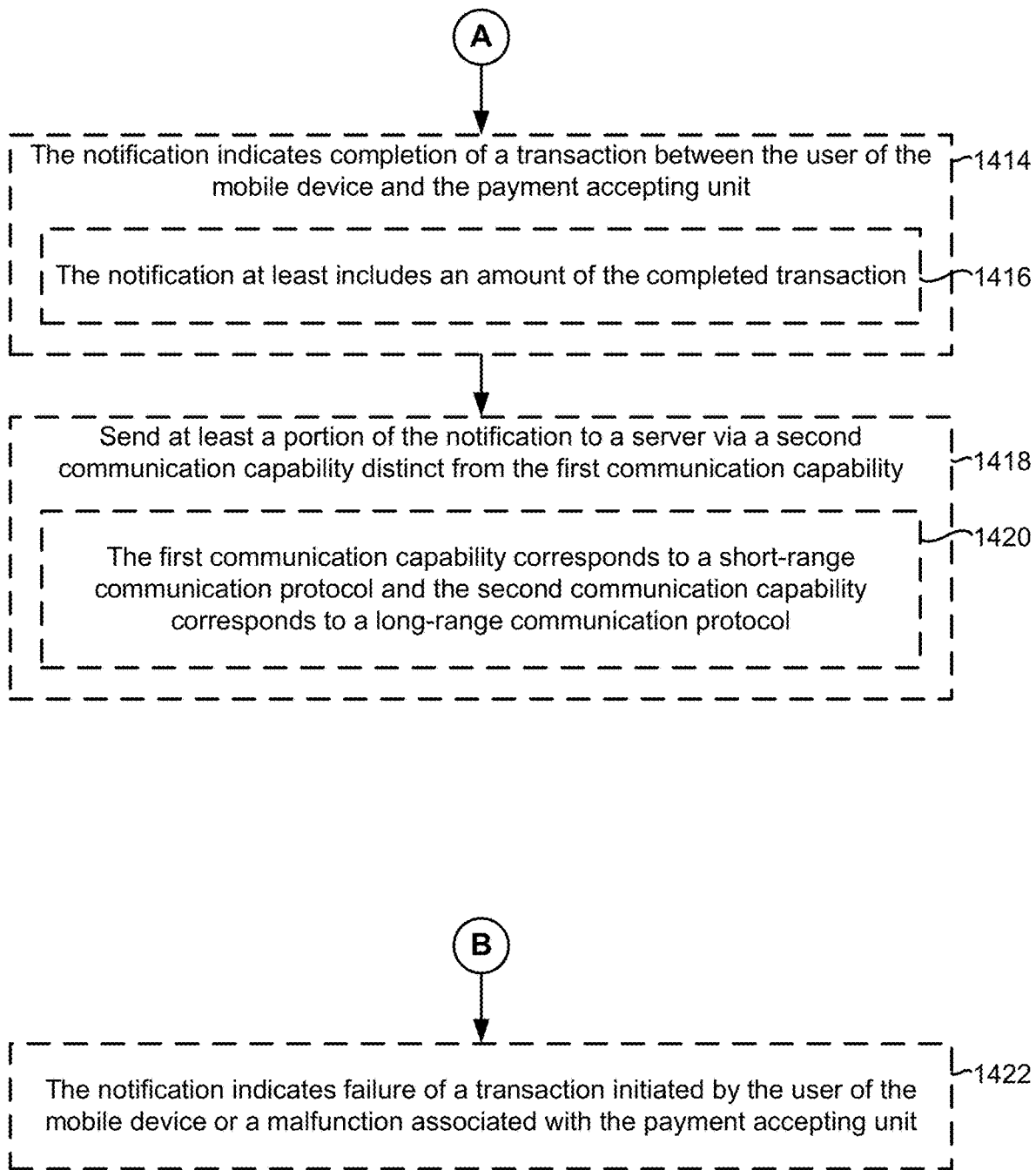

FIGS. 27A-27B illustrate a flowchart diagram of a method 1400 of presenting representations of payment accepting unit events in accordance with some implementations. In some implementations, the method 1400 is performed by a device with one or more processors, memory, one or more output devices, and two or more communication capabilities. For example, in some implementations, the method 1400 is performed by the mobile device 150 (FIGS. 5 and 21) or a component thereof (e.g., the application 140). In some implementations, the method 1400 is governed by instructions that are stored in a non-transitory computer readable storage medium (e.g., the memory 860, FIG. 21) and the instructions are executed by one or more processors (e.g., the processing unit 850, FIG. 21) of the device. Optional operations are indicated by dashed lines (e.g., boxes with dashed-line borders).

After sending a request to a payment module via a first communication capability transaction to initiate a transaction with a payment accepting unit (e.g., an offline-payment operated machine such as a vending machine or kiosk) associated with the payment module, the mobile device obtains (1402) a notification from the payment module via the first communication capability, where the notification indicates an event at the payment accepting unit associated with the payment module. In some implementations, method 1400 occurs after the mobile device 150 sends the AuthGrant in FIG. 8C. In some implementations, method 1400 occurs after the mobile device 150 sends the authorization grant to the payment module 100 in operation 1012 of process 1000 in FIG. 23. Operation 1206 of FIG. 25A, for example, shows the mobile device 150 receiving a notification sent by the payment module 100 (e.g., the adapter module 100, FIGS. 5 and 20) sent via the first communication capability (e.g., a short-range communication technology/protocol such as BLE). The notification indicates an event at the payment accepting unit (e.g., the payment accepting unit 120, FIGS. 5 and 19) (sometimes also herein called "machine 120") associated with the payment module 100.

In some implementations, the first communication capability corresponds (1404) to a short-range communication protocol. As described above, the short-range communication protocols include BLE, NFC, and/or other protocols utilizing non-persistent communication channels.

In response to obtaining the notification, the mobile device provides (1406) a representation of the notification to a user of the mobile device via the one or more output devices of the mobile device. For example, in FIG. 26A, the mobile device 150 displays user interface 1302 on touch screen 152 with a message 1306 that indicates that the first transaction is complete. For example, in FIG. 26C, the mobile device 150 displays user interface 1320 on touch screen 152 with a message 1322 that indicates that the transaction was aborted. For example, in FIG. 26D, the mobile device 150 displays user interface 1330 on touch screen 152 with a message 1332 that indicates that there was an error with the transaction.

In some implementations, the one or more output devices of the mobile device include (1408) at least one of: a display, one or more speakers, one or more LEDs, and a vibration mechanism. For example, the mobile device 150 includes one or more of a display (e.g., the touch screen 152, FIGS. 10A-10D), one or more speakers, one or more LEDs, and a vibration mechanism.

In some implementations, the representation of the notification is at least one of (1410): a message displayed on the display of the mobile device; a banner notification displayed on a display of the mobile device; a vibration alert from the vibration mechanism of the mobile device; an aural alert from the one or more speakers of the mobile device; and a visual alert from the one or more LEDs of the mobile device. For example, in FIGS. 26B-26D, the representation of the notification includes messages 1306, 1322, and 1332 displayed on the touch screen 152 of the mobile device 150. In another example, the representation of the notification is a predefined sequence of vibrations provided by the vibration mechanism of the mobile device 150. In another example, the representation of the notification is a predefined sequence of tones provided by the one or more speakers of the mobile device 150. In another example, the representation of the notification is a predefined sequence of blinking LEDs of the mobile device 150.

In some implementations, the notification indicates (1412) abortion of a transaction initiated by the user of the mobile device. In FIG. 26C, for example, the user interface 1320 includes the message 1322 indicating that the transaction has been aborted. For example, the user aborts the transaction by actuating a coin return mechanism of the machine 120. In another example, the user aborts the transaction by selection an abort affordance on the interface of the application 140 (not shown).

In some implementations, the notification indicates (1414) completion of a transaction between the user of the mobile device and the payment accepting unit. In FIG. 26A, for example, the user interface 1302 includes the message 1306 indicating that completion of the transaction with the machine 120 initiated by the user of the mobile device 150.

In some implementations, the notification indicating completion of the transaction at least includes (1416) an amount of the completed transaction. In FIG. 26A, for example, the user interface 1302 includes prepaid balance 1304 which indicates that $1.00 has been deducted from the prepaid balance after performing a transaction with the machine 120 as compared to the prepaid balance in FIG. 10C-10D (i.e., $9.00 in FIGS. 10C-10D and $8.00 in FIG. 26A).

In some implementations, the mobile device sends (1418) at least a portion of the notification to a server via a second communication capability distinct from the first communication capability. Operation 1260 of FIG. 25B, for example, shows the mobile device 150 sending first transaction information to the server 130 for a completed transaction via the second communication capability (e.g., a long-range communication protocols such as Wi-Fi, CDMA, GSM, and/or the like). For example, the first transaction information at least includes the amount of the first completed transaction.

In some implementations, the first communication capability corresponds (1420) to a short-range communication protocol and the second communication capability corresponds to a long-range communication protocol. For example, the first communication capability of the mobile device 150 is a radio/transceiver means for communicating via one or more short-range communication protocols such as BLE, NFC, and/or the like (i.e., a non-persistent communication channel). For example, the second communication capability of the mobile device 150 is a radio/transceiver means for communicating via one or more long-range communication protocols such as Wi-Fi, CDMA, GSM, and/or the like.

In some implementations, the notification indicates (1422) failure of a transaction initiated by the user of the mobile device or a malfunction associated with the payment accepting unit. In FIG. 26D, for example, the user interface 1330 includes the message 1332 indicating that there was an error with the transaction. For example, the transaction fails due to a vending jam or other malfunction. In another example, the payment accepting unit experiences a malfunction due to an open door or the like. In some implementations, at least a portion of the failure/malfunction notification is sent to the sever 130 and an alert is subsequently sent to the operator of the payment accepting unit (e.g., the machine 120) by the server 130.

It should be understood that the particular order in which the operations in FIGS. 27A-27B have been described is merely for example purposes and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to the method 1400 described above with respect to FIGS. 27A-27B.

Figure 28A:
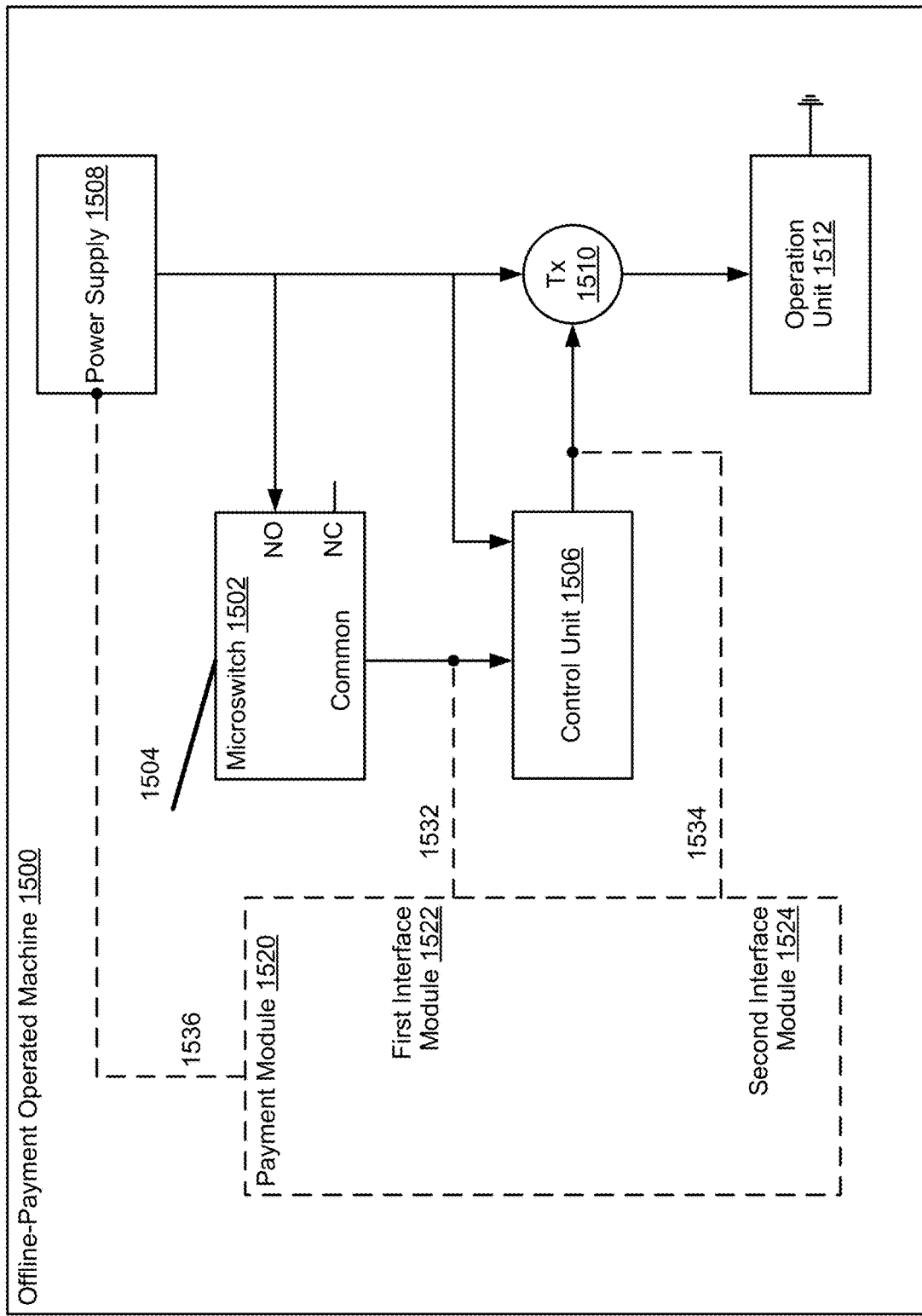
FIG. 28A illustrates a block diagram of an offline-payment operated machine in accordance with some implementations.

FIG. 28A illustrates a block diagram of an offline-payment operated machine 1500 in accordance with some implementations. For example, the offline-payment operated machine 1500 (e.g., a form of the machine 120) is an electro-mechanical machine capable of accepting currency (e.g., coins), which is not connected to any networks (e.g., telephone, cellular, or Wi-Fi). For example, the offline-payment operated machine 1500 is a washer or dryer at a laundromat, a parking meter, a car wash payment kiosk, a video gaming console (i.e., a coin-operated arcade game), a coin-operated pool table, a coin-operated dart machine, a coin-operation vacuum or air pump (such as those commonly found at gas stations), or other offline-payment operated machine that dispenses goods (e.g., products stocked by the machine 1500) and/or provides services (e.g., allows a user to use the services, such as playing a video game, using the washer or dryer, etc.). Offline-payment operated machines are, in some circumstances, unattended in the sense that no operator is physically near the machine while the machine is operating normally. Therefore, these machines are also referred to herein as "unattended machines," "unattended coin-operated machines," and "unattended offline-payment operated machines."

In FIG. 28A, the offline-payment operated machine 1500 includes a microswitch 1502, a control unit 1506, a power supply 1508, a transistor 1510, and an operation unit 1512. The components of the offline-payment operated machine 1500 in FIG. 28A are examples and one of skill in the art will appreciate that various other components may be included in or excluded from the offline-payment operated machine 1500.

In FIG. 28A, the microswitch 1502 is a leveraged microswitch with lever 1504. For example, the microswitch 1502 is a CHERRY BRAND™ microswitch with a normally open terminal ("NO"), a normally closed terminal ("NC"), and a common terminal. For example, the lever 1504 is incorporated into a coin slot of the offline-payment operated machine 1500 and is depressed whenever a coin slides down the coin slot into a coin reservoir of the offline-payment operated machine 1500 (not shown). For example, when the lever 1504 is depressed and the microswitch 1502 is wired in the NO configuration as shown in FIG. 28A, the switch is closed. Continuing with this example, when the switch is closed, control unit 1506 receives a pulse (i.e., a payment acceptance signal) from the common terminal of the microswitch 1502 indicating depression of the lever 1504 from the reception of a US quarter (i.e., $0.25) or coin of another value.

In some implementations, when the control unit 1506 receives a preset sequence of payment acceptance signals indicative of a preset number of coins being received by the microswitch 1502, the control unit 1506 initiates the operation of the offline-payment operated machine 1500. For example, after receiving the preset sequence of payment acceptance signals (e.g., three pulses indicating reception of three US quarters), the control unit 1506 initiates operation of the offline-payment operated machine 1500 by applying current to the gate of the transistor 1510 which allows current to flow from the power supply 1508 to operation unit 1512. For example, the operation unit 1512 is a motor of a dryer which begins spinning once current flows from the power supply 1508.

In FIG. 28A, payment module 1520 (e.g., a form of the adapter module 100, FIGS. 5 and 20) is configured to be installed in the offline-payment operated machine 1500 so as to retrofit the offline-payment operated machine 1500 to be able to accept electronic payments. In some implementations, the payment module 1520 is referred to herein as a pulse-providing device 1520 (as discussed below in reference to FIGS. 31-33). In some implementations, the payment module 1520 includes all or some of the components included in adapter module 100 in FIG. 20 such as processing unit 750, memory 760, a security unit 755, and a communications unit 770. In some implementations, the payment module 1520 also includes a first interface module 1522, a second interface module 1524, and a lead 1536 for drawing power from power supply 1508 of the offline-payment operated machine 1500.

In FIG. 28A, the first interface module 1522 is configured to sample payment acceptance signals from the microswitch 1502 (e.g., a coin receiving switch) via lead 1532 of the offline-payment operated machine 1500. For example, the payment acceptance signals are indicative of a coin being received by the microswitch 1502 which depress lever 1504. In FIG. 28A, the second interface module 1524 is configured to sample control signals from the control unit 1506 of the offline-payment operated machine 1500 via lead 1534 that initiates an operation of the offline-payment operated machine (e.g., the application of current to the gate of the transistor 1510) in response to receiving a preset sequence of payment acceptance signals from the microswitch 1502 (e.g., the coin receiving switch) indicative of the preset number of coins.

In some implementations, even though a particular unattended machine (e.g., 1500, FIG. 28A) is not connected to any network and an operator is not located in proximity to the particular unattended machine, the unattended machine is still able accept remotely-configured options (e.g., multi-credit pricing options) that are configured at a server and sent to the pulse-providing device 1520 that is coupled with the particular unattended machine via an encrypted exchange of information with a mobile phone. In some implementations, the encrypted exchange of information includes instructions or data that allow the pulse-providing device 1520 to provide electric pulses that are determined in accordance with a remotely-configured option that is selected by a user of mobile device (e.g., via a user interface display in an application 140, as pictured in FIG. 32). Additional details are also provided below in reference to FIGS. 31-33.

Figure 28B:
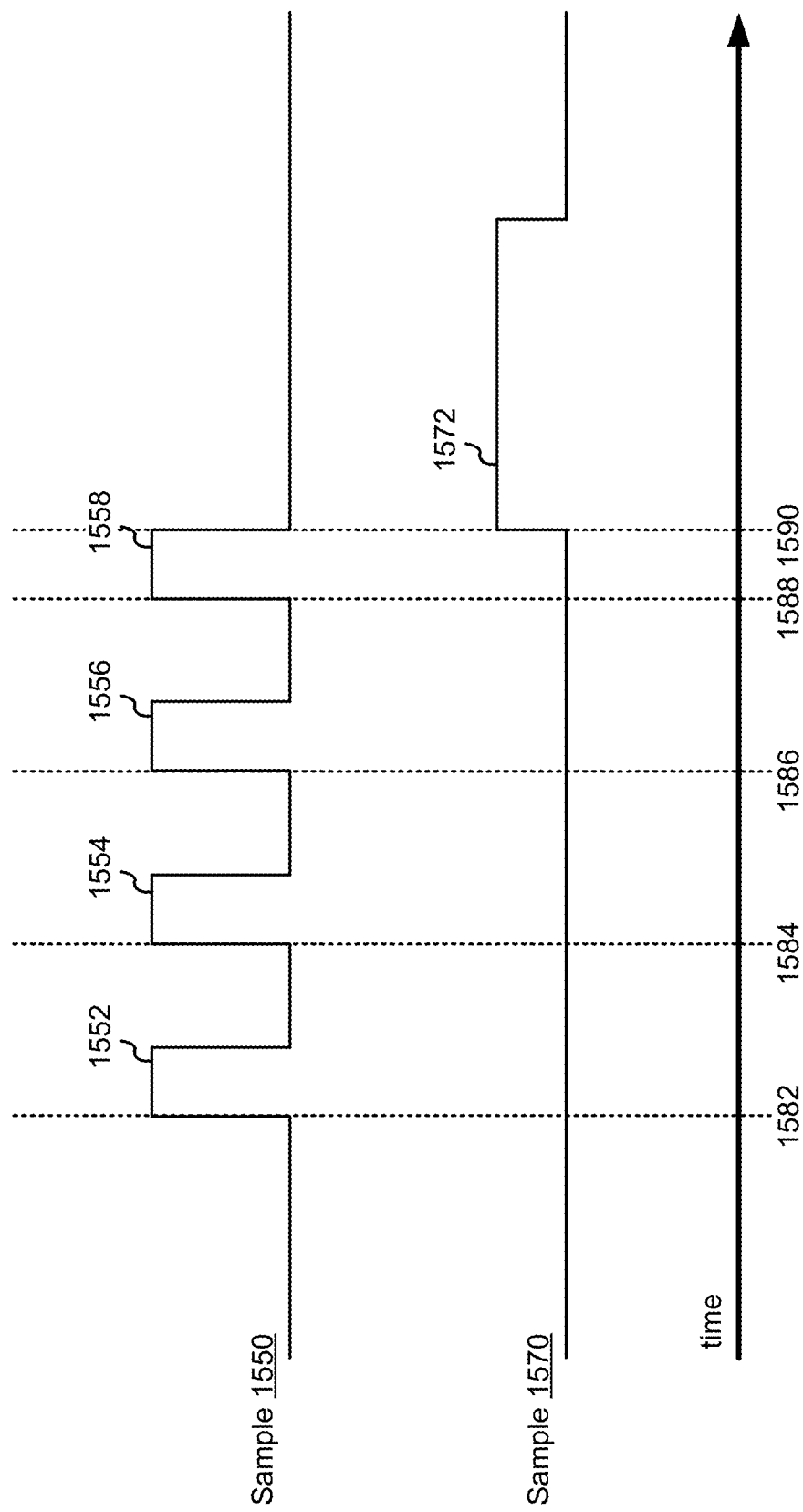
FIG. 28B illustrates signals sampled by the payment module in accordance with some implementations.

FIG. 28B illustrates signals sampled by the payment module 1520 in accordance with some implementations. In FIG. 28B, sample 1550 represents a preset sequence of payment acceptance signals sampled by the first interface module 1522 via lead 1532 that are sent from the microswitch 1502 to the control unit 1506. For example, the preset sequence of payment acceptance signals indicative of the preset number of coins include pulses (i.e., payment acceptance signals) 1552, 1554, 1556, and 1558. For example, the leading edges of pulses 1552, 1554, 1556, and 1558 at times 1582, 1584, 1586, and 1588 indicate reception of a coin by microswitch 1502 which causes the switch to close when wired in the NO configuration as shown in FIG. 28A. In FIG. 28B, sample 1570 represents a control signal sampled by the second interface module 1524 via lead 1534 that is sent from the control unit 1506 to transistor 1510. In FIG. 28B, the sample 1570 includes a pulse 1572 that is sent from the control unit 1506 to transistor 1510 at time 1590 after receiving the preset sequence of payment acceptance signals from the microswitch 1502 (i.e., pulses 1552, 1554, 1556, and 1558).

Figure 29A:
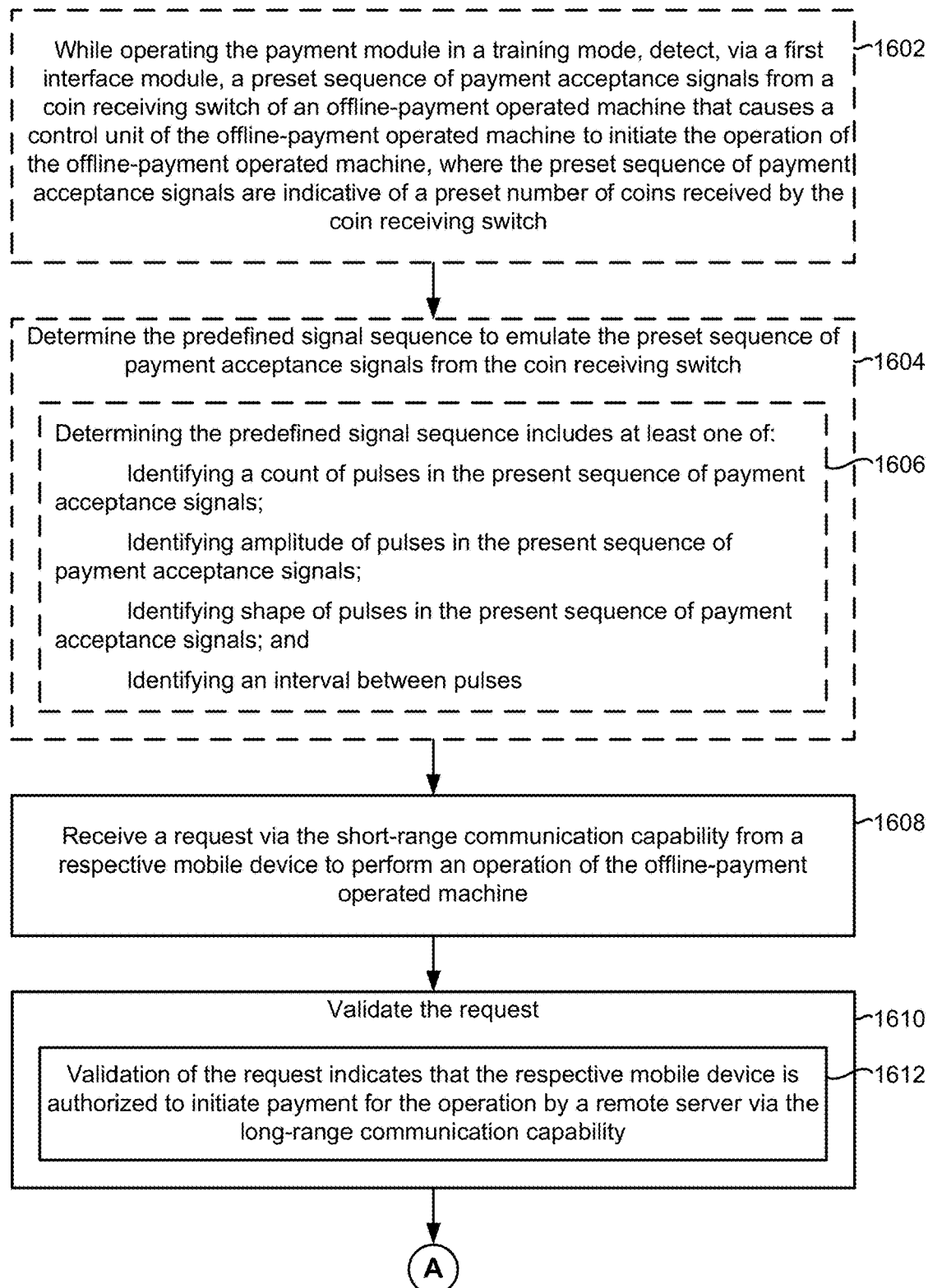
FIGS. 29A-29B illustrate a flowchart diagram of a method 1600 of retrofitting an offline-payment operated machine to accept electronic payments in accordance with some implementations.
Figure 29B:
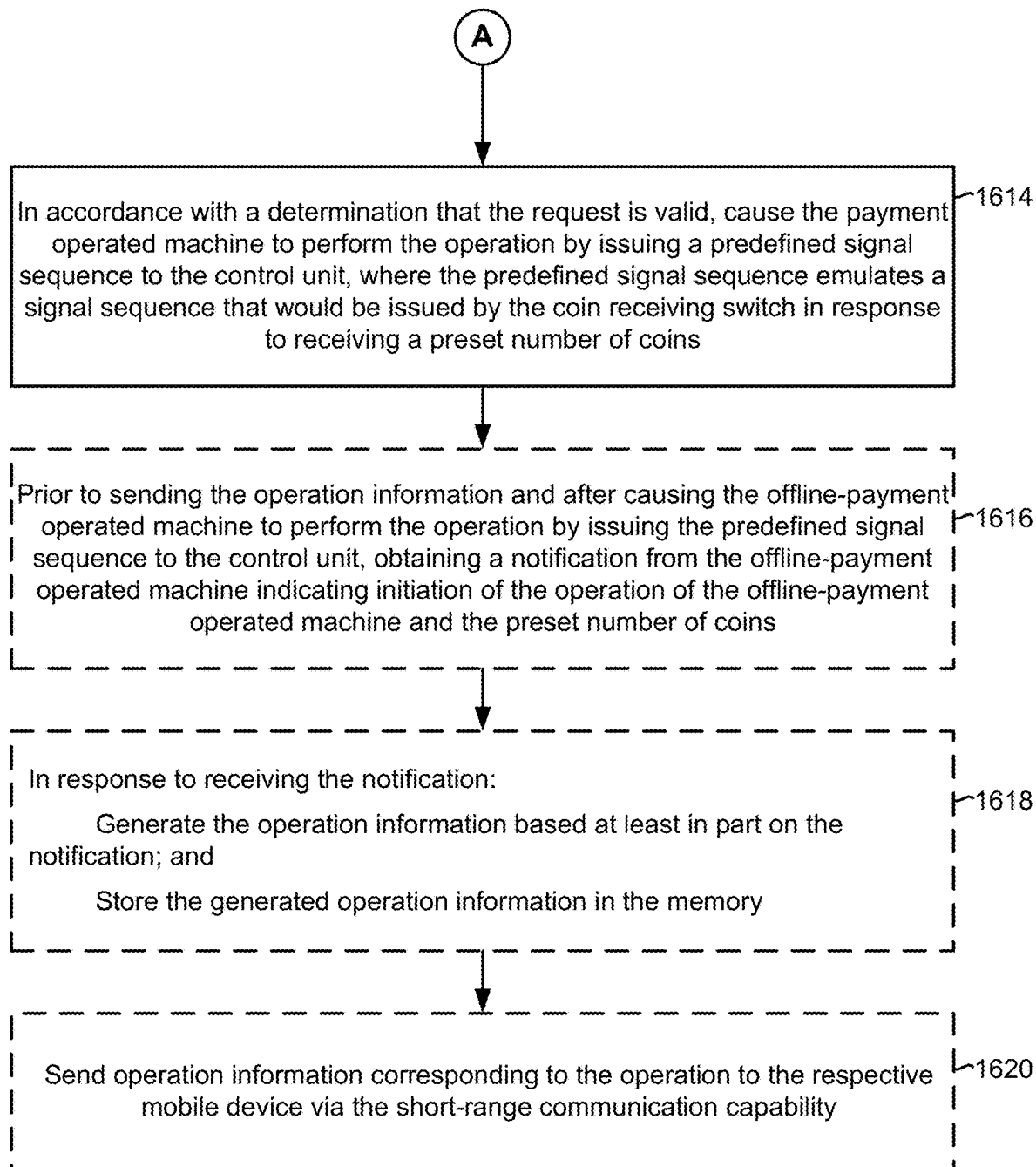

FIGS. 29A-29B illustrate a flowchart diagram of a method of retrofitting an offline-payment operated machine to accept electronic payments in accordance with some implementations. In some implementations, the method 1600 is performed by a payment module with one or more processors and memory. In some implementations, the payment module also includes a short-range communication capability corresponding to a short-range communication protocol (e.g., a non-persistent communication channel such as BLE, NFC, and/or the like), where the short-range communication capability is configured to communicate with one or more mobile devices, where each of the one or more mobile devices is configured with a complimentary short-range communication capability and a long-range communication capability corresponding to a long-range communication protocol (e.g., Wi-Fi, CDMA, GSM, and/or the like).

In some implementations, the payment module is coupled with an offline-payment operated machine (e.g., the payment accepting unit 120, FIGS. 5 and 19 (sometimes also herein called "machine 120"), or the offline-payment operated machine 1500, FIG. 28A) such as dryer or washer in a laundromat, a parking meter, a car wash payment kiosk, or the like. In some implementations, the offline-payment operated machine includes a coin receiving switch (e.g., the microswitch 1502, FIG. 28A) and a control unit (e.g., the control unit 1506, FIG. 28A). In some implementations, the payment module further includes: (A) a first interface module (e.g., the first interface module 1522, FIG. 28A) configured to sample payment acceptance signals from the coin receiving switch of the offline-payment operated machine, where the signals are indicative of a coin being received by the coin receiving switch; and (B) a second interface module (e.g., the second interface module 1524, FIG. 28A) configured to sample control signals from the control unit of the offline-payment operated machine that initiate an operation of the offline-payment operated machine in response to receiving a preset sequence of payment acceptance signals from the coin receiving switch indicative of the preset number of coins. By sampling and storing these signals, the payment module 1520 is able to simulate operation of a respective coin receiving switch in response to receiving the correct/preset number of coins so as to trigger operation of the offline-payment operated machine in response to completion of an electronic payment.

For example, in some implementations, the method 1600 is performed by the adapter module 100 (FIGS. 5 and 20) or payment module 1520 (FIG. 28A). In some implementations, the method 1600 is governed by instructions that are stored in a non-transitory computer readable storage medium (e.g., the memory 760, FIG. 20) and the instructions are executed by one or more processors (e.g., the processing unit 750, FIG. 20) of the payment module. Optional operations are indicated by dashed lines (e.g., boxes with dashed-line borders).

In some implementations, the payment module detects (1602), via the first interface module, a preset sequence of payment acceptance signals from the coin receiving switch that causes the control unit to initiate the operation of the offline-payment operated machine, where the preset sequence of payment acceptance signals are indicative of a preset number of coins received by the coin receiving switch. For example, with reference to FIGS. 28A-28B, the first interface module 1522 of the payment module 1520 samples payment acceptance signals via lead 1532 from the microswitch 1502 to the control unit 1506. For example, each of the payment acceptance signals is indicative of reception of a coin by the microswitch 1502. Continuing with this example, the second interface module 1524 of the payment module 1520 samples control signals via lead 1534 from the control unit 1506 to the transistor 1510. The payment module 1520 detects a preset sequence of payment acceptance signals from the microswitch 1502 that causes the control unit 1506 to apply a current to the gate of the transistor 1510 (e.g., the control signals). For example, the preset sequence of payment acceptance signals is indicative of a preset number of coins received by the microswitch 1502 to cause operation of the offline-payment operated machine 1500. For example, the application of current to the gate of the transistor 1510 allows current to flow from the power supply 1508 to the operation unit 1512 so that the operation. For example, the operation unit 1512 is a motor of a dryer which begins spinning once current flows from the power supply 1508.

In some implementations, the payment module determines (1604) the predefined signal sequence to emulate the preset sequence of payment acceptance signals from the coin receiving switch. In some implementations, after detecting the preset sequence of payment acceptance signals that causes the control unit 1506 to initiate the operation of the offline-payment operated machine 1500, the payment module 1520 determines a predefined signal sequence to emulate the preset sequence of payment acceptance signals. In some implementations, the money value associated with each pulse in the preset sequence of payment acceptance signals from the microswitch 1502, indicative of the preset number of coins to initiate the operation of the offline-payment operated machine 1500, is a default currency (e.g., USD) and amount (e.g., $0.25) set in the firmware of the payment module 1520. In some implementations, the money value associated with the each pulse in the preset sequence of payment acceptance signals from the microswitch 1502, indicative of the preset number of coins to initiate the operation of the offline-payment operated machine 1500, is set by the server 130 and can be changed remotely by using the mobile device 150 as a communications bridge to send information indicating the value of a pulse from the server 130 to the mobile device 150 via the second communication capability (e.g., GSM, CDMA, or Wi-Fi) and forwarding the information from the mobile device to the payment module 1520 via the first communication capability (e.g., BLE). For instance, in most cases, each pulse is US $0.25. Additional details regarding remotely configuring options for offline-payment operated machines are also provided below in reference to FIGS. 31-33.

In some implementations, determining the predefined signal sequence includes (1606) at least one of: identifying a count of pulses in the present sequence of payment acceptance signals; identifying amplitude of pulses in the present sequence of payment acceptance signals; identifying shape of pulses in the present sequence of payment acceptance signals; and identifying an interval between pulses. In some implementations, after detecting the preset sequence of payment acceptance signals (e.g., the sample 1550, FIG. 28B), the payment module 1520 determines a predefined signal sequence to emulate the preset sequence of payment acceptance signals by identifying a count of pulses in the preset sequence of payment acceptance signals, an interval between pulses in the preset sequence of payment acceptance signals, the shape of pulses in the preset sequence of payment acceptance signals, and an amplitude of pulses in the preset sequence of payment acceptance signals.

The payment module receives (1608) a request via the short-range communication capability from a respective mobile device to perform an operation of the offline-payment operated machine. For example, with reference to FIG. 8C, the payment module 1520 (FIG. 28A) receives the AuthGrant from the mobile device 150 via the short-range communication capability (e.g., BLE) indicating that the user of the mobile device 150 wishes to perform the operation of the offline-payment operated machine 1500 (FIG. 28A). For example with reference to operation 1012 in FIG. 23, the payment module 1520 (FIG. 28A) receives an authorization grant token from the mobile device 150 via the short-range communication capability (e.g., BLE) indicating that the user of the mobile device 150 wishes to perform the operation of the offline-payment operated machine 1500 (FIG. 28A).

The payment module validates (1610) the request. Validation of the request indicates (1612) that the respective mobile device is authorized to initiate payment for the operation by a remote server via the long-range communication capability. In some implementations, the payment module 1520 validates the request from the mobile device 150 by determining whether the AuthGrant or the authorization grant token includes a valid authorization code.

In accordance with a determination that the request is valid, the payment module causes (1614) the payment operated machine to perform the operation by issuing a predefined signal sequence to the control unit, where the predefined signal sequence emulates a signal sequence that would be issued by the coin receiving switch in response to receiving a preset number of coins. For example, with reference to FIG. 28B, the payment module 1520 issues a predefined signal sequence with first interface module 1522 to the control unit 1506 that emulates sample 1550 in FIG. 28B. Continuing with this example, in response to receiving the predefined signal sequence from the payment module 1520 control unit 1506 causes initiation of the operation of the offline-payment operated machine 1500 by applying current to the gate of the transistor 1510 which allows current to flow from the power supply 1508 to operation unit 1512. In some implementations, the control unit 1506 causes initiation of the operation by setting a timer to an amount of time corresponding to the preset number of coins whereby current flows to the gate of the transistor 1510 for the set amount of time. For example, the preset number of coins is a number of a coins required to run the offline-payment operated machine 1500 by for a default amount of time and subsequent coins may be added to extend the amount of time that the offline-payment operated machine 1500 by will run. In some implementations, the preset number of coins is a number of a coins required to cause the offline-payment operated machine 1500 to dispense a purchased item, such as laundry detergent.

Alternatively, in some implementations, in accordance with a determination that the request is valid, the offline-payment operated machine 1500 displays credit to the user (e.g., via one of the displays 122 or 124 shown in FIG. 19) and the user interacts with the input mechanisms of the offline-payment operated machine 1500 120 (e.g., via the buttons 126 or a touch screen display 124 shown in FIG. 19) to perform the operation of the machine. For example, if the offline-payment operated machine 1500 is a dryer, the user of the mobile device 150 selects the appropriate spin cycle via input mechanisms of the dryer, and when the user of the mobile device 150 selects a start/run input mechanism of the dryer, control unit 1506 of the dryer causes initiation of the operation of the dryer (e.g., starting a motor that corresponds to operation unit 1512 in FIG. 28A).

In some implementations, instead of issuing the predefined signal sequence to the control unit, the pulse-providing device 1520 issues a remotely-configured signal sequence (i.e., configured remotely by an operator and sent to the pulse-providing device 1520 via the mobile device with the authorization grant) that corresponds to payment provided by the user via the mobile device. In some implementations, the remotely-configured signal sequence does not correspond to the predefined signal sequence for an equivalent number of coins. For example, if the user chooses to send a payment of one dollar to the unattended machine (via the pulse-providing device 1520), the predefined signal sequence observed by the pulse-providing device 1520 may indicate that four predefined pulses are to be provided (in order to simulate pulses provided in response to the receipt of four quarters by the unattended machine, but instead of providing those four predefined pulses, the pulse-providing device 1520 instead might sent five remotely-configured pulses. In this way, operators are able to easily configure new pricing options, without having to physically interacted with their remotely-located unattended machines. Additional details are provided below in reference to FIGS. 31-33.

In some implementations, prior to sending the operation information and after causing the offline-payment operated machine to perform the operation by issuing the predefined signal sequence to the control unit, the payment module obtains (1616) a notification from the offline-payment operated machine indicating initiation of the operation of the offline-payment operated machine and the preset number of coins. For example, after issuing the preset signal sequence to control unit 1506, the payment module 1520 (FIG. 28A) obtains a notification indicating that the control unit 1506 sent control signals to initiate operation of the offline-payment operated machine 1500 in response to receiving the predefined signal sequence. For example, the notification is obtained by the second interface module 1524 (e.g., the sample 1570, FIG. 28B) sampling controls signals sent by control unit 1506 (e.g., application of current to the gate of the transistor 1510 which allows current to flow from the power supply 1508 to operation unit 1512).

In response to receiving the notification, the payment module (1618): generates the operation information based at least in part on the notification; and stores the generated operation information in the memory. For example, after obtaining the notification, the payment module 1520 (FIG. 28A) generates operation information corresponding to performance of the operation and the preset number of coins associated with the predefined signal sequence (e.g., the amount required to initiate operation of the offline-payment operated machine 1500) and stores the operation information in memory local to the payment module 1520 (e.g., the memory 760, FIG. 20).

In some implementations, the payment module sends (1620) operation information corresponding to the operation to the respective mobile device via the short-range communication capability. For example, after operation 1618, the payment module 1520 (FIG. 28A) sends the operation information to the mobile device 150 via the first communication capability of the mobile device 150 such as a radio/transceiver means for communicating via one or more short-range communication protocols such as BLE, NFC, and/or the like (i.e., a non-persistent communication channel)

It should be understood that the particular order in which the operations in FIGS. 29A-29B have been described is merely for example purposes and is not intended to indicate that the described order is the only order in which the operations could be performed. One of ordinary skill in the art would recognize various ways to reorder the operations described herein (e.g., by including details from the method 1700 in FIG. 30 and/or the method 3200 of FIG. 32). Additionally, it should be noted that details of other processes described herein with respect to other methods described herein (e.g., the method 1700 in FIG. 30 or the method 3200 of FIG. 32) are also applicable in an analogous manner to the method 1600 described above with respect to FIGS. 29A-29B.

Figure 30:
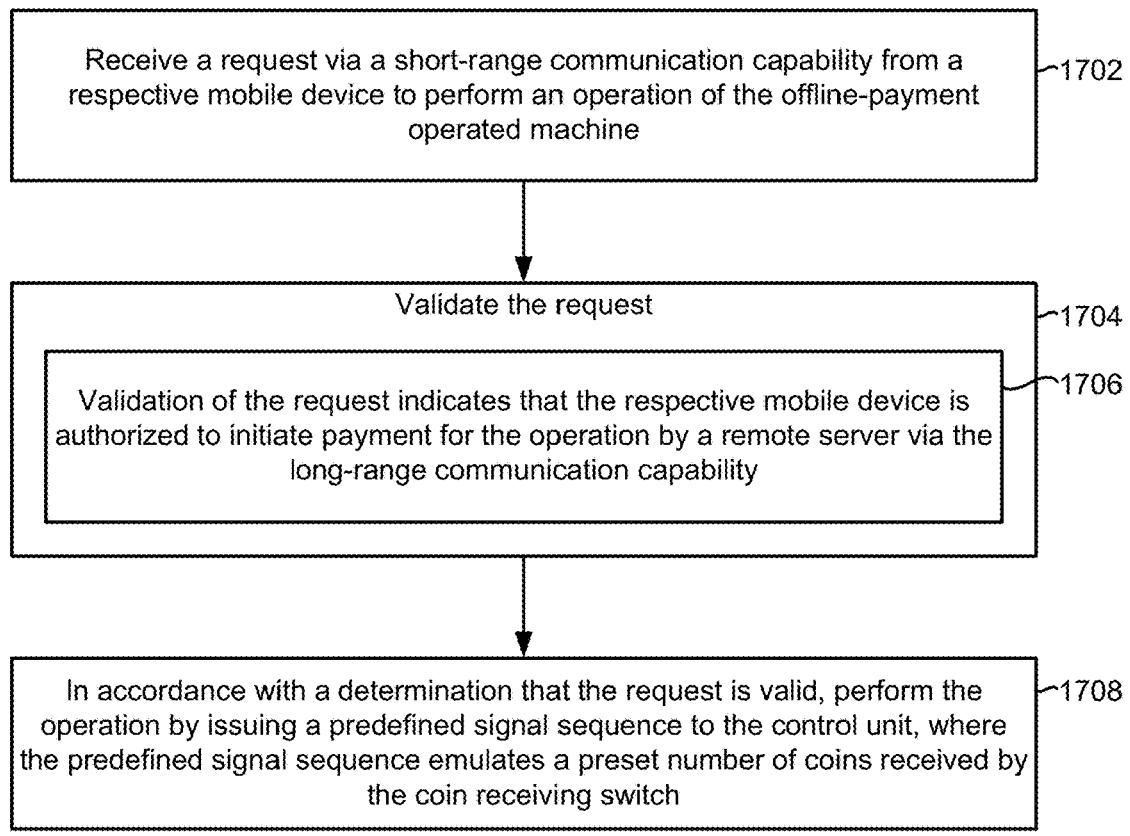
FIG. 30 illustrates a flowchart diagram of a method of enabling a payment operated machine to accept electronic payments in accordance with some implementations.

FIG. 30 illustrates a flowchart diagram of a method 1700 of enabling a payment operated machine to accept electronic payments in accordance with some implementations. In some implementations, the method 1700 is performed by an offline-payment operated machine (e.g., the payment accepting unit 120, FIGS. 5 and 19 (sometimes also herein called "machine 120"), or the offline-payment operated machine 1500, FIG. 28A) such as dryer or washer in a laundromat, a parking meter, a car wash payment kiosk, or the like.

In some implementations, the offline-payment operated machine includes a control unit (e.g., the control unit 1506, FIG. 28A), memory, and a coin receiving switch (e.g., the microswitch 1502, FIG. 28A). In some implementations, the offline-payment operated machine also includes a short-range communication capability corresponding to a short-range communication protocol (e.g., a non-persistent communication channel such as BLE, NFC, and/or the like), where the short-range communication capability is configured to communicate with one or more mobile devices, where each of the one or more mobile devices is configured with a complimentary short-range communication capability and a long-range communication capability corresponding to a long-range communication protocol (e.g., Wi-Fi, CDMA, GSM, and/or the like). For example, in some implementations, the method 1700 is performed by the machine 120, (FIGS. 5 and 19). In some implementations, the method 1700 is governed by instructions that are stored in a non-transitory computer readable storage medium and the instructions are executed by the control unit of the offline-payment operated machine.

The offline-payment operated machine receives (1702) a request via a short-range communication capability from a respective mobile device to perform an operation of the offline-payment operated machine. For example, with reference to FIG. 8C, the payment module 1520 (FIG. 28A) receives the AuthGrant from the mobile device 150 via the short-range communication capability (e.g., BLE) indicating that the user of the mobile device 150 wishes to perform the operation of the offline-payment operated machine 1500 (FIG. 28A). For example with reference to operation 1012 in FIG. 23, the payment module 1520 (FIG. 28A) receives an authorization grant token from the mobile device 150 via the short-range communication capability (e.g., BLE) indicating that the user of the mobile device 150 wishes to perform the operation of the offline-payment operated machine 1500 (FIG. 28A).

The offline-payment operated machine validates (1704) the request. Validation of the request indicates (1706) that the respective mobile device is authorized to initiate payment for the operation by a remote server via the long-range communication capability. In some implementations, the payment module 1520 validates the request from the mobile device 150 by determining whether the AuthGrant or the authorization grant token includes a valid authorization code.

In accordance with a determination that the request is valid, the offline-payment operated machine performs (1708) the operation by issuing a predefined signal sequence to the control unit, where the predefined signal sequence emulates a preset number of coins received by the coin receiving switch. For example, in accordance with a determination that the request is valid, the offline-payment operated machine or a component thereof issues a predefined signal sequence to the control unit 1506 that emulates sample 1550 in FIG. 28B. Continuing with this example, in response to receiving the predefined signal sequence from the payment module 1520, control unit 1506 causes initiation of the operation of the offline-payment operated machine 1500 by applying current to the gate of the transistor 1510 which allows current to flow from the power supply 1508 to operation unit 1512. In another example, in accordance with a determination that the request is valid, the control unit 1506 causes initiation of the operation of the offline-payment operated machine 1500 by applying current to the gate of the transistor 1510 which allows current to flow from the power supply 1508 to operation unit 1512.

It should be understood that the particular order in which the operations in FIG. 30 have been described is merely for example purposes and is not intended to indicate that the described order is the only order in which the operations could be performed. One of ordinary skill in the art would recognize various ways to reorder the operations described herein (e.g., by including details from the method 1600 or the method 3200). Additionally, it should be noted that details of other processes described herein with respect to other methods described herein (e.g., the method 1600 in FIGS. 29A-29B and the method 3200 of FIG. 32) are also applicable in an analogous manner to the method 1700 described above with respect to FIG. 30.

Figure 31:
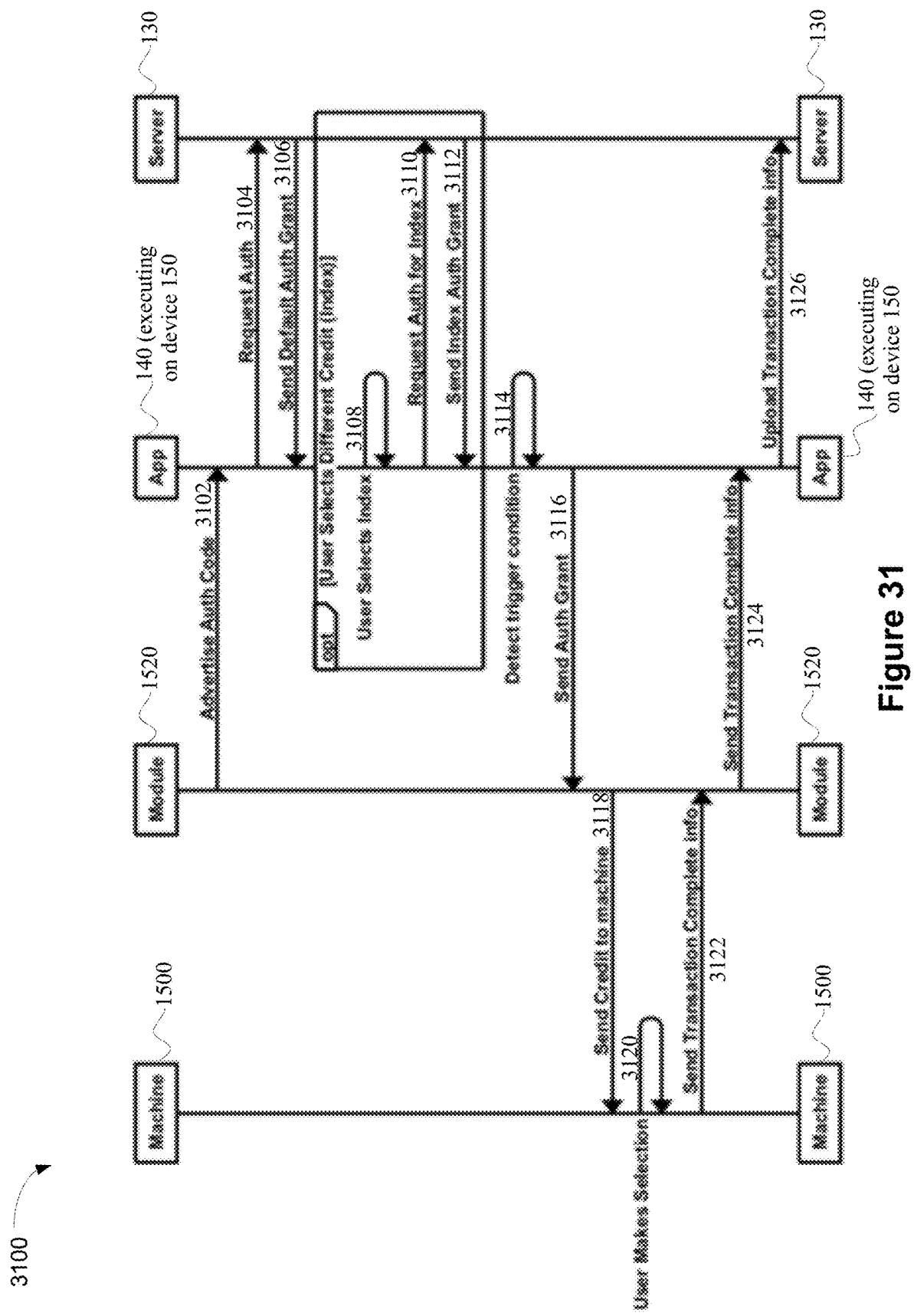
FIG. 31 is a schematic flow diagram of a process for determining electric pulses to provide to an unattended machine based on remotely configured options for the unattended machine, in accordance with some implementations.

FIG. 31 is a schematic flow diagram of a process 3100 for determining electric pulses to provide to an unattended machine based on remotely configured options for the unattended machine, in accordance with some implementations.

In some implementations, the process 3100 for determining electric pulses to provide to an unattended machine is performed via one or more components of the payment processing systems described herein. As shown in FIG. 31, the one or more components include an unattended machine 1500 (FIG. 28A), a module (e.g., a pulse-providing device 1520 that is coupled with the unattended machine via an internal interface of the unattended machine), an application 140 (e.g., a mobile payment application) that is executing on a mobile device 150, and a server 130.

In some implementations, the application 140 is in communication with the pulse-providing device 1520 (e.g., via transmission of bluetooth signals, such as bluetooth low energy signals (BLE)) that is coupled with the unattended machine 1520. The pulse-providing device 1520 advertises an authorization code (3102) and the application 140 receives the advertised broadcast from the pulse-providing device 1520. The application 140 then requests authorization from the server 130 (3104). In some implementations, the server 130 creates an authorization grant using a default pricing option for the machine, encrypts the authorization grant, and transmits it to the mobile device (3106). Authorization requests and the creation of authorization grants are explained in detail above and, in particular, in reference to FIGS. 8A-8G.

Figure 32:
FIG. 32 illustrates an example of a user interface on a mobile device that is used for selecting one of the remotely configured options for the unattended machine, in accordance with some implementations.

The user at this time can chose to either send a payment amount that corresponds to the default pricing option to the pulse-providing device 1520, or alternatively, select from another pricing option (3108) that was received from the server. In some implementations, the application 140 executing on the mobile device 150 also displays a user interface that allows for selecting from the pricing options received from the server (an example user interface is shown in FIG. 32).

The user, for example, may select a third option that is displayed within the user interface (e.g., the option for "4 credit: $1:00," pictured in FIG. 33). The application 140 then causes the mobile device 150 to send a new authorization request to the server this time accompanied by the index value 3 (3110). Upon receiving the authorization request, the server determines the value of the pricing option with index 3 for that particular machine, creates a new authorization grant, and sends that to the mobile device (3112).

In some implementations, payment is then sent to the unattended machine 1520 after satisfaction of a trigger condition (3114) (e.g., a proximity-based trigger condition based on proximity of the mobile device 150 to the pulse-providing device 1520 or a user-input-based trigger condition that is based on user input (such as a swipe gesture) that is received within the application 140). In some implementations, the authorization grant that is sent to the payment module (3116) includes pricing for the amount of the pricing referenced by index value 3.

Additionally, the authorization grant also includes information for the number of pulses (and, in some instances, characteristics of the pulses, such as pulse width that are explained above) that the pulse-providing device 1520 should send to the unattended machine 1520. The pulse-providing device 1520 decrypts the authorization grant and retrieves the information for the number of pulses to provide and then provides pulses to the unattended machine in accordance with the retrieved information (3118). The user is then able to interact with the unattended machine (e.g., to have as many plays at a video game console as the user paid for, to be able to use a coin-operated laundry machine a number of times based on payment provided by the user, and the like based on the type of unattended machine 1520).

In order to ensure that the user's account is debited properly, the process 3100 also includes sending transaction completion information and uploading that information to the server 130 (3122-3124). Details regarding the processing and sending of transaction completion information (also referred to as operation information) are provided above in reference to operations 1616-1620 of FIG. 29B.

In some implementations, a data structure is utilized that decouples the pricing and pulses to create a variety of pricing options. More specifically, a pricing table as follows can be possible: 25 cents=1 pulse=1 credit; 50 cents=2 pulses=2 credits; 1.00=5 pulses=5 credits; and 2.00=12 pulses=12 credit.

In some implementations, the mobile device 150 and the application 140 are not trusted to tell the unattended machine how many credits it is to receive. These components are also not trusted to determine the amount of credits. In some implementations, all that information is instead configured at the server 130. The user has access to information about the pricing matrix including number of credits (as presented in a user interface shown in the application 140, such as that shown in FIG. 32), and while it appears to user that the selection is being made at the mobile app, in some implementations the user is simply selecting an index value. In some implementations, the index value is sent to the server 130 where it looks up the pricing and credits, encrypts the details, and sends back to the application 140 (e.g., as an authorization grant) with an encryption key that can only be read by the particular pulse-providing device 1520 that is coupled with that particular unattended machine (for which the authorization grant was generated).

In some implementations, authorizations for all pricing options can be sent down to the application (from the server 130) at the time of the original authorization request (e.g., at the time when the requested authorization for a default authorization grant is received by the server 130, such as 3104 in FIG. 31). In some implementations, when an index value is subsequently selected via a user interface that is provided to the user within the application 140 (e.g., that shown in FIG. 32), an appropriate indexed authorization grant is then sent to the pulse-providing device 1520. In some implementations, all authorization grants have the same authorization code, so once an authorization grant with the same authorization code is sent to the pulse-providing device 1520, the remaining authorization grants are invalidated since the pulse-providing device 1520 will accept only one authorization grant with the same authorization code (as explained in detail above in reference to FIGS. 8A-8G).

In some implementations, the amount and number of pulses are dissociated and be in any number independent of the value of pulse.

In some implementations, pulse lengths (widths) can be different for each credit amount, and the pulses can be in an array (for example when sending three pulses in one swipe: first pulse is 10 ms, second is 50 ms, third is 10 ms).

In some implementations, when there is an entire machine offer, instant authorization can be provided to a user (e.g., after receiving an authorization request from a mobile device) and an appropriate authorization grant can be sent to the unattended machine 1500 (via the mobile device and the pulse-providing device) without requiring the user to pay first (have a balance).

In this way and by using the process 3100, various pricing options can be selected by a user without creating a trusted relationship between the application 140, the user, and the pulse-providing device 1520. The user cannot make a free-form input in number of credits (these are predefined at the server 130) and the user is simply selecting index values that are then interpreted by the server 130 in order to then send credit/pulsing data that is associated with the selected index value to the pulse-providing device (i.e., the mobile device 150 is merely used as a communication medium to route the credit/pulsing data from the server 130 to the pulse-providing device 1520).

FIG. 32 illustrates an example of a user interface on a mobile device that is used for selecting one of the remotely configured options for the unattended machine, in accordance with some implementations.

As shown in FIG. 32, in some implementations, the user interface includes a number of pricing options for the unattended machine. As explained above in reference to FIG. 31, the pricing options are received from a server 130 in response to an authorization request from a user of the mobile device 150. In some implementations, the pricing options are configured by an operator of the unattended machine via a web-based interface (so that the operator does not need to be in physical proximity to the unattended machine in order to create and make available new pricing options for the unattended machine). As also explained above, the user interface provides no details regarding electric pulses that will be provided to the unattended machine after the user selects one of the pricing options.

In some implementations, the user interfaces is a machine-specific card (e.g., machine-specific card 3202) that also includes details regarding special promotions or offers for the unattended machine (e.g., as shown in FIG. 32, there is an available offer of "Buy 7 get 1 FREE"). After the user selects the available offer, the user is able to provide payment equivalent to 7 coin-operated credits, but will receive 8 plays instead of just 7. This is because, the server 130 stores information indicating that 8 pulses are to be provided to the unattended machine (via the pulse-providing device 1520) in response to the receipt of payment equivalent to 7 coin-operated credits.

In some implementations, the available offer that is highlighted is selected for inclusion on the front of the machine-specific card by the operator and additional offers are also available by flipping over the machine-specific card. Flipping over the machine-specific card is performed in response to a user selection of the "special offers" tab and the back of the machine-specific card is then revealed showing one or more additional offers for the unattended machine.

In some implementations, the user interface also includes a label for the unattended machine that is being interacted with (e.g., a label of "Street Fighter" is shown in a top portion of the user interface, FIG. 32). In some implementations, the user interface also includes a representation of the unattended machine (e.g., a photo of the unattended machine that is taken by an operator and then uploaded to the server 130 for subsequent presentation to users via the application 140).

As also shown in FIG. 32, portions of machine-specific cards for other unattended machines are also illustrated (e.g., machine-specific cards 3204 and 3206). Swiping in a lateral direction over the machine-specific card allows the user to access machine-specific cards for the other unattended machines. After accessing a new machine-specific card for one of the other unattended machines, then authorization requests are then submitted to the server 130 in order to receive available pricing options and authorization grants that correspond to the available pricing options for these other unattended machines (as explained above regarding process 3100, FIG. 31). In some implementations, default authorization grants for each of the other unattended machines are received before the user swipes in the appropriate lateral direction (in this way, the default pricing information is pre-loaded and specific pricing data for other indexes can be later obtained if the user selects one of the other indexes for the other unattended machines).

Figure 33:
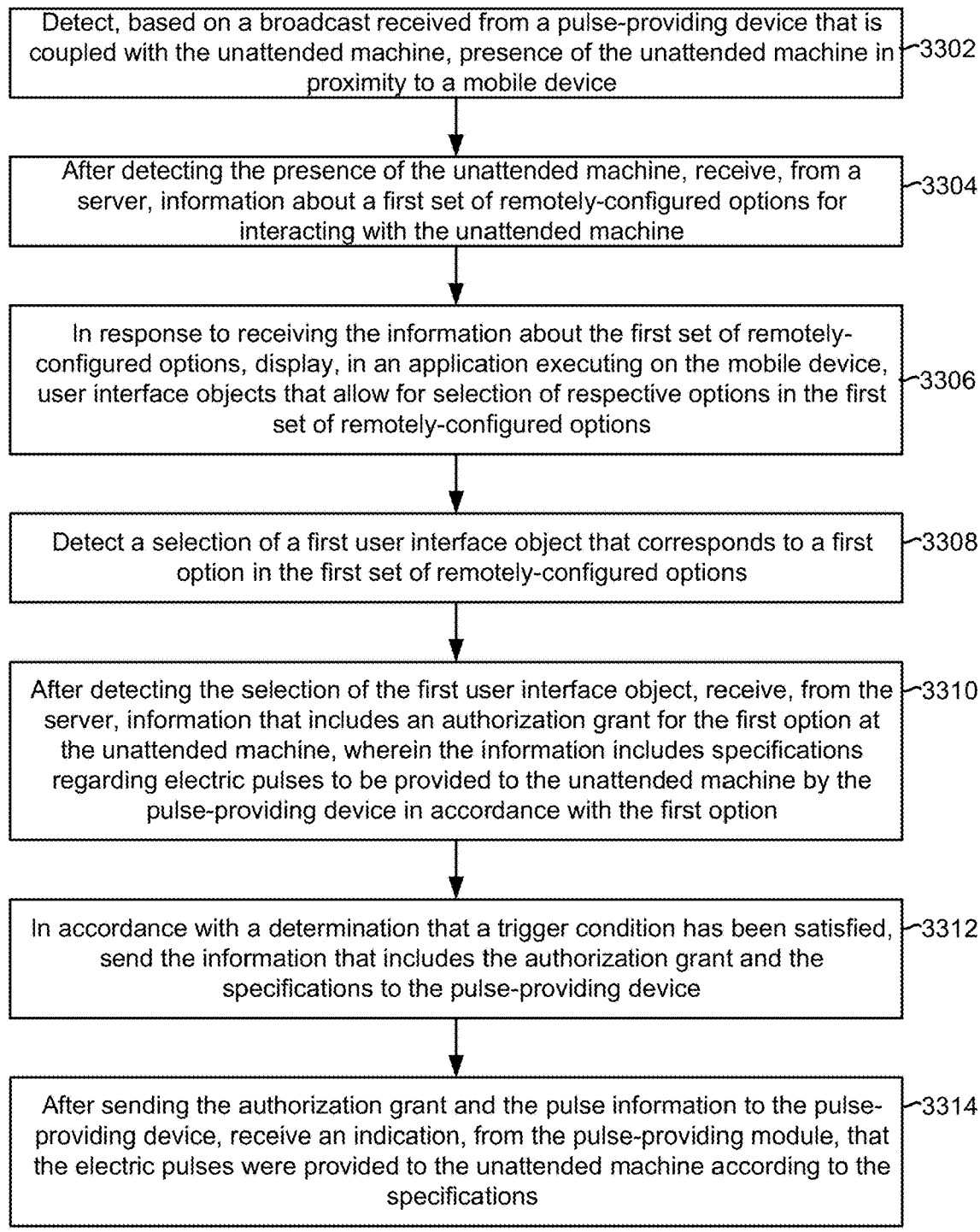
FIG. 33 is a flow diagram of a method of determining electric pulses to provide to an unattended machine based on remotely configured options for the unattended machine, in accordance with some implementations.

FIG. 33 is a flow diagram of a method of determining electric pulses to provide to an unattended machine based on remotely configured options for the unattended machine, in accordance with some implementations. For convenience, the method 3300 is described below as performed by an application (e.g., the application 140 described above) that is executing on a mobile device (e.g., the mobile device 150 described above).

The method 3300 allows for determining electric pulses to provide to an unattended machine based on remotely-configured options for the unattended machine. As explained above, unattended machines cannot accept real-time or configurable pricing options because they are hard-wired to accept only specific coins at specific credit values. By retro-fitting an unattended machine with a pulse-providing device 1520 (described above), operators of unattended machines are able to establish new pricing options and make those available to users via the application 140. In this way, by implementing method 3300, the functioning of unattended machines is improved, user experiences at the unattended machines is improved, and operators can open up new revenue streams.

As shown in FIG. 33, the method 3300 begins when the application detects (3302), based on a broadcast received from a pulse-providing device that is coupled with the unattended machine, presence of the unattended machine in proximity to a mobile device. For example, the broadcast is a bluetooth low energy (BLE) transmission sent by the pulse-providing device and that transmission includes an authentication code (discussed in detail about in reference to FIGS. 8A-8G.

After detecting the presence of the unattended machine, the application receives (3304), from a server (e.g., server 130 described above), information about a first set of remotely-configured options for interacting with the unattended machine. In some implementations, the server 130 is not capable of communicating directly with the unattended machine, because the unattended machine does not have a network connection.

In some implementations, the remotely-configured options are pricing options. In some implementations, the remotely-configured options are pricing options that are determined according to a predefined pricing schedule. In some implementations, the predefined pricing schedule is determined based on a current time of day at the server (in this way, time of day or timezone information received or communicated via the mobile device is not trusted and only such timing information from the server 130 is utilized, in order to avoid or mitigate potential malicious behavior). In some implementations, the remotely-configured options are configured by an operator of the unattended machine without requiring any physical interactions with the unattended machine (e.g., the operator need only configure options through the server, such as via a web-based interface and need not physically change any operation or interface of the unattended machine).

In some implementations, the remotely-configured options are distinct from those pricing options that are available via mechanical interaction with the unattended machine (via insertion of coins into the unattended machine). For example, an operator can establish 2-for-1 deals, time-based deals (discounts for using the machine after, before, or during a certain time of day), loyalty deals (discounts for using the unattended machine on multiple days in a row), deals based on last activity (discounts for returning to use an unattended machine that has not been used for more than a predetermined inactivity period), and the like and these options are not available unless a user interacts with the unattended machine via the application 140 and the pulse-providing device 1520 (because these options must be dynamically conveyed to the unattended machine through communications with the server 130, as explained herein).

In response to receiving the information about the first set of remotely-configured options, the application displays (3306), within the application while it is executing on the mobile device, user interface objects that allow for selection of respective options in the first set of remotely-configured options. An example user interface is shown in FIG. 32 (and described above in reference to FIGS. 31 and 32).

The application also detects (3308) a selection of a first user interface object that corresponds to a first option in the first set of remotely-configured options. After (or in response to) detecting the selection of the first user interface object, the application receives (3310), from the server, information that includes an authorization grant for the first option at the unattended machine, wherein the information includes specifications regarding electric pulses to be provided to the unattended machine by the pulse-providing device in accordance with the first option. In accordance with a determination that a trigger condition has been satisfied, the applicant sends (3312) the information that includes the authorization grant and the specifications to the pulse-providing device. After sending the authorization grant and the pulse information to the pulse-providing device, the application receives (3314) an indication (such as a transaction completion or operation information, as explained above in reference to FIG. 31), from the pulse-providing device, that the electric pulses were provided to the unattended machine according to the specifications.

In some implementations, the application receives an indication from the server that the remotely-configured options are no longer current. For example, the server compares a first hash value that is associated with the remotely-configured options (such as the first set) to a second hash value that is associated with the most current remotely-configured options available at the server. If the hash values do not match, then the server sends (to the application 140), the indication. In response to receiving the indication from the server, the application receives an updated set of remotely-configured pricing options that is distinct from the first set of remotely-configured pricing options. In some implementations, any payment that was sent by the user to the unattended machine based on the first set of remotely-configured options (now out-of-date) is canceled and the user is provided with user interface objects that allow for selection of a new option that is now provided via the updated set of remotely-configured options.

One of ordinary skill in the art will recognize that the operations of method 3300 may be re-arranged, replaced, or modified based on the operations of other methods described herein (e.g., methods 1600 and 1700).

It should be noted that relative terms are meant to help in the understanding of the technology and are not meant to limit the scope of the invention. Similarly, unless specifically stated otherwise, the terms used for labels (e.g., "first," "second," and "third") are meant solely for purposes of designation and not for order or limitation. The term "short" in the phrase "short-range" (in addition to having technology specific meanings) is relative to the term "long" in the phrase "long-range."

The terms "may," "might," "can," and "could" are used to indicate alternatives and optional features and only should be construed as a limitation if specifically included in the claims.

It should be noted that, unless otherwise specified, the term "or" is used in its nonexclusive form (e.g., "A or B" includes A, B, A and B, or any combination thereof, but it would not have to include all of these possibilities). It should be noted that, unless otherwise specified, "and/or" is used similarly (e.g., "A and/or B" includes A, B, A and B, or any combination thereof, but it would not have to include all of these possibilities). It should be noted that, unless otherwise specified, the terms "includes" and "has" mean "comprises" (e.g., a device that includes, has, or comprises A and B contains A and B, but optionally may contain C or additional components other than A and B). It should be noted that, unless otherwise specified, the singular forms "a," "an," and "the" refer to one or more than one, unless the context clearly dictates otherwise.

It is to be understood that the inventions, examples, and implementations described herein are not limited to particularly exemplified materials, methods, and/or structures. It is to be understood that the inventions, examples, and implementations described herein are to be considered preferred inventions, examples, and implementations whether specifically identified as such or not.

The terms and expressions that have been employed in the foregoing specification are used as terms of description and not of limitation, and are not intended to exclude equivalents of the features shown and described. While the above is a complete description of selected implementations of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A method of determining electric pulses to provide to an unattended machine based on remotely-configured options for the unattended machine, the method comprising:
at an application executing on a mobile device:
identifying the unattended machine based at least in part on an identifier corresponding to the unattended machine, wherein the unattended machine is a payment operated machine that accepts payment for dispensing of products and/or services, and wherein the unattended machine includes a control unit and a pulse-providing device electrically coupled to the control unit;
after identifying the unattended machine, receiving, from a server, a first set of remotely-configured options for interacting with the unattended machine;
in response to receiving the first set of remotely-configured options, displaying, in the application, user interface objects that allow for selection of respective options in the first set of remotely-configured options;
detecting a selection of a first user interface object that corresponds to a first option in the first set of remotely-configured options;
after detecting the selection of the first user interface object, receiving, from the server, pulse information specifying a count, amplitude, shape, or interval of electric pulses to be provided to the control unit of the unattended machine by the pulse-providing device in accordance with the first option; and
sending the pulse information to the pulse-providing device; and
at the pulse-providing device:
receiving the pulse information;
determining based on the received pulse information a signal sequence of electrical pulses to output to the control unit of the unattended machine in order to initiate a cashless operation of the unattended machine, wherein the signal sequence of electrical pulses emulates an analog signal generated by a coin receiving switch of the unattended machine, and wherein the signal sequence is characterized by the count, amplitude, shape, or interval of electric pulses specified by the pulse information; and
causing the unattended machine to initiate the cashless operation by issuing the signal sequence of electrical pulses to the control unit.

2. The method of claim 1, wherein the remotely-configured options are pricing options.

3. The method of claim 1, wherein the remotely-configured options are pricing options that are determined according to a predefined pricing schedule.

4. The method of claim 3, wherein the predefined pricing schedule is determined based on a current time of day at the server.

5. The method of claim 1, wherein the remotely-configured options are configured by an operator of the unattended machine without requiring any physical interactions with the unattended machine.

6. The method of claim 1, further comprising, at the application executing on the mobile device:
receiving an indication from the server that the remotely-configured options are no longer current; and
in response to receiving the indication from the server, receiving an updated set of remotely-configured pricing options that is distinct from the first set of remotely-configured pricing options.

7. The method of claim 1, wherein issuing the signal sequence of electrical pulses to the control unit includes emulating a signal sequence that would be issued by a coin receiving switch of the unattended machine in response to receiving a preset number of coins.

8. The method of claim 1, wherein a long-range wireless transceiver of the mobile device receives the first set of remotely-configured options for interacting with the unattended machine from the server.

9. The method of claim 1, wherein a short-range wireless transceiver of the mobile device transmits the pulse information to the pulse-providing device.

10. The method of claim 1, further comprising:
at the pulse-providing device, sending an indication, to the mobile device, that the electric pulses were provided to the unattended machine according to the pulse information;
wherein a short-range wireless transceiver of the mobile device receives the indication from the pulse-providing device.

11. A system for determining electric pulses to provide to an unattended machine based on remotely-configured options for the unattended machine, the system comprising:
a mobile device including a display, one or more processors, memory, and one or more programs including an application executed on the mobile device, wherein the one or more programs are stored in the memory and configured to be executed by the one or more processors, the one or more programs including instructions for:
identifying the unattended machine based at least in part on an identifier or location corresponding to the unattended machine, wherein the unattended machine is a payment operated machine that accepts payment for dispensing of products and/or services, and wherein the unattended machine includes a control unit and a pulse-providing device electrically coupled to the control unit;
after identifying the unattended machine, receiving, from a server, a first set of remotely-configured options for interacting with the unattended machine;
in response to receiving the first set of remotely-configured options, displaying, in the application, user interface objects that allow for selection of respective options in the first set of remotely-configured options;
detecting a selection of a first user interface object that corresponds to a first option in the first set of remotely-configured options;
after detecting the selection of the first user interface object, receiving, from the server, pulse information specifying a count, amplitude, shape, or interval of electric pulses to be provided to the control unit of the unattended machine by the pulse-providing device in accordance with the first option; and
sending the pulse information to the pulse-providing device;
wherein the pulse-providing device includes one or more processors and memory with one or more programs for execution by the one or more processors, the one or more programs including instructions for:

receiving the pulse information;

determining based on the received pulse information a signal sequence of electrical pulses to output to the control unit of the unattended machine in order to initiate a cashless operation of the unattended machine, wherein the signal sequence of electrical pulses emulates an analog signal generated by a coin receiving switch of the unattended machine, and wherein the signal sequence is characterized by the count, amplitude, shape, or interval of electric pulses specified by the pulse information; and causing the unattended machine to initiate the cashless operation by issuing the signal sequence of electrical pulses to the control unit.

12. The system of claim 11, wherein the remotely-configured options are pricing options.

13. The system of claim 11, wherein the remotely-configured options are pricing options that are determined according to a predefined pricing schedule.

14. The system of claim 13, wherein the predefined pricing schedule is determined based on a current time of day at the server.

15. The system of claim 11, wherein the remotely-configured options are configured by an operator of the unattended machine without requiring any physical interactions with the unattended machine.

16. The system of claim 11, wherein the one or more programs of the mobile device further include instructions for:

receiving an indication from the server that the remotely-configured options are no longer current; and in response to receiving the indication from the server, receiving an updated set of remotely-configured pricing options that is distinct from the first set of remotely-configured pricing options.

17. The system of claim 11, wherein the instructions for issuing the signal sequence of electrical pulses to the control unit include instructions for emulating a signal sequence that would be issued by a coin receiving switch of the unattended machine in response to receiving a preset number of coins.

18. The system of claim 11, wherein the mobile device includes a long-range transceiver configured to receive the first set of remotely-configured options for interacting with the unattended machine from the server.

19. The system of claim 11, wherein the mobile device includes a short-range transceiver configured to transmit the pulse information to the pulse-providing device.

20. The system of claim 11, wherein:

the one or more programs of the pulse-providing device further include instructions for sending an indication, to the mobile device, that the electric pulses were provided to the unattended machine according to the pulse information; and the mobile device includes a short-range transceiver configured to receive the indication from the pulse-providing device.

21. A non-transitory computer readable storage medium storing one or more programs configured for execution by a computer system, the one or more programs including instructions for:

at an application executing on a mobile device:

identifying an unattended machine based at least in part on an identifier or location corresponding to the unattended machine, wherein the unattended machine is a payment operated machine that accepts payment for dispensing of products and/or services, and wherein the unattended machine includes a control unit and a pulse-providing device electrically coupled to the control unit;

after identifying the unattended machine, receiving, from a server, a first set of remotely-configured options for interacting with the unattended machine;

in response to receiving the first set of remotely-configured options, displaying, in the application, user interface objects that allow for selection of respective options in the first set of remotely-configured options;

detecting a selection of a first user interface object that corresponds to a first option in the first set of remotely-configured options;

after detecting the selection of the first user interface object, receiving, from the server, pulse information specifying a count, amplitude, shape, or interval of electric pulses to be provided to the control unit of the unattended machine by the pulse-providing device in accordance with the first option; and sending the pulse information to the pulse-providing device;

wherein the pulse-providing device includes a non-transitory computer readable storage medium storing one or more programs including instructions for:

receiving the pulse information;

determining based on the received pulse information a signal sequence of electrical pulses to output to the control unit of the unattended machine in order to initiate a cashless operation of the unattended machine, wherein the signal sequence of electrical pulses emulates an analog signal generated by a coin receiving switch of the unattended machine, and wherein the signal sequence is characterized by the count, amplitude, shape, or interval of electric pulses specified by the pulse information; and causing the unattended machine to initiate the cashless operation by issuing the signal sequence of electrical pulses to the control unit.

22. The non-transitory computer readable storage medium of claim 21, wherein the remotely-configured options are pricing options.

23. The non-transitory computer readable storage medium of claim 21, wherein the remotely-configured options are pricing options that are determined according to a predefined pricing schedule.

24. The non-transitory computer readable storage medium of claim 23, wherein the predefined pricing schedule is determined based on a current time of day at the server.

25. The non-transitory computer readable storage medium of claim 21, wherein the remotely-configured options are configured by an operator of the unattended machine without requiring any physical interactions with the unattended machine.

26. The non-transitory computer readable storage medium of claim 21, wherein the one or more programs further include instructions for, at the application executing on the mobile device:

receiving an indication from the server that the remotely-configured options are no longer current; and in response to receiving the indication from the server, receiving an updated set of remotely-configured pricing options that is distinct from the first set of remotely-configured pricing options.

27. The non-transitory computer readable storage medium of claim 21, wherein the instructions for issuing the signal sequence of electrical pulses to the control unit include instructions for emulating a signal sequence that would be issued by a coin receiving switch of the unattended machine in response to receiving a preset number of coins.

28. The non-transitory computer readable storage medium of claim 21, wherein the one or more programs further include instructions causing a long-range wireless transceiver of the mobile device to receive the first set of remotely-configured options for interacting with the unattended machine from the server.

29. The non-transitory computer readable storage medium of claim 21, wherein the one or more programs further include instructions causing a short-range wireless transceiver of the mobile device to transmit the pulse information to the pulse-providing device.

30. The non-transitory computer readable storage medium of claim 21, wherein the one or more programs further include instructions for:
- at the pulse-providing device, sending an indication, to the mobile device, that the electric pulses were provided to the unattended machine according to the pulse information;
- wherein the one or more programs further include instructions causing a short-range wireless transceiver of the mobile device to receive the indication from the pulse-providing device.

* * * * *